United States Patent
Yu et al.

(10) Patent No.: US 12,444,738 B2
(45) Date of Patent: Oct. 14, 2025

(54) METHODS OF ADJUSTING CARBON AND SILICA CONTENT IN RICE HULL ASH (RHA) BYPRODUCTS TO CONTROL CARBOTHERMAL REDUCTION FORMING NANOSTRUCTURED SILICON CARBIDE, SILICON NITRIDE, SILICON OXYNITRIDE NANOCOMPOSITES

(71) Applicant: THE REGENTS OF THE UNIVERSITY OF MICHIGAN, Ann Arbor, MI (US)

(72) Inventors: Mengjie Yu, Ann Arbor, MI (US); Richard Laine, Ann Arbor, MI (US); Eleni Temeche, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 0 days.

(21) Appl. No.: 18/689,910

(22) PCT Filed: Sep. 8, 2022

(86) PCT No.: PCT/US2022/042886
§ 371 (c)(1),
(2) Date: Mar. 7, 2024

(87) PCT Pub. No.: WO2023/039049
PCT Pub. Date: Mar. 16, 2023

(65) Prior Publication Data
US 2025/0132323 A1    Apr. 24, 2025

Related U.S. Application Data

(60) Provisional application No. 63/241,820, filed on Sep. 8, 2021.

(51) Int. Cl.
*H01B 1/04* (2006.01)
*C01B 32/97* (2017.01)
*H01M 4/485* (2010.01)

(52) U.S. Cl.
CPC ............. *H01M 4/485* (2013.01); *C01B 32/97* (2017.08); *H01B 1/04* (2013.01)

(58) Field of Classification Search
CPC .......... H01B 1/00; H01B 1/04; C01B 32/956; C01B 32/97; C01B 33/00; C01B 21/0685
See application file for complete search history.

(56) References Cited

U.S. PATENT DOCUMENTS

| | | | |
|---|---|---|---|
| 4,214,920 A * | 7/1980 | Amick | C01B 33/025 |
| | | | 136/261 |
| 7,576,169 B2 | 8/2009 | Hasegawa et al. | |

(Continued)

FOREIGN PATENT DOCUMENTS

| | | | |
|---|---|---|---|
| CN | 102485694 A | 6/2012 | |
| CN | 108483455 B * | 5/2020 | C08L 9/06 |

(Continued)

OTHER PUBLICATIONS

Chaudhary et al "Characterization of Rice Hull Ash", Journal of Applied Polymer Science, vol. 93, 1-8 (2004).*

(Continued)

*Primary Examiner* — Mark Kopec
(74) *Attorney, Agent, or Firm* — Harness, Dickey & Pierce, P.L.C.

(57) ABSTRACT

In various aspects, methods of making a silicon carbide or silicon nitride from rice hull ash (RHA) byproduct are provided. A treated silica depleted rice hull ash product (SDRHA) comprising silicon oxide at ≤about 65% by weight and carbon ≥about 35% by weight may be heated in an environment free of any additional carbon sources, but in (Continued)

an inert atmosphere, having a temperature of ≥about 1,200° C. to ≤about 1,700° C. for a carbothermal reaction that forms a product (e.g., nanocomposite product) comprising at least one of silicon carbide (SiC), silicon nitride ($Si_3N_4$), and silicon oxynitride ($Si_2N_2O$ or non-stoichiometric $SiN_xO_{4-x}$, where x ranges from greater than 0 to less than 4). A negative electroactive material is also provided that includes silicon oxynitride ($Si_2N_2O$), which may be used in a lithium ion battery.

12 Claims, 30 Drawing Sheets

(56) References Cited

U.S. PATENT DOCUMENTS

| | | | |
|---|---|---|---|
| 8,475,758 B2 * | 7/2013 | Laine | C22B 1/244 423/350 |
| 8,916,122 B2 | 12/2014 | Laine et al. | |
| 2013/0183232 A1 | 7/2013 | Laine et al. | |
| 2013/0184483 A1 | 7/2013 | Laine et al. | |
| 2015/0110701 A1 | 4/2015 | Laine et al. | |
| 2020/0168890 A1 | 5/2020 | Choi et al. | |

FOREIGN PATENT DOCUMENTS

| | | | | |
|---|---|---|---|---|
| CN | 113800517 A | * | 12/2021 | C01B 32/336 |
| WO | WO-2012166728 A1 | * | 12/2012 | C01B 32/97 |

OTHER PUBLICATIONS

Marchal et al "A low cost, low energy route to solar grade silicon from rice hull ash (RHA), a sustainable source", Green Chem., 2015, 17, 3931.*

Clara Huang, "Silicon oxynitride derived from rice hull ash (RHA) as an anode material for lithium-ion batteries", Apr. 22, 2021, pp. 1-2.

Eleni Temeche et al., "Silica depleted rice hull ash (SDRHA), an agricultural waste, as a high-performance hybrid lithium-ion capacitor", Green Chemistry, Jun. 26, 2020 (Publication date), vol. 22, pp. 4656-4668.

Julien C. Marchal et al., "A low cost, low energy route to solar grade silicon from rice hull ash (RHA), a sustainable source", The Royal Society of Chemistry 2015, Green Chem., Jun. 25, 2010, vol. 17, pp. 3931-3940, DOI: 10.1039/C5GC00622H.

Richard M. Laine et al., "Avoiding Carbothermal Reduction: Distillation of Alkoxysilanes from Biogenic, Green, and Sustainable Sources", Angew. Chem., 2016, 128, pp. 1077-1081, doi.org/10.1002/anie.201506838.

Xinyu Zhang et al., "LixSiON (x =2, 4, 6); A novel solid electrolyte system derived from agricultural waste", Green Chem., 2020, DOI: 10.1039/DOGC02580A.

Zhuqing Zhao et al., "A Natural Transporter of Silicon and Carbon: Conversion of Rice Husks to Silicon Carbide or Carbon-Silicon Hybrid for Lithium-Ion Battery Anodes via a Molten Salt Electrolysis Approach", Batteries & Supercaps 2019, Sep. 5, 2019, pp. 1007-1015, DOI: 10.1002/batt.201900091.

Changzheng Shao et al., "SiC/C composite mesoporous nanotubes as anode material for high-performance lithium-ion batteries", Materials Letters, Jun. 6, 2017, pp. 245-248, doi: 10.1016/j.matlet.2017.06.021.

Mengjie Yu et al., "Silicon Carbide (SiC) Derived from Agricultural Waste Potentially Competitive with Silicon Anodes", Green Chemistry, Apr. 22, 2022, doi:10.1039/D2GC00645F.

Mengjie Yu et al. "Adjusting SiO2: C mole ratios in rice hull ash (RHA) to control carbothermal reduction to nanostructured SiC, $Si_2N_4$ or $Si_2N_2O$ composites," Green Chemistry, Sep. 16, 2021, pp. 7751-7762, DOI:10.1039/d1gc02084f.

International Search Report and Written Opinion of the International Searching Authority, issued in PCT/US2022/042886, mailed Dec. 27, 2022; ISA/KR.

Bingkun Guo et al.; "Electrochemical reduction of nano-$SiO_2$ in hard carbon as anode material for lithium ion batteries"; Electrochemistry Communications; Sep. 30, 2008; pp. 1876-1878.

Gorthy, Padmaja et al.; "Production of Silicon Carbide from Rice Husks," Journal of the American Ceramic Society, vol. 82, No. 6; Jun. 1, 1999; pp. 1393-1400.

Janghorban, K. et al.; "Effect of Catalyst and Process Parameters on the Production of Silicon Carbide from Rice Hulls," Ceramics International, vol. 25; Jan. 1, 1999; pp. 7-12.

Search Report for corresponding EP Application No. 22868048.4 issued Jun. 25, 2025; 14 pages.

* cited by examiner

METHODS OF ADJUSTING CARBON AND SILICA CONTENT IN RICE HULL ASH (RHA) BYPRODUCTS TO CONTROL CARBOTHERMAL REDUCTION FORMING NANOSTRUCTURED SILICON CARBIDE, SILICON NITRIDE, SILICON OXYNITRIDE NANOCOMPOSITES

CROSS-REFERENCE TO RELATED APPLICATIONS

This is a 371 U.S. National Phase of International Application No. PCT/US2022/042886, filed on Sep. 8, 2022, which claims the benefit of U.S. Provisional Application No. 63/241,820 filed on Sep. 8, 2021. The entire disclosures of the above applications are incorporated herein by reference.

GOVERNMENT SUPPORT

This invention was made with government support Grant No. 1926199 awarded by the National Science Foundation. The Government has certain rights in the invention.

FIELD

The present disclosure relates to methods of making at least one of silicon carbide (SiC), silicon nitride ($Si_3N_4$), and silicon oxynitride ($Si_2N_2O$) from a rice hull ash (RHA) byproduct.

BACKGROUND

This section provides background information related to the present disclosure which is not necessarily prior art.

Rice is the second most-consumed food globally and is usually distributed in the market after polishing to remove the rice husks or rice hulls (RHs), which make up roughly 20 wt. % of as grown rice. RHs are generally considered an agricultural waste, as there are no substantial direct commercial uses for them. However, the discovery that they have approximately 15 to 20 weight % amorphous $SiO_2$ has led to various efforts to produce SiC and $Si_3N_4$ whiskers and particles. Initially, in 1975, RH was found to produce SiC by heating RHs to SiC at 1200-1500° C. under inert or reducing atmospheres. More recently, in typical processes, RHs are first coked or ashed prior to conversion to SiC or $Si_3N_4$.

However, commercial manufacture of SiC and $Si_3N_4$ from RHs has yet to be realized. Most RHs are disposed by burning rice hull ash (RHA) used primarily to enrich soil to fertilize crops grown the next season. The quantities of RH derived $SiO_2$, carbon, and residual mineral content vary depending on crop variety, growth climate, and location, as well as the temperature and duration of combustion.

Generally, RHA contains 80 to 90 wt. % amorphous $SiO_2$, while carbon and trace amounts of alkaline elements such as K, S, Ca, Mg comprise the remaining mass. Given the relatively high $SiO_2$ content, only a limited number of studies report the synthesis of SiC and $Si_3N_4$ from RHA. Those reports typically use RHA as the $SiO_2$ source, while further adding an external carbon source. In one example, RHA was pyrolyzed with a phenolic resin carbon source as a prelude to generating SiC nanowires. The RHA and resin mixture was embedded in graphite and then heated at 1600° C. In another example, a graphene carbon source and template with RHA was used to grow SiC whiskers with diameters of 30-120 nm.

Likewise, excess carbon and coincidentally formed CO gas are essential in carbothermal nitridation producing $Si_3N_4$. Typically, external sources of carbon are combined with RHA in the presence of a nitrogen containing compound (such as $NH_4OH$) to synthesize $Si_3N_4$ via hydrothermal reactions. In another example, carbothermal nitridation of RHA originating from Thailand having naturally low silicon content (only 45 weight %) created $Si_3N_4$ fibers and whiskers with no extra carbon added. However, typical RHA has a silica ($SiO_2$) content of about 80-90 weight %, which is not a viable starting point for forming SiC or $Si_3N_4$ materials, due to its low carbon content. This ratio of silica to carbon is rather typical of RHA sources worldwide; for example, $SiO_2$ to carbon at a ratio of 4:1 to 9:1, leading to the conclusion that carbon must be added to adjust stoichiometries that favor the formation of SiC and/or $SiN_xO_{4-x}$.

In addition to the variability of $SiO_2$ and carbon contents in agricultural waste materials, another barrier hinders the commercial production of SiC and $Si_3N_4$ from RH and/or RHA. As discussed above, most agricultural sources frequently contain significant quantities of impurities, closely affecting phases and morphologies, and purities of as-produced products. It would be desirable to develop methods of processing RHA to form silicon carbide (SiC) and silicon nitride ($Si_3N_4$) to address these variabilities in the compositions of the precursor rice hulls without having to add carbon sources.

SUMMARY

This section provides a general summary of the disclosure, and is not a comprehensive disclosure of its full scope or all of its features.

In certain aspects, the present disclosure relates to a method of making a silicon carbide or silicon nitride from rice hull ash (RHA) byproduct. The method optionally comprises heating a silica depleted rice hull ash product (SDRHA) comprising silicon oxide at less than or equal to about 65% by weight and carbon at greater than or equal to about 35% by weight in an environment free of any additional carbon sources, comprising an inert atmosphere, and having a temperature of greater than or equal to about 1,200° C. to less than or equal to about 1,700° C. for a carbothermal reaction that forms a product comprising at least one of silicon carbide (SiC), silicon nitride ($Si_3N_4$), and silicon oxynitride ($SiN_xO_{4-x}$, where x ranges from greater than 0 to less than 4, such as $Si_2N_2O$).

In certain aspects, the silica depleted rice hull ash (SDRHA) comprises greater than or equal to about 35% by weight to less than or equal to about 60% by weight of carbon.

In certain aspects, the silica depleted rice hull ash (SDRHA) has a ratio of $SiO_2$ to carbon ($SiO_2$:C) of about 1:8 to about 1:3.

In certain aspects, the method further comprises removing silicon oxide from a rice hull ash (RHA) byproduct to form the silica depleted rice hull ash (SDRHA) by reacting the rice hull ash (RHA) with a hindered diol in the presence of a catalytic base.

In a further aspect, the hindered diol is selected from the group consisting of: 2-methyl-2,4-pentanediol, 2,2,4-trimethyl-1,3-pentanediol, and combinations thereof.

In a further aspect, the catalytic base is selected from the group consisting of: sodium hydroxide (NaOH), lithium hydroxide (LiOH), calcium hydroxide $Ca(OH)_2$, potassium hydroxide (KOH), cesium hydroxide (CsOH), rubidium hydroxide (RbOH), and combinations thereof.

In a further aspect, the hindered diol comprises 2-methyl-2,4-pentanediol and the catalytic base comprises sodium hydroxide (NaOH).

In certain aspects, the temperature is greater than or equal to about 1,400° C. to less than or equal to about 1,600° C.

In certain aspects, the product is a nanocomposite.

In certain aspects, the product comprises greater than or equal to about 75% by weight silicon carbide (SIC).

In certain aspects, the product comprises a nanocomposite with a phase comprising silicon oxynitride ($SiN_xO_{4-x}$, where x ranges from greater than 0 to less than 4, such as $Si_2N_2O$) having nanostructures comprising at least one of silicon carbide (SiC) and silicon nitride ($Si_3N_4$) distributed therein.

In certain aspects, the method further comprises prior to the heating, milling the rice hull ash (RHA) byproduct with an acidic solution to yield a purified rice hull ash (RHA) byproduct; followed by removing silicon oxide from the purified rice hull ash (RHA) byproduct by reacting the purified rice hull ash (RHA) with a hindered diol in the presence of a catalytic base to form the silica depleted rice hull ash (SDRHA).

In certain aspects, the method further comprises after the milling, washing the purified rice hull ash (RHA) byproduct with boiling water to remove impurities.

In certain aspects, the present disclosure relates to an electroactive material for a negative electrode of an electrochemical cell that cycles lithium ions, the electroactive material comprising silicon oxynitride ($SiN_xO_{4-x}$, where x ranges from greater than 0 to less than 4, such as $Si_2N_2O$).

In certain aspects, the electroactive material comprises a nanocomposite with a phase comprising silicon oxynitride ($Si_2N_2O$ or non-stoichiometric $SiN_xO_{4-x}$, where x ranges from greater than 0 to less than 4).

In certain aspects, the nanocomposite further comprises a pyrolyzed carbon-based material.

In certain aspects, the nanocomposite further comprises at least one of silicon carbide (SiC) and silicon nitride ($Si_3N_4$) distributed in the phase comprising silicon oxynitride ($Si_2N_2O$ or non-stoichiometric $SiN_xO_{4-x}$, where x ranges from greater than 0 to less than 4).

In certain aspects, the silicon oxynitride ($Si_2N_2O$ or non-stoichiometric $SiN_xO_{4-x}$, where x ranges from greater than 0 to less than 4) is formed by heating a silica depleted rice hull ash product (SDRHA) comprising silicon oxide at less than or equal to about 65% by weight and carbon at greater than or equal to about 35% by weight in an environment free of any additional carbon sources, but comprising an inert atmosphere having nitrogen present, and having a temperature of greater than or equal to about 1,200° C. to less than or equal to about 1,700° C. for a carbothermal reaction.

In certain aspects, the silicon oxynitride comprises $Si_2N_2O$.

In certain aspects, the silicon oxynitride comprise non-stoichiometric $SiN_xO_{4-x}$, where x ranges from greater than 0 to less than 4.

In certain further aspects, the present disclosure relates to an electrode comprising the electroactive material described above and may further comprise graphite.

In certain further aspects, the electrode further comprises a polymeric binder.

In certain other aspects, the present disclosure relates to an electroactive material for a negative electrode of an electrochemical cell that cycles lithium ions, the electroactive material comprising a nanocomposite comprising silicon oxynitride ($Si_2N_2O$ or non-stoichiometric $SiN_xO_{4-x}$, where x ranges from greater than 0 to less than 4) and/or silicon carbide (SiC).

In certain aspects, the nanocomposite further comprises a pyrolyzed carbon-based material.

In certain aspects, the nanocomposite comprises silicon carbide (SIC).

In certain aspects, the nanocomposite further comprises at least one of silicon carbide (SiC) and silicon nitride ($Si_3N_4$) distributed in the phase comprising silicon oxynitride ($Si_2N_2O$ or non-stoichiometric $SiN_xO_{4-x}$, where x ranges from greater than 0 to less than 4).

In certain aspects, the silicon oxynitride comprises $Si_2N_2O$.

In certain other aspects, the silicon oxynitride comprises non-stoichiometric $SiN_xO_{4-x}$, where x ranges from greater than 0 to less than 4.

In certain further aspects, the present disclosure relates to an electrode comprising the electroactive material described above and may further comprise graphite.

In certain further aspects, the electrode further comprises a polymeric binder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1C. FIG. 1A is an XRD of rice hull ash (RHA) and silica depleted rice hull ash ($SDRHA_{60}$) with 60 weight % silica. FIG. 1B is an SEM of RHA and FIG. 1C is an SEM of $SDRHA_{60}$.

FIGS. 2A-2C. FIG. 2A is an XPS survey scan, FIG. 2B is a TGA, and FIG. 2C is an $N_2$ adsorption-desorption isothermal plots of RHA and $SDRHA_{60}$.

FIGS. 3A-3C. XRDs from heating $SDRHA_{60}$ at 1430-1500° C./8 hours/Ar (FIG. 3A) and $SDRHA_{60}$ at 1500° C. for various times (FIG. 3B). FIG. 3C shows heating $SDRHA_{40-60}$ at 1400° C./10 hours/Ar.

FIGS. 4A-4B. XRDs from heating $SDRHA_{60}$ at 1400/8 hours/$N_2$, 1500° C./4 hours/$N_2$, 1500° C./8 h/$N_2$ (FIG. 4A) and $SDRHA_{65}$ at 1500° C./$N_2$ for various times (FIG. 4B).

FIG. 5 shows XRDs from heating $SDRHA_{65}$ at 1500° C. for various times under $N_2/H_2$ with different ratios (95/5 and 85/15).

FIGS. 6A-6D. Representative optical images of SiC (FIG. 6A) with and without (FIG. 6B) 13 wt. % carbon, and $Si_3N_4$ (FIG. 6C) with and without (FIG. 6D) 24 wt. % carbon.

FIGS. 7A-7F. Representative TGA curves of SiC (FIG. 7A). $Si_3N_4$ (FIG. 7B), $Si_2N_2O$ (FIG. 7C) composites, and representative FTIR spectra of SiC (FIG. 7D), $Si_3N_4$ (FIG. 7E) composites with and without carbon, and $Si_2N_2O$ composites (FIG. 7F) from different heat treatments.

FIGS. 8A-8B. Representative XPS wide survey and element analysis, and core-level spectra of SiC (FIG. 8A) and. $Si_3N_4$ (FIG. 8B) composites.

FIGS. 9A-9D. Representative SEM and EDX images of SiC/C composites (FIG. 9A), and SiC (FIG. 9B), $Si_3N_4$ (FIG. 9C) and $Si_2N_2O$ (FIG. 9D) after oxidative removal of hard carbon.

FIGS. 10A-10B. Representative isotherm plots of SiC (FIG. 10A) and $Si_3N_4$ (FIG. 10B) from different heat-treatments.

FIGS. 11A-11B. Capacitance-voltage (CV) (FIG. 11A) and voltage-capacity curves (FIG. 11B) of SiC—C/Li half cells.

Figure 15A:
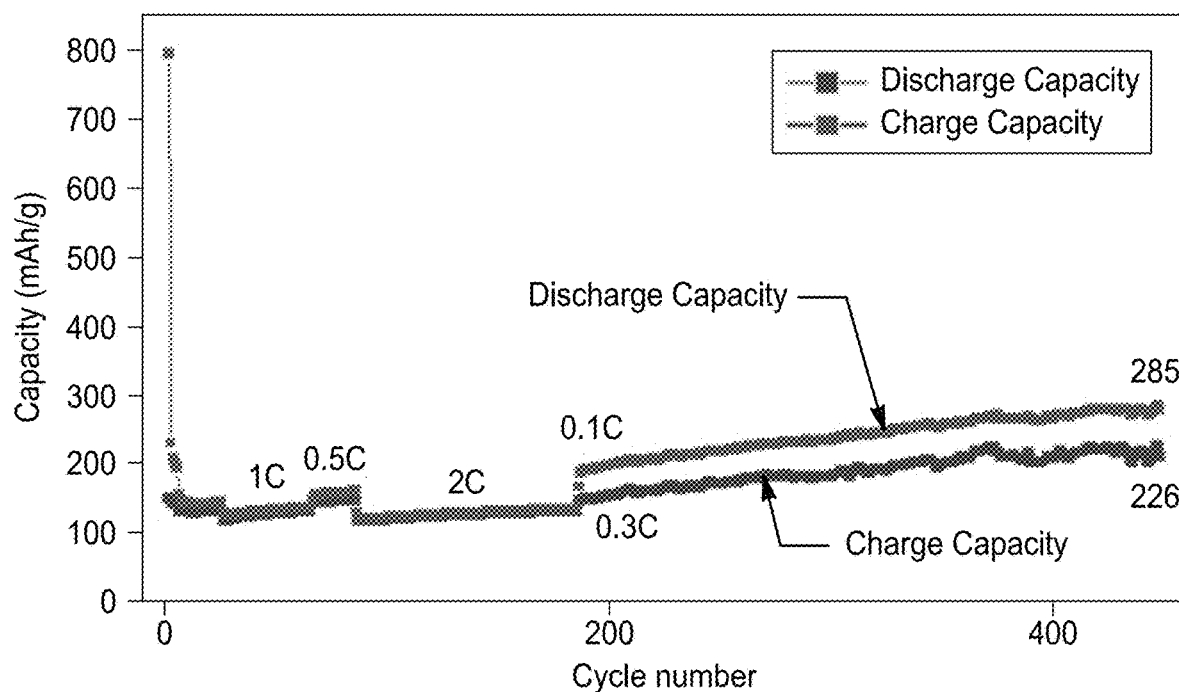
Figure 15B:
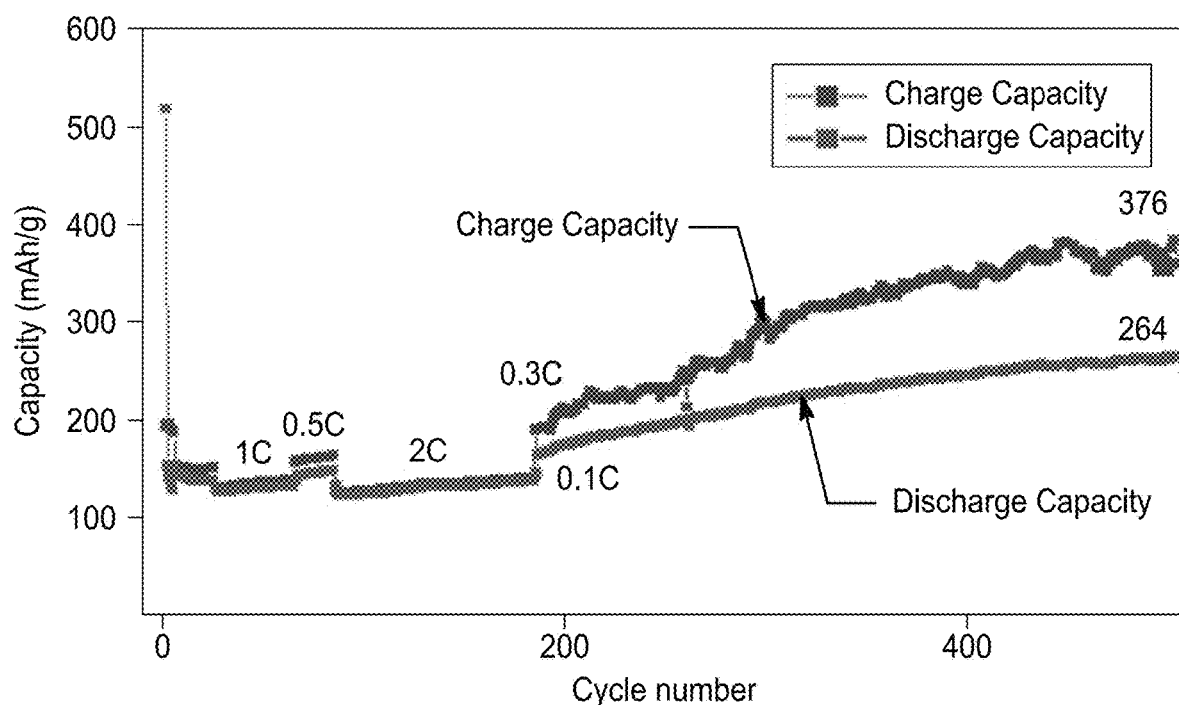

FIGS. 15A-15B. Specific capacity versus cycles of $Si_2N_2O$ (88)/Li (FIG. 15A) and $Si_2N_2O$ (84)/Li half-cell (FIG. 15B).

Figure 16:
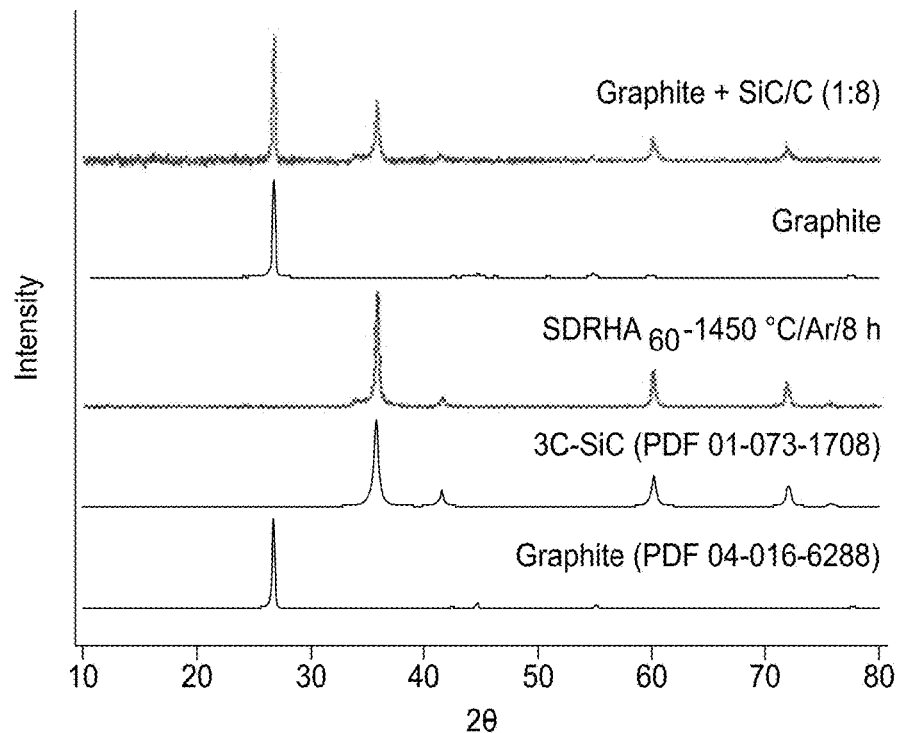

FIG. 16 shows an XRD of SiC/C before and after mixing with graphite.

Figures 17A, 17B:
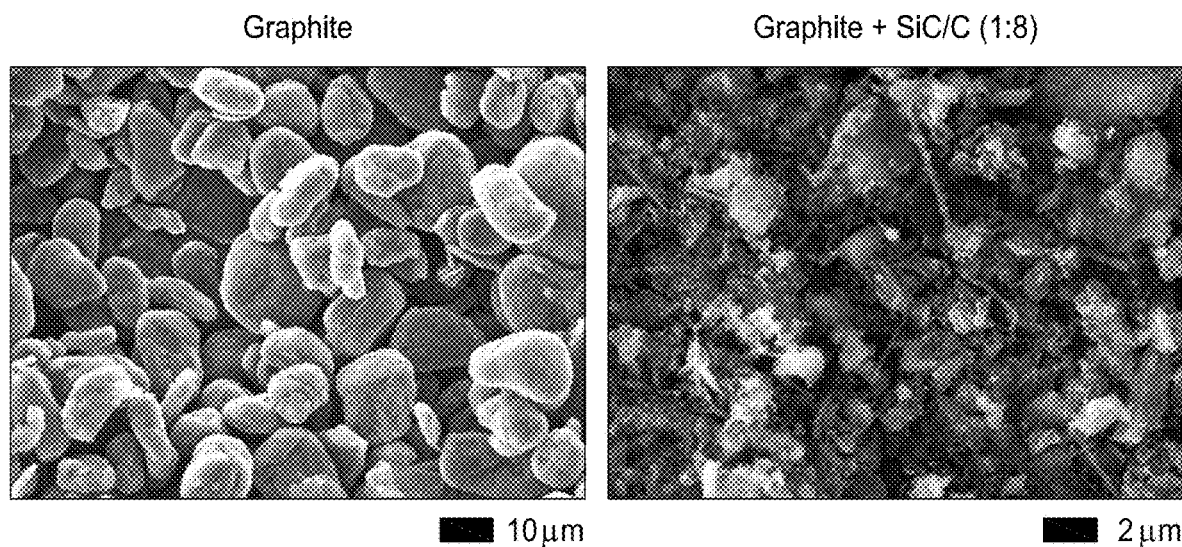

FIGS. 17A-17B show SEM images of graphite (FIG. 17A) and SiC/C after mixing with 10 wt. % graphite (FIG. 17B).

Figure 18A:
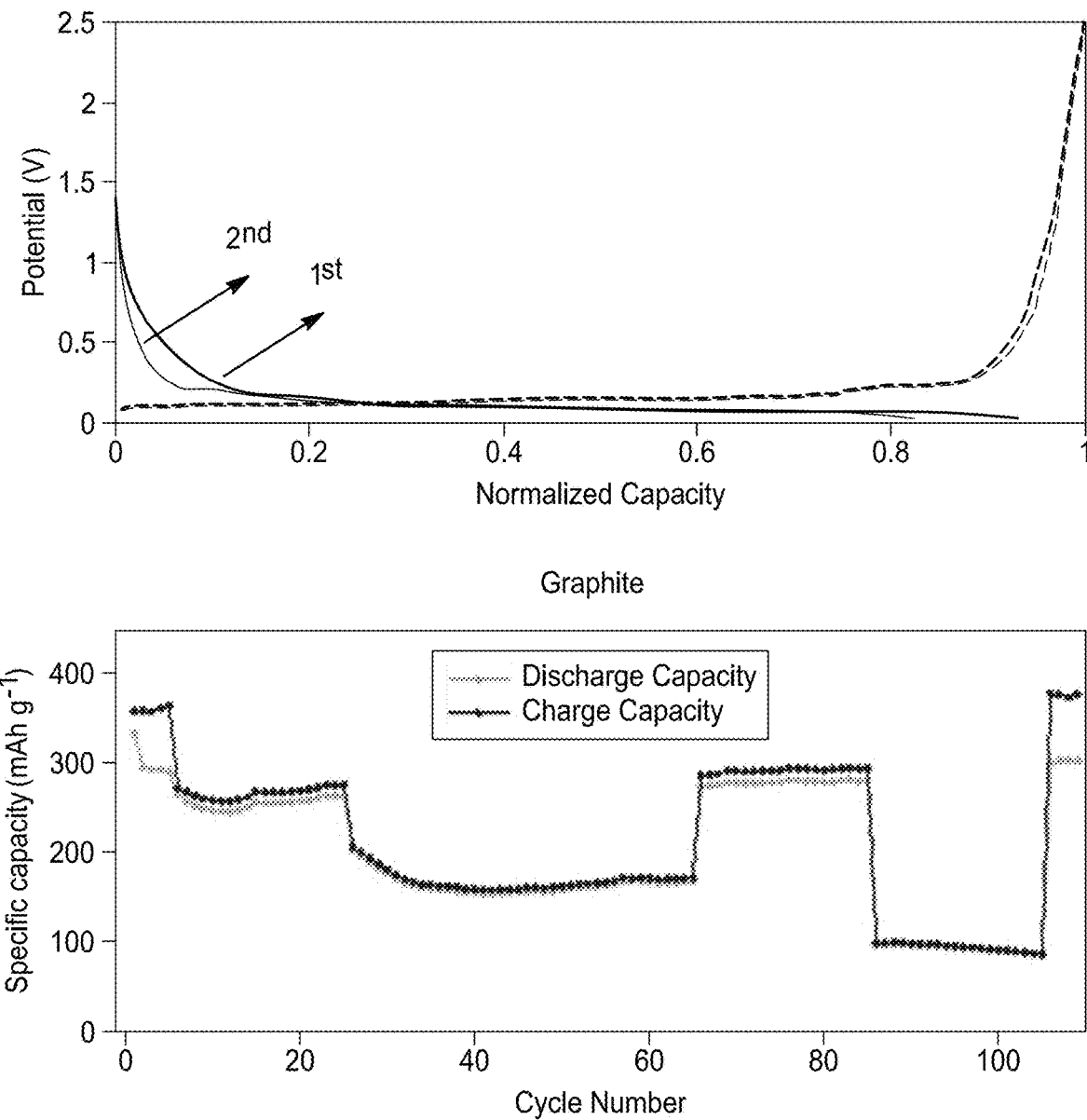
Figure 18B:
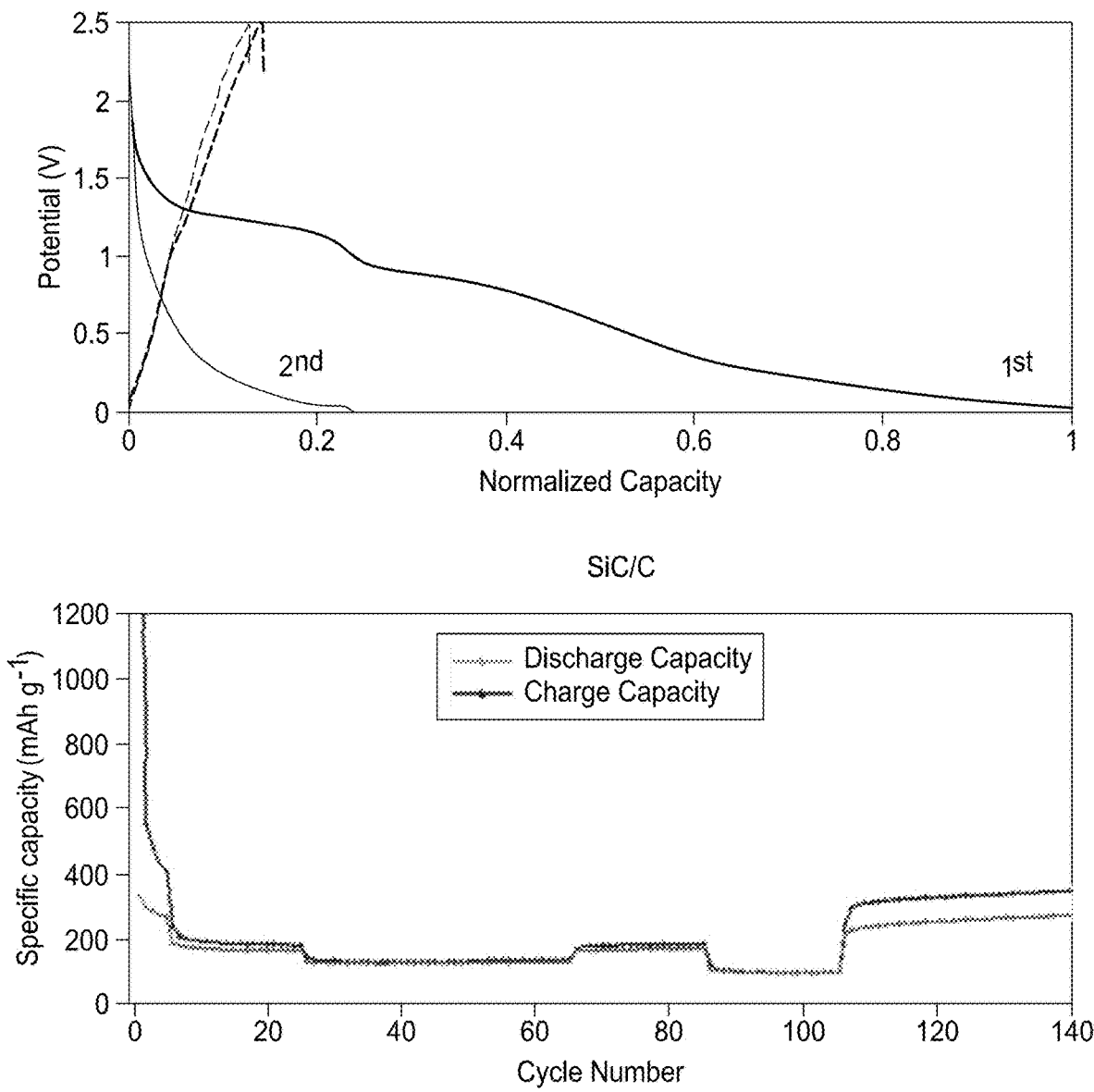
Figure 18C:
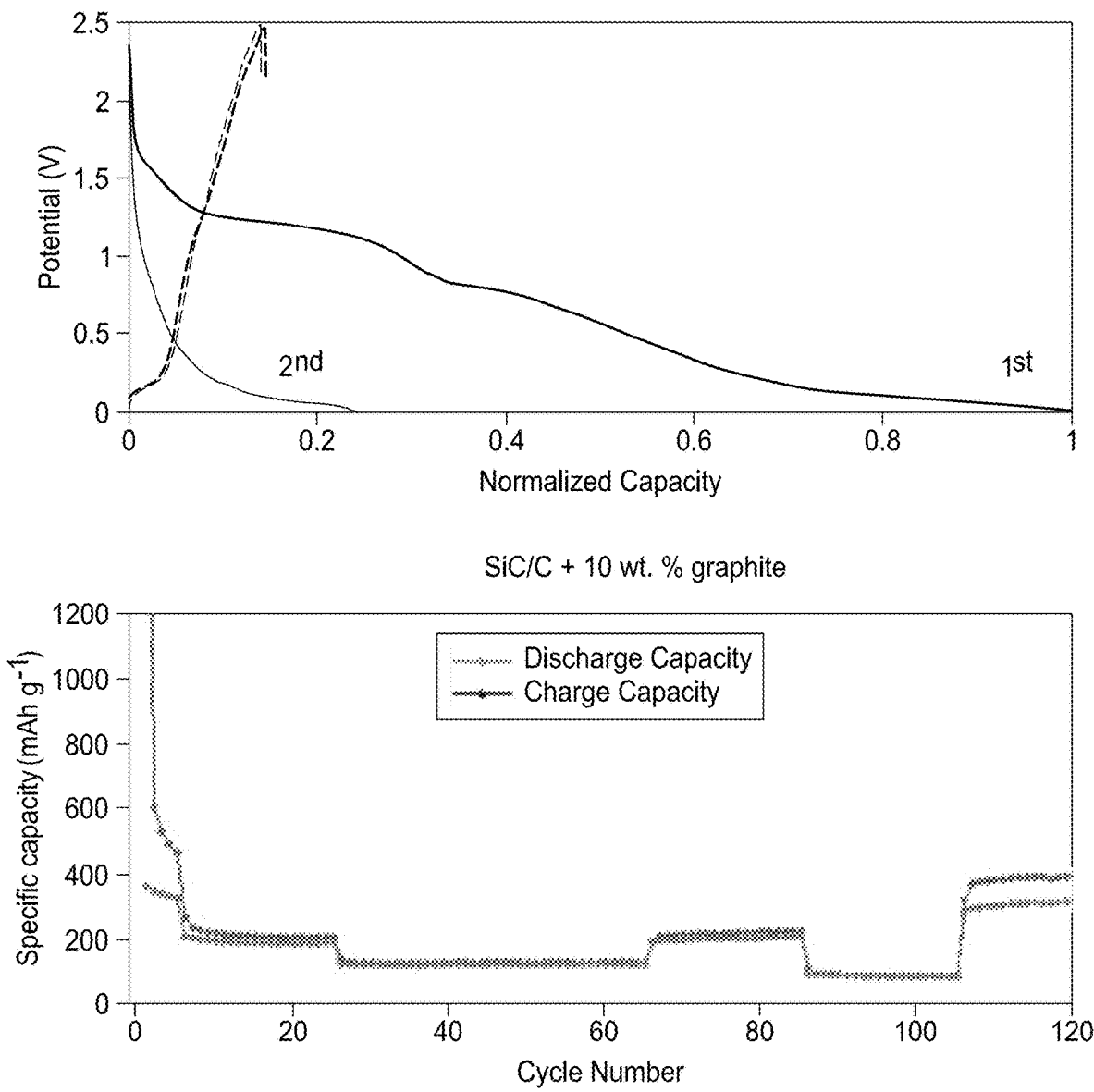
Figure 18D:
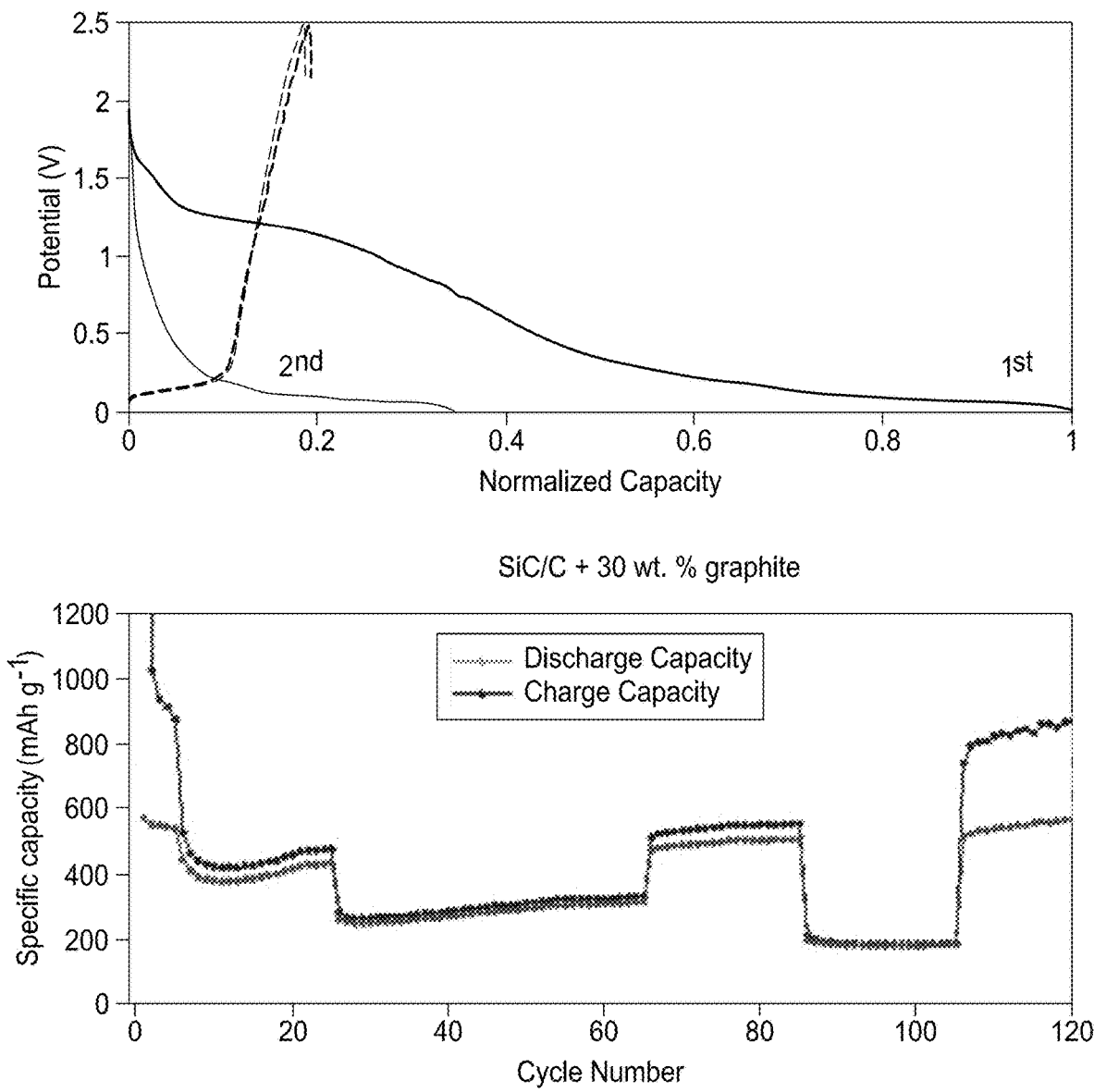

FIGS. 18A-18D show representative voltage profiles of the first and second cycles at 0.1C, and first cycle at 0.5C, 1C, and 2C; and specific capacity versus cycle number of: a graphite/Li half-cell (FIG. 18A), SiC/C half-cell (FIG. 18A), SiC/C and 10 wt. % graphite half-cell (FIG. 18C), and SiC/C and 30 wt. % graphite half-cell (FIG. 18D).

Figure 19A:
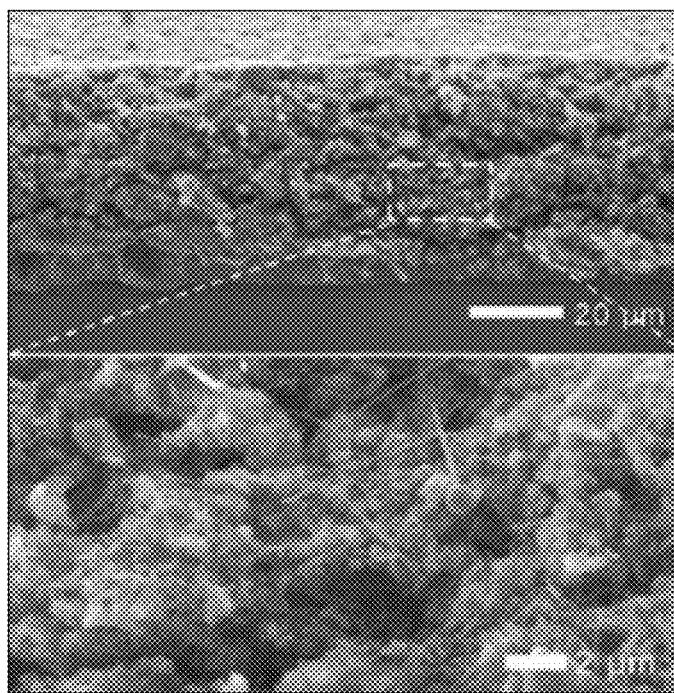
Figure 19B:
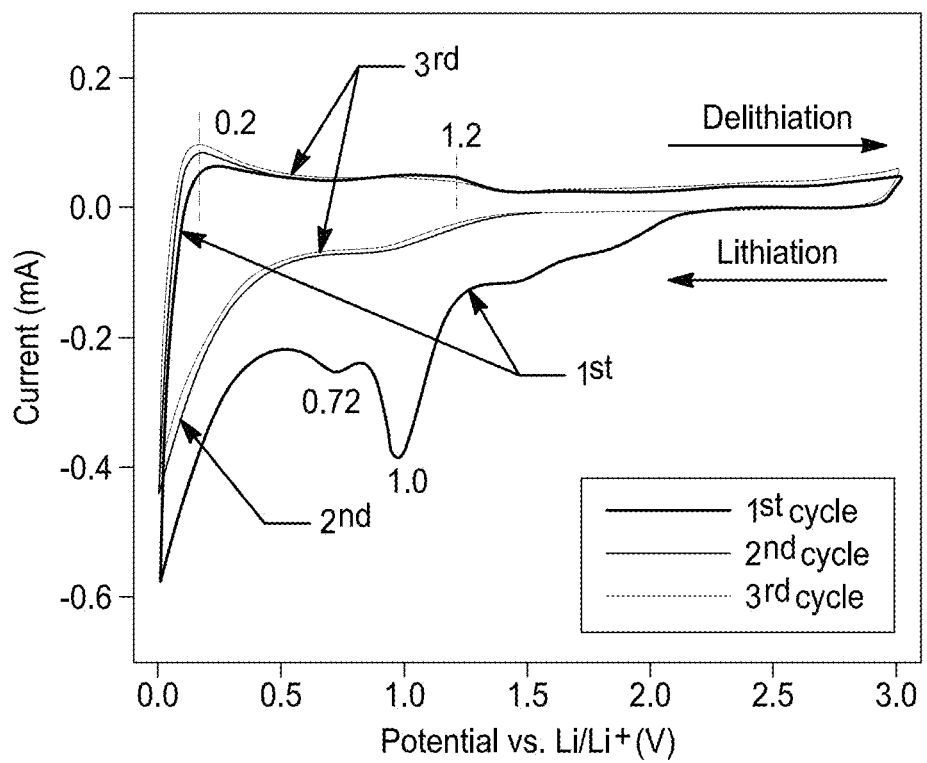
Figure 19C:
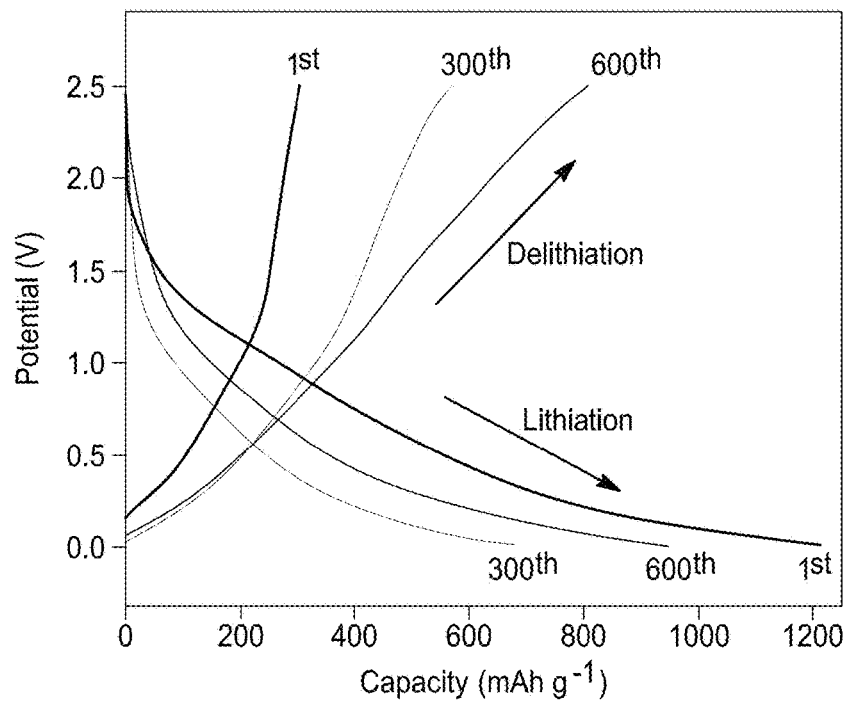
Figure 19D:
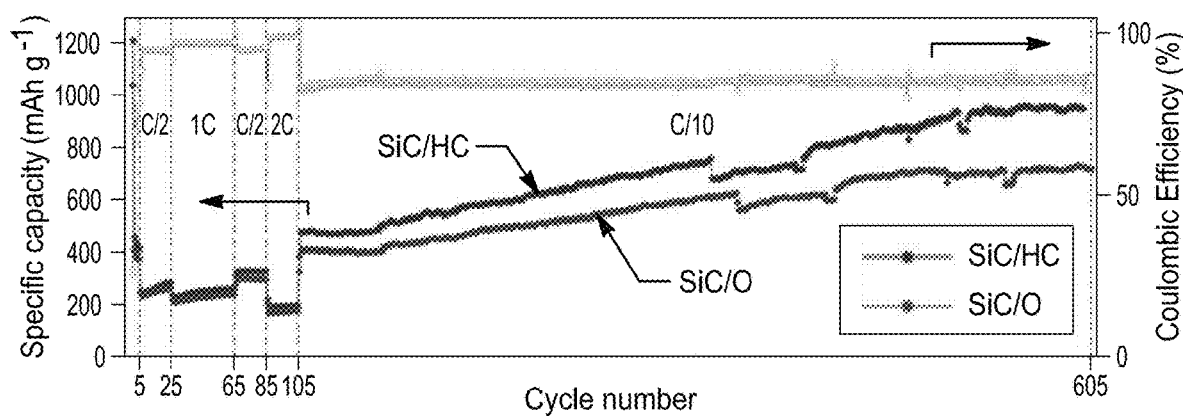
Figure 19E:
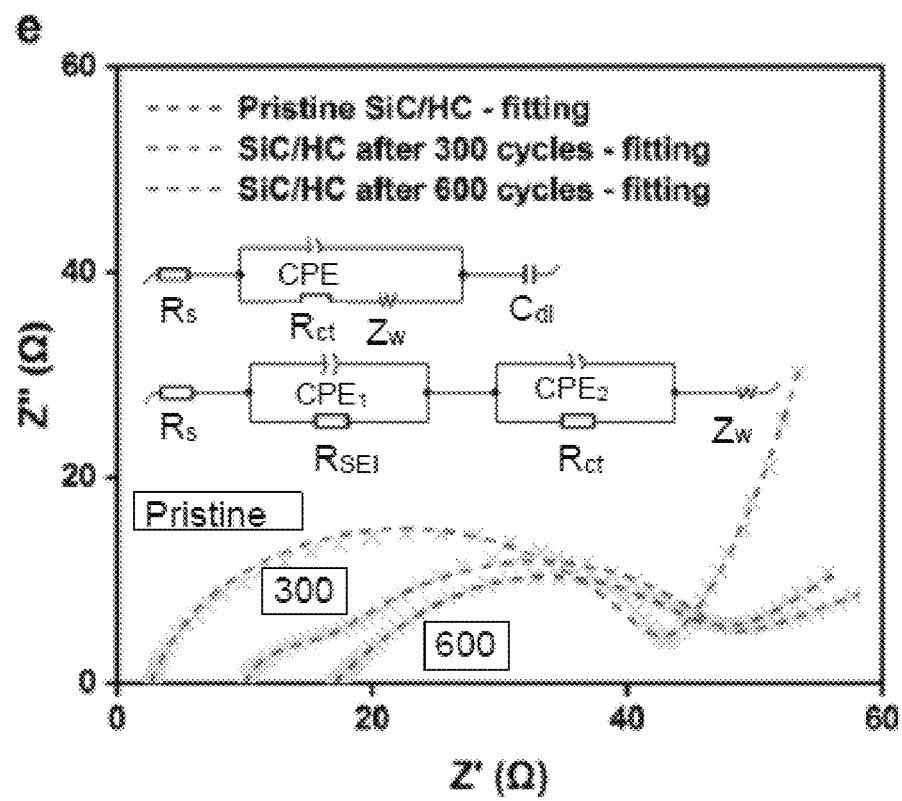

FIGS. 19A-19E. FIG. 19A shows SEM images of a cross-section of an SiC/HC electrode prepared in accordance with certain aspects of the present disclosure (with the upper SEM image having a scale bar of 20 micrometers and the magnified portion shown in the lower SEM image having a scale bar of 2 micrometers), FIG. 19B shows CV scanning curves of the SiC/HC electrode, FIG. 19C shows charge/discharge curves of the SiC/HC electrode, FIG. 19D shows specific capacity versus cycle number of SiC/HC and SiC/O electrodes, and FIG. 19E shows Nyquist plots (equivalent circuit model) of SiC/HC half cells before and after 300 and 600 cycles at 0.1C (inset: shows equivalent circuits).

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternately be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be used only to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure pertains to methods of forming silicon carbide (SiC), silicon nitride ($Si_3N_4$), and/or silicon oxynitride ($Si_2N_2O$) from a silica depleted rice husk/hull ash product. In various aspects, while the present disclosure contemplates rice hulls as a preferred source of silicon and carbon, other biogenic silica and carbon sources (biomass, e.g., coconut husks) including grasses (e.g., wheat, rice, corn, barley, oats, and the like) that take up $SiO_2$ in their stalks and seed hulls may also be used and processed as described herein. Rice hulls (RH) have the highest silica content of all grasses. Ashes of these other biogenic sources are thus contemplated in alternative variations. Waste starting materials for fabricating SiC and $Si_3N_4$ may offer several advantages: (1) the environmental benefits related to a reduced carbon footprint; (2) the economical disposal of waste materials; (3) improved properties arising from reduction of product particle sizes enabled by initiating production using nanoscale mixtures, and (4) economization of energy and capital equipment costs due to decreases in processing temperatures and times.

Combustion followed by stoichiometric alkali treatment is a common, conventional method of extracting $SiO_2$ from RHA (reaction 1) to produce silica depleted RHA or SDRHA.

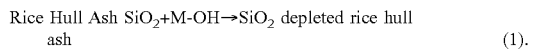  (1).

However, this two-step process defeats the original advantage of intimately (nanoscale) mixed carbon and $SiO_2$ that enables low-cost production of SiC and $Si_3N_4$ from RHA. Furthermore, any trace minerals present in the RHA remain in the SDRHA, leading to relatively high levels of impurities in any formed products.

The present disclosure provides a new method of forming silicon carbide (SiC), silicon nitride ($Si_3N_4$), and/or silicon oxynitride ($Si_2N_2O$) using an acid purified rice hull ash (RHA) that is processed to have advantageously adjusted silica content in a silica depleted rice hull ash product (SDRHA). More specifically, the methods advantageously provide the ability to conduct a carbothermal reduction reaction with a silica depleted rice hull ash product (SDRHA) having advantageously adjusted silicon and carbon contents, without any need to add an external carbon source. The present methods are provided by controlling the silica ($SiO_2$) content in the silica depleted rice hull ash product (SDRHA) to arrive at a SRDHA precursor having a sufficiently large carbon content, such that the precursor can be heated at relatively low temperatures for a direct carbothermal reduction reaction to form a product that comprises at least one of silicon carbide (SiC), silicon nitride ($Si_3N_4$), and silicon oxynitride ($Si_2N_2O$). In the past, in contrast to the present technology, carbon had to be added to carefully adjust the $SiO_2$:C stoichiometry. Further, in conventional processes the particle size of the reactants was at a minimum micron sized, whereas in various aspects, the reactants used in the present disclosure may all be on the nanoscale, for example, having at least one spatial dimension that is less than about 1 micrometer (i.e., 1,000 nm).

For example, rather than introducing extra carbon from an external source as has been required in the past, a ratio of $SiO_2$:C is optimized by distillative removal of $SiO_2$ from RHA to produce SDRHA with different $SiO_2$:C ratios, while also eliminating typical impurities. The present disclosure contemplates removing $SiO_2$ from RHA by forming distillable spirosiloxane per reaction (2):

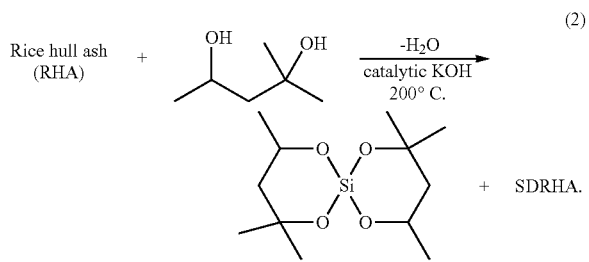

For example, $SiO_2$ can be extracted from RHA as spirosiloxane (shown above), $\{[(CH_3)_2C(O)CH_2CH(O)CH_3)]_2Si\}$, an approximately 90:10 nanocomposite mixture of $SiO_2$:C, to carefully control a mole ratio of C:$SiO_2$ to permit direct carbothermal reduction to form SiC, $Si_3N_4$, or $Si_2N_2O$ without any need to add extra carbon and as a mechanism to preserve the original nanocomposite structure. Notably, the extraction of $SiO_2$ from RHA to form spirosiloxanes can also be achieved with other hindered glycols, such as, 2,2,4-trimethyl-1,3-pentanediol.

The RHA may first be washed in an acid. In one variation, rice hull ash (RHA) may be milled (e.g., with a milling or grinding media) with an acid for washing to remove impurities. The acid may be a dilute acid, such as hydrochloric acid, sulfuric acid, phosphoric acid, and combinations thereof. In one variation, a dilute hydrochloric acid may be used. In certain variations, a dilute acid may be one that is present in a solution at less than or equal to about 20 weight %, optionally less than or equal to about 12 weight %, optionally less than or equal to about 10 weight %, optionally greater than or equal to about 1 weight % to less than or equal to about 12 weight %, in one variation, optionally greater than or equal to about 1 weight % to less than or equal to about 10 weight % or in another variation, optionally greater than or equal to about 5 weight % to less than or equal to about 12 weight %.

The milled and acid washed RHA may then be washed with boiling water in at least one wash cycle, optionally multiple wash cycles. The acid and boiling water prewashing of RHA with milling provides an advantage in that it eliminates typical product impurities found in RHA, compared to those found in conventional agricultural waste precursors, which can provide highly pure products after conventional carbothermal reduction. Milling RHA in dilute acid followed by washing with boiling water provides SDRHA with very low impurity levels to the point where it is now possible to process solar-grade silicon (99.999% pure) from this SDRHA. In certain aspects, the SDRHA has less than or equal to about 1% by weight of undesired impurities, like minerals, multiple metals, boron, and aluminum, optionally less than or equal to about 0.5% by weight, optionally less than or equal to about 0.1% by weight impurities and in certain variations, may be as low as about 0.01% by weight or less than about 1 ppm impurities.

The methods of the present disclosure thus contemplate adjusting the silicon and carbon content from a RHA to form a silica depleted rice hull ash (SDRHA) having predetermined range of silicon and carbon contents that advantageously can form the desired SiC, $Si_3N_4$, and $SiN_xO_{4-x}$ products, where x ranges from 0 to 4, after carbothermal reduction in the absence of any added carbon sources.

In certain aspects, the treated silica depleted rice hull ash (SDRHA) comprises greater than or equal to about 10% by weight to less than or equal to about 60% by weight of carbon for a total weight of the SDRHA, optionally greater than or equal to about 40% by weight to less than or equal to about 60% by weight of carbon for a total weight of the SDRHA. The treated SDRHA may thus have greater than or equal to about 20% by weight to less than or equal to about 65% by weight silicon for a total weight of the SDRHA, optionally greater than or equal to about 35% by weight to less than or equal to about 60% by weight of carbon for a total weight of the SDRHA.

The silicon to carbon content can be reflected by a ratio of moles of silicon dioxide or silica ($SiO_2$) to moles of carbon. The $SiO_2$:C ratio can be adjusted by reacting the initial acid washed RHA material with a hindered diol in the presence of catalytic base to distillatively remove excess $SiO_2$ to produce the treated SDRHA with the desired silica to carbon ratios. For example, the treated SDRHA may have a ratio of $SiO_2$ to carbon ($SiO_2$:C) of about 1:8 to about 1:3, optionally about 2:15 to about 13:35.

Suitable hindered diols for treating the RHA to adjust silicon and carbon contents may be selected from the group consisting of 2-methyl-2,4-pentanediol (hexylene glycol), 2,2,4-trimethyl-1,3-pentanediol, and combinations thereof. In certain aspects, a combination of hindered diols may be used, including those just listed above and optionally further including ethane-1,2-diol. In one aspect, the hindered diol comprises 2-methyl-2,4-pentanediol (hexylene glycol).

Suitable catalytic bases may include those selected from the group consisting of: sodium hydroxide (NaOH), lithium hydroxide (LiOH), calcium hydroxide $Ca(OH)_2$, potassium hydroxide (KOH), cesium hydroxide (CsOH), rubidium hydroxide (RbOH), and combinations thereof.

In one particular variation, the SDRHA is formed from RHA by using a hindered diol comprising 2-methyl-2,4-pentanediol and a catalytic base comprising sodium hydroxide (NaOH).

In various aspects, the methods may comprise heating a silica depleted rice hull ash product (SDRHA) comprising silicon oxide at less than or equal to about 65% by weight and carbon at greater than or equal to about 35% by weight in an environment free of any additional carbon sources, comprising an inert or reducing atmosphere, and having a temperature of greater than or equal to about 1,200° C. to less than or equal to about 1,j700° C. for a carbothermal reaction that forms a product comprising at least one of silicon carbide (SiC), silicon nitride ($Si_3N_4$), and silicon oxynitride ($SiN_xO_{4-x}$). The heating may be done in a furnace, for example, in an electric arc furnace.

By an environment free of external or additional carbon sources, it is meant that the only source of carbon comes from the SDRHA used as a precursor. While trace amounts of carbon may be present in the surrounding atmosphere, for example, as carbon monoxide (CO), generally such amounts of carbon are limited, for example, to less than or equal to about 0.1 weight %. By an inert or reducing atmosphere, it is meant that the gaseous atmosphere is generally free of reactive non-carbon containing oxidant species, such as oxygen containing species (e.g., $O_2$, NOx, and the like). Suitable inert or reducing atmospheres include nitrogen ($N_2$), argon (Ar), and/or $N_2/H_2$, by way of example. In certain aspects, the carbon source consists essentially of, or alternatively consists of, SDRHA in the carbothermal reaction process.

The reactants may be subjected to heat and/or microwave energy to achieve carbothermal reduction. In certain variations, the environment is heated to a temperature of greater than or equal to about 1,400° C. to less than or equal to about 1,600° C. during the carbothermal reduction process, optionally greater than or equal to about 1,400° C. to less than or equal to about 1,500° C. in certain variations. The reactants may be subjected to these temperatures for a duration of greater than or equal to about 6 hours, optionally greater than or equal to about 7 hours, optionally greater than or equal to about 8 hours, optionally greater than or equal to about 9 hours, and in certain variations, optionally greater than or equal to about 10 hours.

After conducting the heating for carbothermal reduction, the product formed may comprise greater than or equal to about 50% by weight, optionally greater than or equal to about 65% by weight, optionally greater than or equal to about 75% by weight, and in certain aspects, optionally greater than or equal to about 80% by weight silicon carbide (SiC) or $Si_3N_4$ or $SiN_xO_{4-x}$, in certain variations.

As noted above, the RHA/SDRHA has a nanocomposite structure after being treated that is generally preserved after the heating and carbothermal reduction process that can form a composite or nanocomposite product. In certain variations, a nanocomposite is a structure that includes a primary phase or matrix with a plurality of nanostructures distributed therein. Nanostructures may include "nano-sized" or "nanometer-sized" particles having at least one spatial dimension that is less than about 1 μm (i.e., 1,000 nm), optionally less than about 0.5 μm (i.e., 500 nm), optionally less than about 0.4 μm (i.e., 400 nm), optionally less than about 0.3 μm (i.e., 300 nm), optionally less than about 0.2 μm (i.e., 200 nm), and in certain variations, optionally less than about 0.1 μm (i.e., 100 nm). Accordingly, a nanoparticle component has at least one spatial dimension that is greater than about 1 nm and less than about 1,000 nm (1 μm). It should be noted that so long as at least one dimension of the nanoparticle falls within the above-described nano-sized scale (for example, diameter), one or more other axes may well exceed the nano-size (for example, length and/or width). In certain variations, the nanocomposite includes a phase comprising silicon oxynitride ($SiN_xO_{4-x}$ where x ranges from greater than 0 to less than 4) having a plurality of nanostructures distributed therein that may comprise at least one of silicon carbide (SiC) and silicon nitride ($Si_3N_4$). For example, whiskers appear as long rod-like structures intertwined with rounder particles, including simultaneously formed SiC and $Si_3N_4$ particles, and residual carbon. The product formed may also comprise other components, such as residual carbon (e.g., hard carbon) and/or unreacted or partially reacted silica (e.g., cristobalite). The product may be processed for oxidative removal of carbon in certain variations. An amount of $Si_2N_2O$ and/or non-stoichiometric $SiN_xO_{4-x}$, where x ranges from greater than 0 to less than 4, present in the final product is related to a duration of the heating and/or temperature during the carbothermal reduction reaction that occurs, where longer durations and/or higher temperatures result in less oxygen (and thus favor formation of silicon carbide and silicon nitride, rather than silicon oxynitride). Preferential formation of silicon carbides can be controlled during the carbothermal reduction reaction by controlling or minimizing an amount of nitrogen present in the environment, so that lower nitrogen content favors formation of SiC, while higher nitrogen content in the environment favors formation of $Si_3N_4$ and $Si_2N_2O$ and/or non-stoichiometric $SiN_xO_{4-x}$ in addition to SiC. In one variation, the carbothermal reduction product formed by the present methods comprises greater than or equal to about 75% by weight silicon carbide (SiC). In another variation, the carbothermal reduction product formed by the present methods comprises greater than or equal to about 75% by weight silicon nitride ($Si_3N_4$). In yet another variation, the carbothermal reduction product formed by the present methods comprises greater than or equal to about 75% by weight $Si_2N_2O$ and/or non-stoichiometric $SiN_xO_{4-x}$, where x ranges from 0 to 4. In certain aspects, composites formed in accordance with certain aspects of the present disclosure have $Si_2N_2O$ and/or non-stoichiometric $SiN_xO_{4-x}$ as the major phase, for example, greater than or equal to about 80 weight %, which may be produced by heating SDRHA under $N_2/H_2$ atmosphere.

In certain aspects, the product formed by the methods of the present disclosure may be mixtures of SiC nanostructures, such as SiC round or agglomerated particles and SiC axial geometry particles (having an evident long axis, such as whiskers, cylinders, wires, and the like). In certain variations, the nanostructures comprising SiC may have a BET specific surface area (SSA) of greater than or equal to about 10 $m^2/g$, optionally greater than or equal to about 20 $m^2/g$, optionally greater than or equal to about 30 $m^2/g$ and in certain variations, optionally greater than or equal to about 40 $m^2/g$. In one variation, the SSA of SiC is as high as about 44 $m^2/g$. The SiC axial geometry particles (e.g., whiskers) may have a diameter of greater than or equal to about 100 nm to less than or equal to about 140 nm with lengths of up to about 5 μm. The SiC round or agglomerated particles may have an average diameter of greater than or equal to about 10 nm to less than or equal to about 200 nm.

In certain variations, the nanostructures comprising $Si_3N_4$ may have a BET specific surface area (SSA) of greater than or equal to about 10 $m^2/g$, optionally greater than or equal to about 20 $m^2/g$, and in certain variations, optionally greater than or equal to about 25 $m^2/g$. In one variation, the SSA of $Si_3N_4$ is about 30 $m^2/g$, when heated at 1400-1500° C. for 4-8 hours. The $Si_3N_4$ particles may be in the form of irregular aggregates mixed with long whiskers having average diameters of greater than or equal to about 100 nm to less than or equal to about 200 nm that predominate and are several micrometers in length.

In certain other variations, the nanostructures comprising $Si_2N_2O$ may have a BET specific surface area (SSA) of greater than or equal to about 1 $m^2/g$, optionally greater than or equal to about 3 $m^2/g$, optionally greater than or equal to about 5 $m^2/g$, and in certain variations, optionally greater than or equal to about 9 $m^2/g$. In one variation, the SSA of $Si_2N_2O$ is about 10 $m^2/g$, when $SDRHA_{65}$ is heated at 1500° C. for 8 hours in an atmosphere of 95% $N_2$-5% $H_2$.

Where carbon is present in the nanocomposite, the nanocomposite may have a BET specific surface area (SSA) of greater than or equal to about 150 $m^2/g$, optionally greater than or equal to about 175 $m^2/g$, optionally greater than or equal to about 200 $m^2/g$, and in certain variations, optionally greater than or equal to about 220 $m^2/g$.

The present methods provide a more environmentally- and economically-friendly approach that can eliminate trace impurities, for example, limiting the alkali metal amounts to reduce their presence as impurities, while advantageously adjusting the $SiO_2$ content to enhance carbon content while preserving microstructures in the nanocomposite product formed.

In certain variations, the present disclosure contemplates an electroactive material for an electrode in an electrochemical cell, such as a lithium ion battery, formed in accordance with certain aspects of the present disclosure. The electroactive material may be used in a negative electrode or anode. In certain variations, the electrode may be a porous composite electrode where the electroactive material and optional additional solid components may be mixed with and distributed in a polymeric binder to provide further mechanical integrity to the electrode.

Suitable polymeric binders may include polyvinylidene difluoride (PVdF), polyacrylic acid polyamic (PAA), acid, polyamide, polyimide, polysulfone, polytetrafluoroethylene (PTFE), polychlorotrifluoroethylene, carboxymethyl cellulose (CMC), ethylene propylene diene monomer (EPDM) rubber, nitrile butadiene rubber (NBR), styrene-butadiene rubber (SBR), lithium polyacrylate (LiPAA), sodium polyacrylate (NaPAA), lithium alginate, and/or sodium alginate. The additional particulate components may include electrically conductive materials. In certain variations, the additional particulate materials may be carbon-containing materials, like carbon black or graphite.

As recognized by those of skill in the art, the electrochemical cell may further comprise a negative current collector in electrical communication with the negative electrode, positive electrode, a positive current collector in electrical communication with the positive electrode, an electrolyte, and an optional separator (in the case that the electrolyte comprises a liquid electrolyte), among other components.

In one variation, the electroactive material comprises silicon carbide and/or silicon oxynitride ($Si_2N_2O$ and/or non-stoichiometric $SiN_xO_{4-x}$ where x ranges from greater than 0 to less than 4).

In certain aspects, the electroactive material comprises a nanocomposite with a phase comprising silicon oxynitride ($Si_2N_2O$ and/or non-stoichiometric $SiN_xO_{4-x}$, where x ranges from greater than 0 to less than 4). The nanocomposite may further comprise a pyrolyzed carbon-based material (e.g., hard carbon). In certain variations, the electroactive material may comprise a product that is a composite comprising $Si_2N_2O$ and one or more of hard carbon, SiC, and/or $Si_3N_4$ distributed therein. Thus, the nanocomposite further comprises at least one of silicon carbide (SiC) and silicon nitride ($Si_3N_4$) distributed in the phase comprising silicon oxynitride ($Si_2N_2O$ and/or non-stoichiometric $SiN_xO_{4-x}$). Such a nanocomposite may also include hard carbon and potentially traces of silica ($SiO_2$) or SiC. In certain aspects, the silicon oxynitride ($Si_2N_2O$) or non-stoichiometric $SiN_xO_{4-x}$ is formed by any of the processes described above. For example, the process may involve heating a silica depleted rice hull ash product (SDRHA) comprising silicon oxide at less than or equal to about 65% by weight and carbon at greater than or equal to about 35% by weight in an environment free of any additional carbon sources, but comprising an inert atmosphere having nitrogen present, and having a temperature of greater than or equal to about 1,200° C. to less than or equal to about 1,700° C. for a carbothermal reaction.

In certain variations, the electroactive material has a high purity level (due to the precursor RHA being acid washed and boiled), for example, comprising greater than or equal to about 99% of electroactive materials, like silicon carbide (SiC) and/or silicon oxynitride ($Si_2N_2O$ and/or non-stoichiometric $SiN_xO_{4-x}$, where x is greater than 0 and less than 4).

In another variation, the electroactive material for a negative electrode may comprise SiC, hard carbon, or $Si_3N_4$ and hard carbon.

In certain variations, an electroactive material for a negative electrode of an electrochemical cell that cycles lithium ions is provided. The electroactive material comprising silicon oxynitride ($Si_2N_2O$ or non-stoichiometric $SiN_xO_{4-x}$, where x ranges from greater than 0 to less than 4). The electroactive material may comprise a nanocomposite with a phase comprising silicon oxynitride ($Si_2N_2O$ or non-stoichiometric $SiN_xO_{4-x}$, where x ranges from greater than 0 to less than 4). In certain aspects, the nanocomposite further comprises a pyrolyzed carbon-based material. In certain other aspects, the nanocomposite further comprises at least one of silicon carbide (SiC) and silicon nitride ($Si_3N_4$) distributed in the phase comprising silicon oxynitride ($Si_2N_2O$ or non-stoichiometric $SiN_xO_{4-x}$, where x ranges from greater than 0 to less than 4).

In one variation, the silicon oxynitride ($Si_2N_2O$ or non-stoichiometric $SiN_xO_{4-x}$, where x ranges from greater than 0 to less than 4) is formed by heating a silica depleted rice hull ash product (SDRHA) comprising silicon oxide at less than or equal to about 65% by weight and carbon at greater than or equal to about 35% by weight in an environment free of any additional carbon sources, but comprising an inert atmosphere having nitrogen present, and having a temperature of greater than or equal to about 1,200° C. to less than or equal to about 1,700° C. for a carbothermal reaction.

In certain aspects, the silicon oxynitride comprises $Si_2N_2O$. In certain other aspects, the silicon oxynitride comprise non-stoichiometric $SiN_xO_{4-x}$, where x ranges from greater than 0 to less than 4.

The electrode comprising such an electroactive material may further comprise graphite. In certain variations, the electrode may further comprise an electrically conductive material such as carbon black particles, by way of non-limiting example. Further, the electrode may also comprise a polymeric binder in which the electroactive material and optional graphite particles, optional electrically conductive particles like carbon black, and the like and may be mixed and/or distributed.

In yet other variations, an electroactive material for a negative electrode of an electrochemical cell that cycles lithium ions is provided, where the electroactive material comprises a nanocomposite comprising silicon oxynitride ($Si_2N_2O$ or non-stoichiometric $SiN_xO_{4-x}$, where x ranges from greater than 0 to less than 4) and/or silicon carbide (SiC). In certain variations, the nanocomposite further comprises at least one of silicon carbide (SiC) and silicon nitride ($Si_3N_4$) distributed in the phase comprising silicon oxynitride ($Si_2N_2O$ or non-stoichiometric $SiN_xO_{4-x}$, where x ranges from greater than 0 to less than 4).

In certain variations, the nanocomposite further comprises a pyrolyzed carbon-based material. In one aspect, the nanocomposite comprises silicon carbide (SiC). In such a variation, the silicon carbide (SiC) may be provided distributed in a hard carbon material (for example, pyrolyzed carbon formed in the carbothermal process). By way of non-limiting example, SDRHA-derived SiC with hard carbon (HC—SiC/HC) or after oxidizing the hard carbon (SiC/O) can provide lithium ion batteries with incremental capacity increases, by way of non-limiting example, reaching greater than 950 mAh/g and 740 mAh/g after 600 cycles, respectively. It appears that two distinct SiC morphologies may be provided, particles and whiskers, believed to result from coinciding different reaction mechanisms during carbothermal reduction. For example, in one variation, a BET specific surface area (SSA) is approximately 204 $m^2/g$ for the SiC/HC, and approximately 42 $m^2/g$ SiC after oxidative removal of hard carbon at 500° C./1 h/$O_2$ (forming SiC/O). The broad pore size distribution in SiC/HC peaks at about 17-24 nm, with no peaks seen for SiC/O. Hard carbon typically exhibits high crosslinking inducing formation of nanopores within the disordered structures.

In comparing other known SiC-based electrodes with those formed in accordance with certain aspects of the present disclosure (SDRHA-derived SiC/HC composites), one or more of the following advantages are provided: (1) the electroactive materials prepared according to certain aspects of the present disclosure retain relatively higher capacities versus other reported SiC materials; (2) electroactive materials prepared according to certain aspects of the present disclosure are readily produced by "low-temperature process" (e.g., 1450° C.) of carbothermal reduction of an agricultural waste that is often land-filled, but could be used at commercial levels; (3) RHA is a byproduct of RH combustion coincidentally generating 200 gigawatts and 200 k tons RHA per year in the U.S. alone. Given that the rice crop fixes $CO_2$, this process is at least carbon neutral and may be carbon negative if landfilled RHA generates $CH_4$/$CO_2$ subsequently released to the atmosphere.

SEMs present microstructures of pristine and cycled SiC/HC and SiC/O electrodes, both having larger (about 2-about 10 µm) particle sizes after 600 cycles, indicating stable and robust SEI layers remain on extended cycling. Whiskers also remain, although are not dominant features. Overall, the electrodes maintain their integrity without significant volume changes on aging, suggesting the cubic to hexagonal phase transition does not alter the initial SiC electrode structure and or morphology. Further, post-mortem characterization of cycled electrodes indicate partial phase transformation from cubic (3C) to hexagonal (6H) SiC, with no significant volume changes or surface cracking observed in SEMs. No elemental Si, $Li_xSi$, or $Li_xC$ is observed, suggesting SiC lithiation in limited by intercalation rather than conversion or alloying reactions. These results contrast greatly with Si electrodes, which suffer from pulverization and shortened cycle lives due to the high volume changes that occur during cycling.

In other aspects, the silicon oxynitride comprises $Si_2N_2O$. In yet other aspects, the silicon oxynitride comprises non-stoichiometric $SiN_xO_{4-x}$, where x ranges from greater than 0 to less than 4.

An electrode comprising such an electroactive material may further comprise graphite. The electrode may further comprise a polymeric binder, as well.

Various embodiments of the inventive technology can be further understood by the specific examples contained herein. Specific examples are provided for illustrative purposes of how to make and use the compositions, devices, and methods according to the present teachings.

EXAMPLES

Example 1

SDRHA was synthesized as described in Marchal, J. et al., "A Low Cost, Low Energy Route to Solar Grade Silicon from Rice Hull Ash (RHA), a Sustainable Source," Green Chemistry, 17 (7), pp. 3931-3940 (2015), the relevant portions of which are incorporated herein by reference. Notably, the relevant portions of any additional references described herein are explicitly incorporated by reference. In brief, rice hull ash (RHA) was first milled in dilute hydrochloric acid to remove impurities. RHA (200 g) was placed in a 2 L bottle with 200 g of milling media and 2 L of HCl solution (3.7 wt. % HCl). Grinding media was yttria-stabilized zirconia, 3 mm diameter spheres. The RHA was milled for 48 hours. Thereafter, the acid milled RHA was recovered by suction filtration through a Buchner funnel. The recovered RHA was then washed with 500 mL DI water.

The acid milled RHA and 1 L of DI water were then introduced to a 2 L glass flask equipped with a stir bar and a reflux condenser. The suspension was then boiled for 24 hours before separation by filtration through a Buchner funnel. The boiling and filter processes were repeated one more time. After the second filtration, the pH of water filtered off was neutral. Then, the RHA was dried at 100° C./vacuum overnight.

A mixture of a diol (250 mL hexylene glycol (HG)) and catalyst (4.2 g KOH (75 mmol)) was first heated to 190° C. in a 250 mL three-neck flask equipped with a stir bar to remove water for 3 h. Dried RHA powders (approximately 50 g) were added to the HG+KOH solution. The mixture was heated to 200° C. in a Pyrex distillation setup. After 100 mL HG was distilled, another 100 mL HG was added.

Synthesis of SDRHA

Figure 1A:
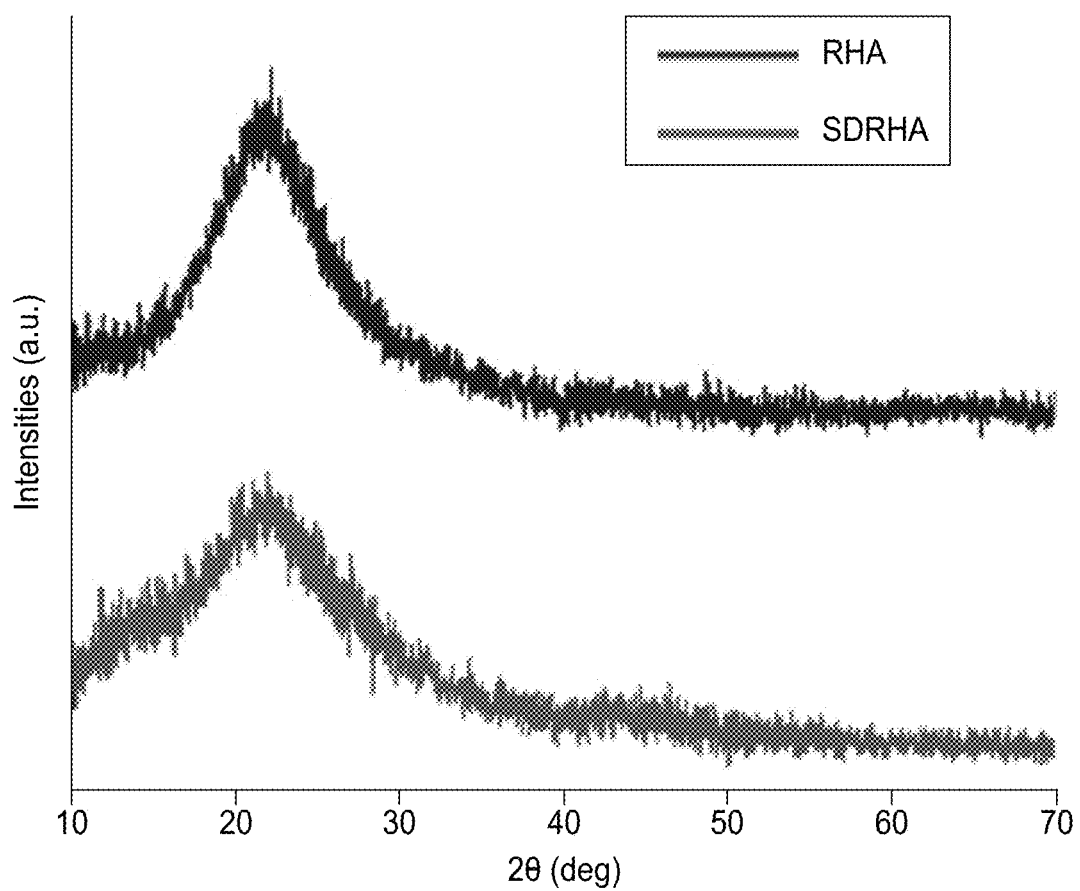
Figures 1B, 1C:
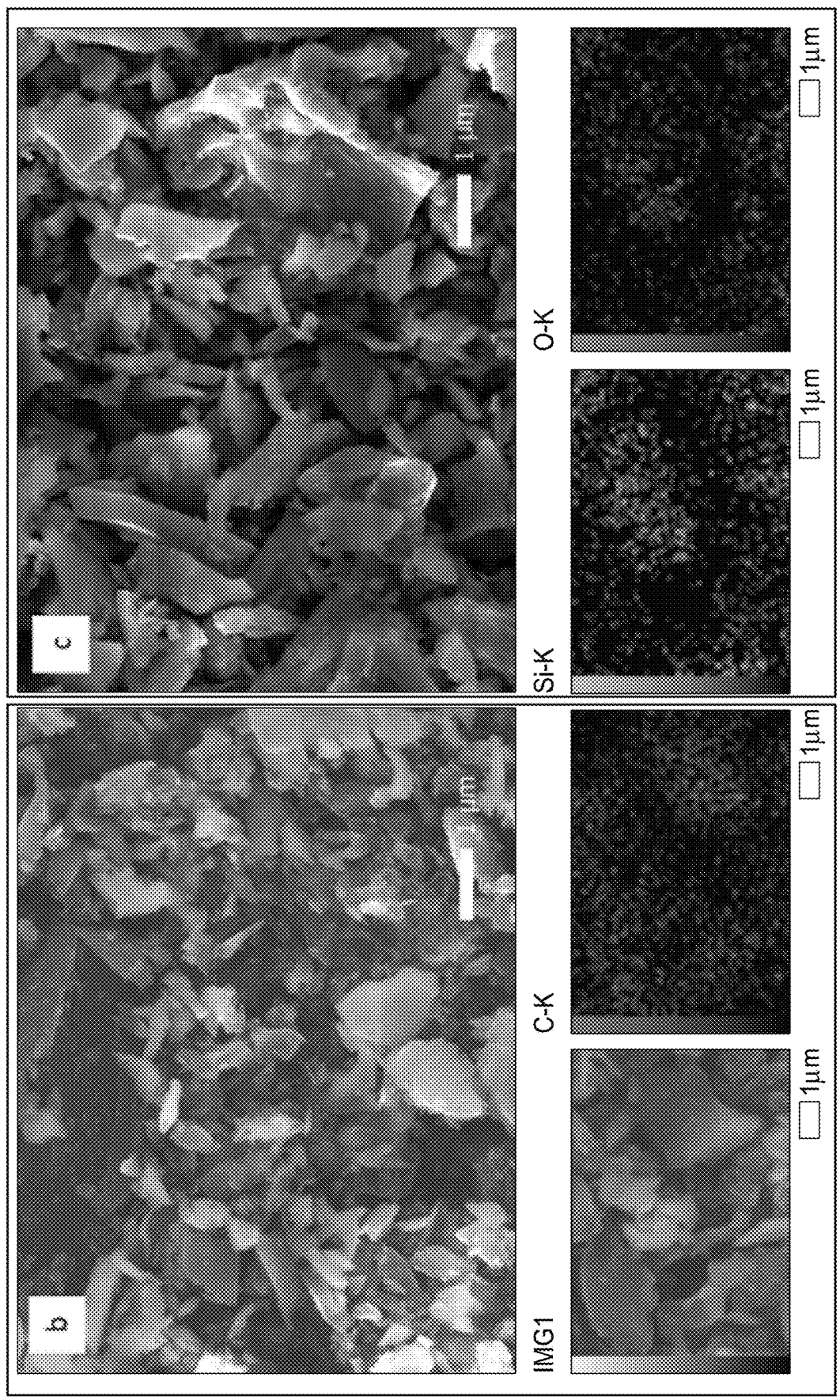

FIG. 1A indicates that RHA comprises amorphous $SiO_2$ and carbon before and after extracting $SiO_2$, while the EDX analyses confirm intimate mixing of $SiO_2$ and carbon in SDRHA (60 wt. % $SiO_2$, denoted $SDRHA_{60}$) at nanoscale. As such, the essential conditions for effective carbothermal reduction at relatively low temperatures, e.g., milling of amorphous $SiO_2$ and carbon sources in traditional manufacturing processes, are met without extra effort. The SEM images (FIGS. 1B and 1C) show that RHA morphologies are retained in the $SDRHA_{60}$, where the majority of particles in $SDRHA_{60}$ range from 1 to 10 µm. Moreover, the quite porous network is visualized in the SEM images, as discussed below.

Figure 2A:
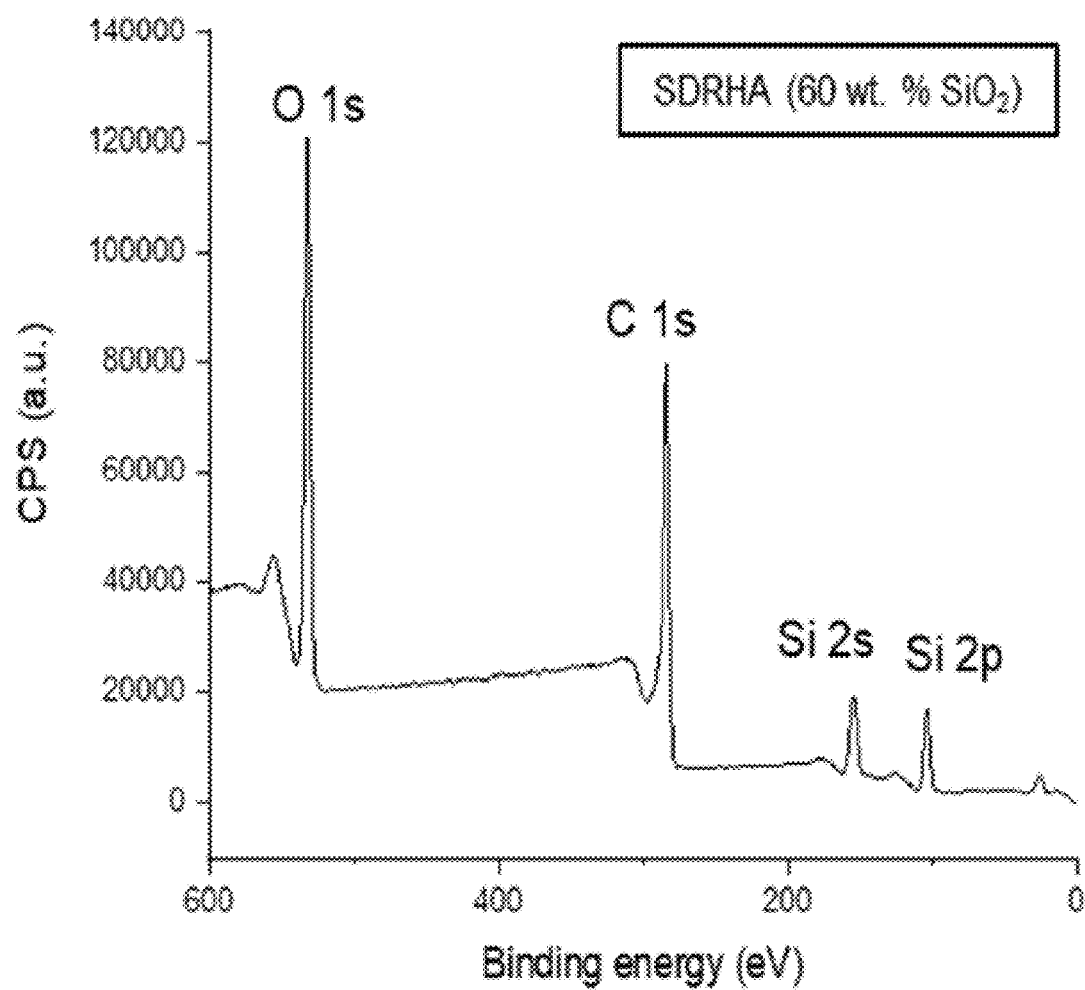
Figure 2B:
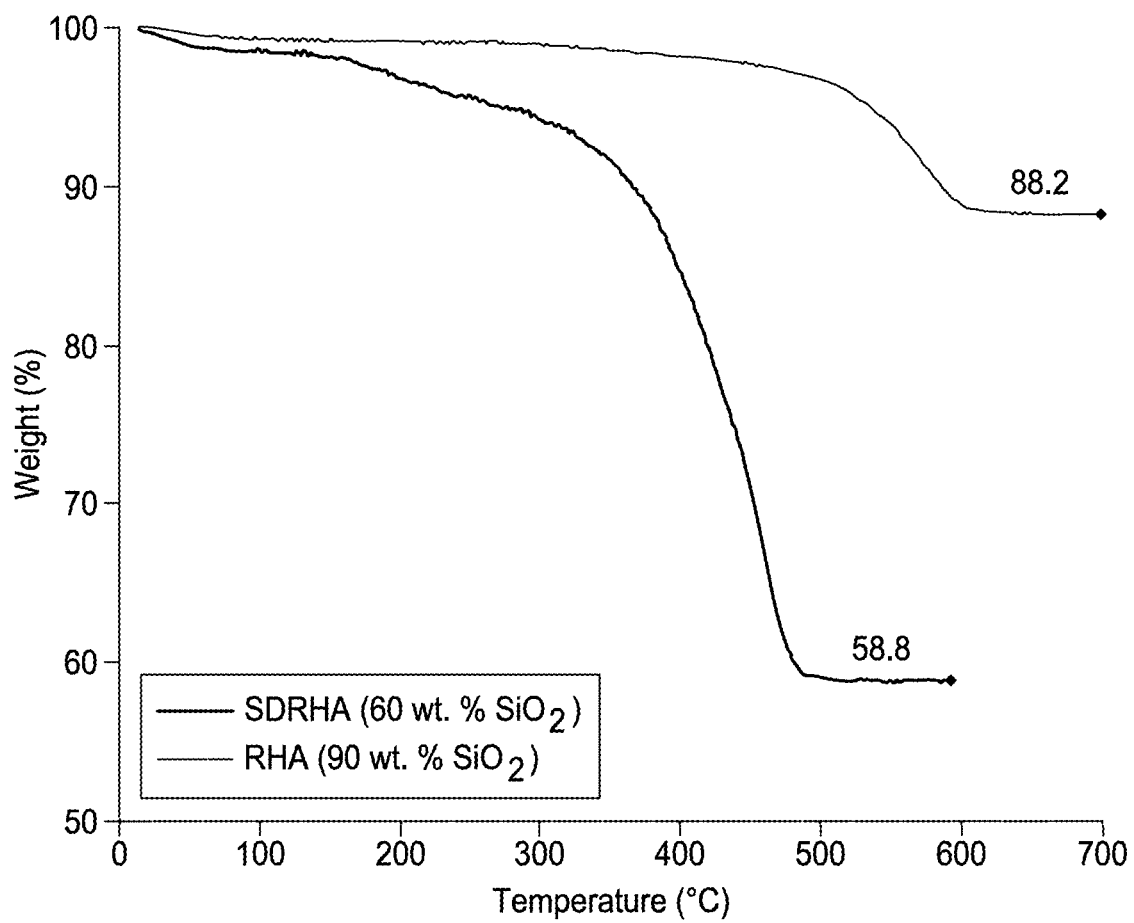
Figure 2C:
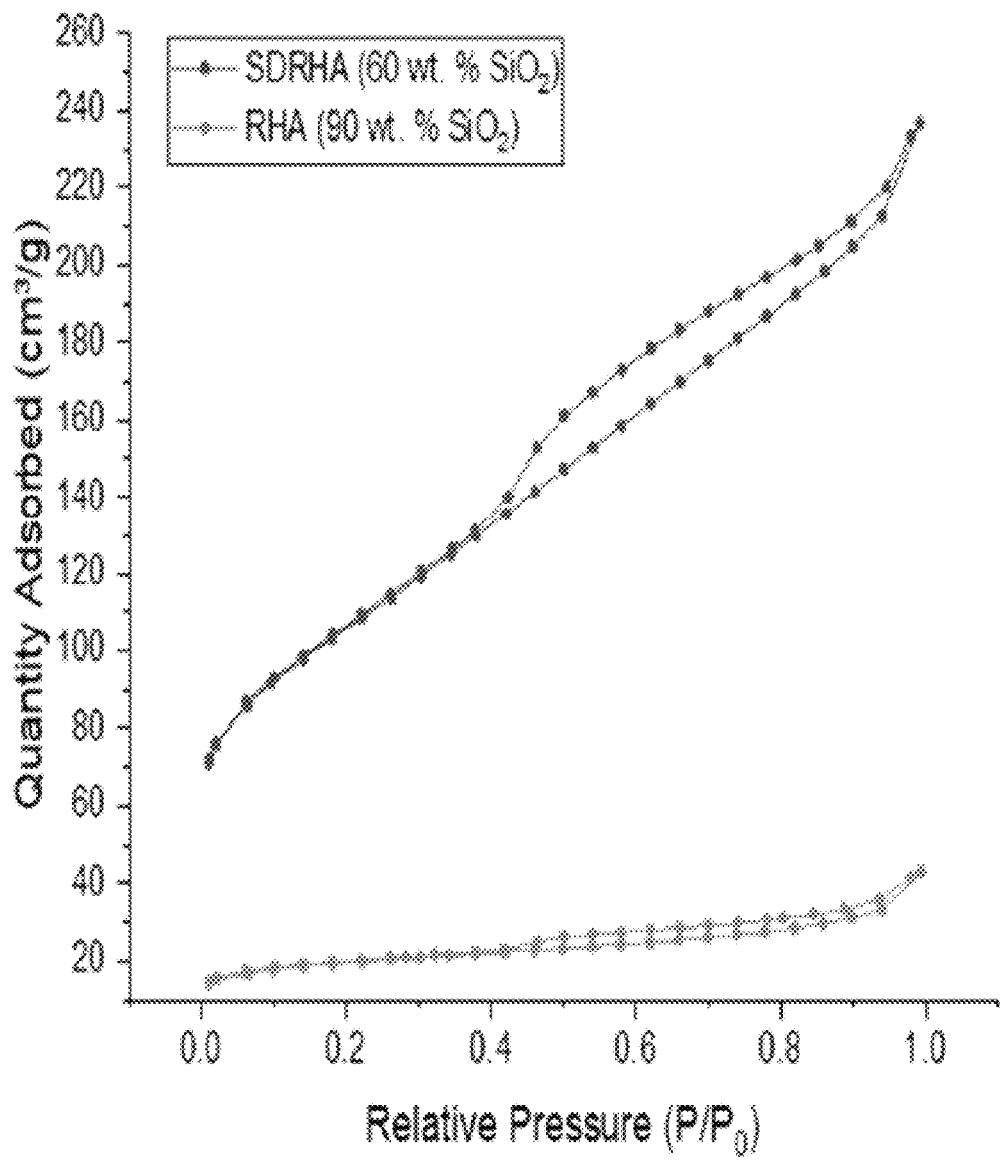

The as-received RHA used in the examples contains approximately 90 wt. % $SiO_2$. Detailed SDRHA synthesis procedures were reported in Marchal, J. et al., "A Low Cost, Low Energy Route to Solar Grade Silicon from Rice Hull Ash (RHA), a Sustainable Source," Green Chemistry, 17 (7), pp. 3931-3940 (2015). Briefly, the first step is to mill the as-received RHA in dilute acid followed by washing with boiling water, which removes most of the mineral impurities. In the next step, the dried RHA is reacted with a hindered diol-hexylene glycol—using catalytic amounts of potassium hydroxide. As seen in FIG. 2A XPS wide survey, the $SDRHA_{60}$ spectrum reveals solely signature peaks for C 1s, Si 2s, Si 2p, and O 1s. FIG. 2B provides representative TGAs of acid-washed/dried RHA and SDRHA at 25-600° C. under air after distilling part, providing respective $SiO_2$ contents. No apparent mass decrease is observed after oxidation of carbon finishes at approximately 480° C., suggesting 60 wt. % $SiO_2$ remains in the $SDRHA_{60}$. The BET SSAs increase from approximately 70 $m^2/g$ for RHA to approximately 345 $m^2/g$ for $SDRHA_{60}$, while those for SDRHA are about 440, about 420, about 370, and about 220 $m^2/g$. FIG. 2C presents the typical $N_2$ adsorption-desorption isotherms of RHA and SDRHA. The plot characteristics correspond to type IV with H3 hysteresis in IUPAC classifications, which presumably arises from the porous network in non-rigid aggregates of plate-like particles.

In one example, $SDRHA_{40-65}$ (having 40 to 65 weight % silica) may be heated at 1400-1500° C. in an Ar, $N_2$, or $N_2/H_2$ atmosphere that can form a product having SiC, $Si_3N_4$, or $Si_2N_2O$ and/or non-stoichiometric $SiN_xO_{4-x}$, where x ranges from greater than 0 to less than 4, with some residual carbon, and cristobalite in some instances of incomplete conversion. SEM studies reveal mixtures of particles and whiskers in these products, which may have BET specific surface areas (SSAs) of greater than or equal to about 40 $m^2/g$.

Synthesis of SiC, $Si_3N_4$, and $Si_2N_2O$ Composites

Treated SDRHA powder formed as described above was placed in a graphite crucible and covered with an alumina disk, which was then heated to different temperatures and times under Ar, $N_2$, or $N_2/H_2$ mixtures at a heating rate of 10° C./min.

Nanocomposites from SDRHA Via Carbothermal Reductions

Figure 3A:
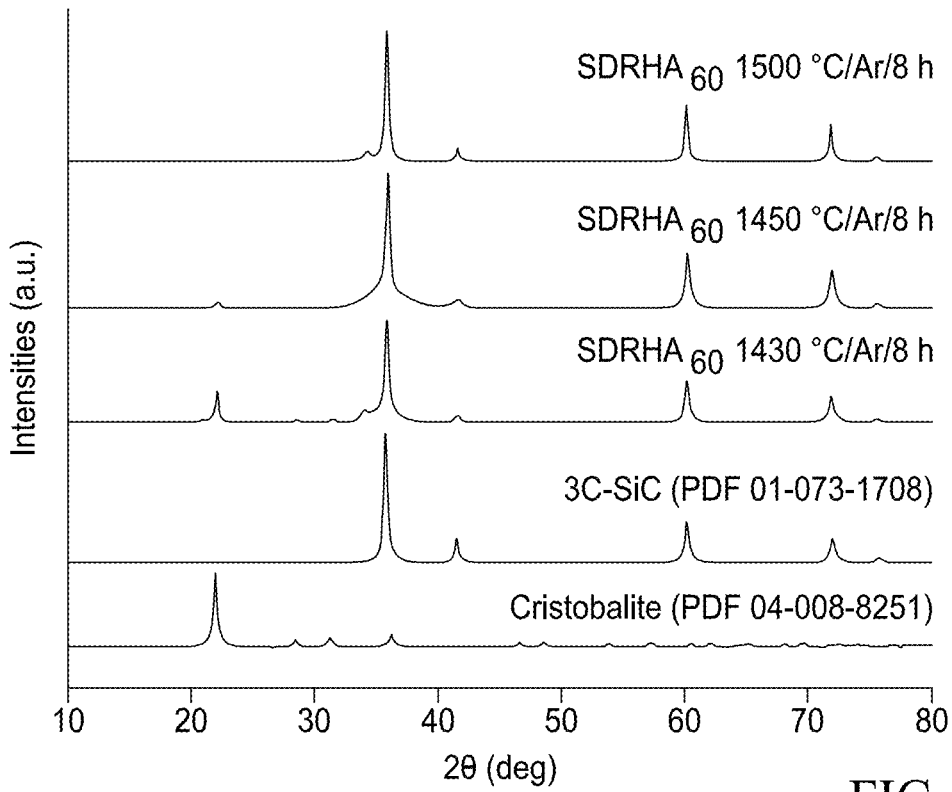
Figure 3B:
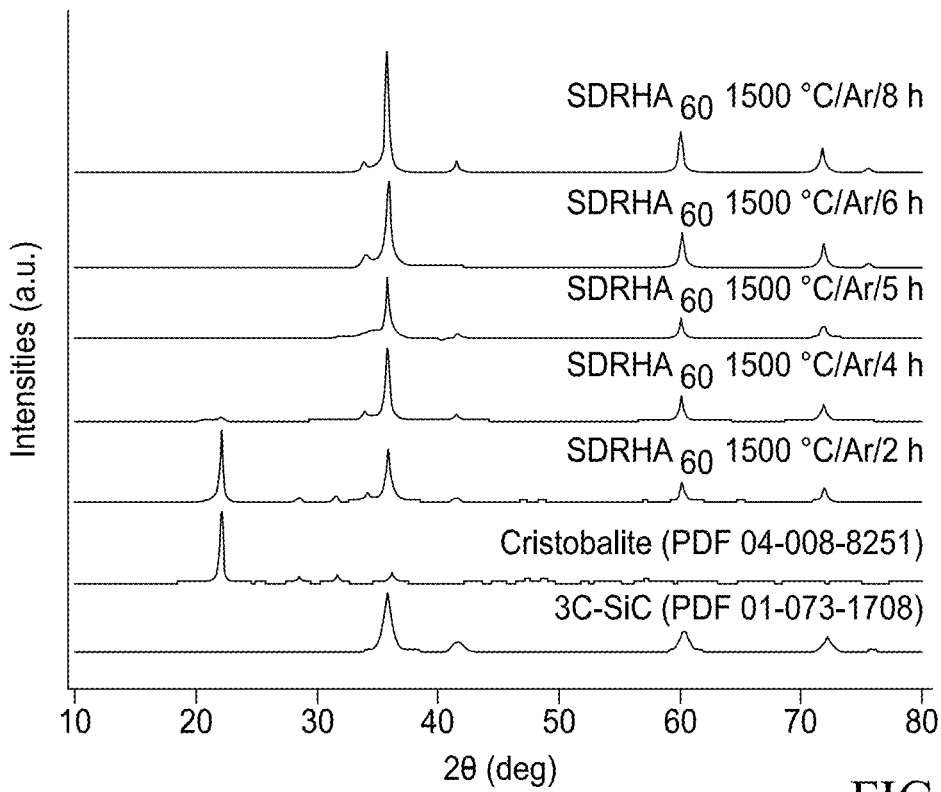

Carbothermal reduction studies. In traditional carbothermal reduction, it is necessary to mill the $SiO_2$ source with the carbon source as a first step. In contrast, $SDRHA_{40-65}$ includes $SiO_2$/C nanocomposites as recovered from distillative removal of $SiO_2$. Thus, they can be heated directly. FIG. 3A presents XRDs of SiC derived from heating $SDRHA_{60}$ at 1400-1500° C. under Ar. Peaks at 36°, 42°, 60°, and 72°2θ are associated with the (111), (200), (220), and (311) planes of β-SiC (3C—SiC, PDF 01-073-1708). The weak shoulders at 33.5° correspond to stacking faults. On heating to 1450 and 1430° C., peaks indexed to the (101) plane of cristobalite at 22°2θ appear, corresponding to approximately 5 and 20 wt. % cristobalite in the products, respectively. FIG. 3B compares the XRDs from heat-treatment at 1500° C. under Ar for 2, 4, 5, 6, and 8 hours. No cristobalite or other $SiO_2$ phase is observed for reaction times greater than 5 hours. If heat-treatment was limited to 4 hours, the major product is SiC with approximately 3 wt. % cristobalite. The crystalline phases listed in Table 1 were determined using PDXL XRD analysis software.

TABLE 1

Composition of products from heating $SDRHA_{60}$ at 1400-1500° C./Ar.

| $SDRHA_{60}$ | 1430° C./8 h | 1450° C./8 h | 1500° C./2 h | 1500° C./4 h | 1500° C./>5 h |
|---|---|---|---|---|---|
| SiC | 80% | 95% | 57% | 98% | 100% |
| Cristobalite | 20% | 5% | 43% | 2% | 0% |

The effects of $SiO_2/C$ ratios were also investigated. Previous studies proposed that temperatures lower than 1400° C. were unfavorable for carbothermal reduction and nitridation of RHA. Known reactions involved in the carbothermal reductive synthesis of SiC are:

$$SiO_2(s)+C(s)\rightarrow SiO(g)+CO(g)$$

$$SiO(g)+3CO(g)\rightarrow SiC(s)+2CO_2(g)$$

$$SiO(g)+2C(s)\rightarrow SiC(s)+CO(g)$$

$$CO_2(g)+C(s)\rightarrow 2CO(g).$$

Figure 3C:
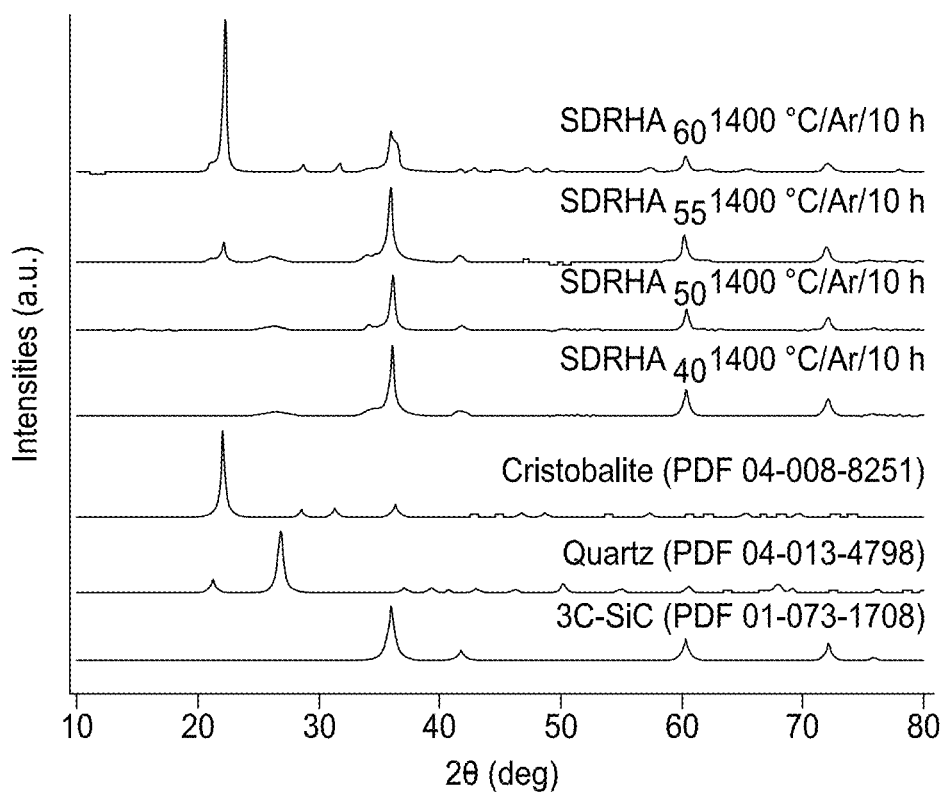

Conventional carbothermal reduction requires excess carbon to promote complete transformation of $SiO_2$ to SiC. The corresponding mole ratios of $SiO_2$:C are lower than the stoichiometric ratio of 1:3. $SDRHA_{40,50,55,60}$ materials prepared in accordance with certain aspects of the present disclosure offer $SiO_2$:C mole ratios of 2:15, 1:5, 11:45, and 3:10, respectively, satisfying the excess carbon criterion. As shown in FIG. 3C, heating $SDRHA_{40,50}$ at 1400° C. for 10 hours results in the formation of approximately 88 and 79 wt. % SiC, respectively, while $SDRHA_{60}$ gives approximately 16 wt. % (Table 2).

The trend that more carbon in the starting materials leads to a higher proportion of SiC in the products agrees with studies reported earlier that surplus carbon facilitates increases in SiC yields. It is also in keeping with reaction kinetics, wherein higher concentrations of a given reactant will drive a given reaction faster.

The detection of two crystalline $SiO_2$ phases in products heated at 1400° C. suggests incomplete transformation from quartz to cristobalite, which is reported to occur over the temperature interval of 1100-1400° C. In addition, it is well recognized that carbon catalyzes reduction of $SiO_2$ to SiO, thus initiating the vapor-vapor reactions between SiO and C/CO rather than solid-state reactions alone and eventually leads to lower SiC formation temperatures. All these factors define the trend shown in Table 2, where higher SiC yields result from higher initial carbon contents at 1400° C.

TABLE 2

Compositions of products from heating $SDRHA_{50-60}$ at 1400° C./10 h/Ar.

| 1400° C./Ar/10 h | $SDRHA_{40}$ | $SDRHA_{50}$ | $SDRHA_{55}$ | $SDRHA_{60}$ |
|---|---|---|---|---|
| SiC | 88% | 79% | 74% | 16% |
| Cristobalite | 3% | 2% | 7% | 82% |
| Quartz | 9% | 19% | 20% | 2% |

Figure 4A:
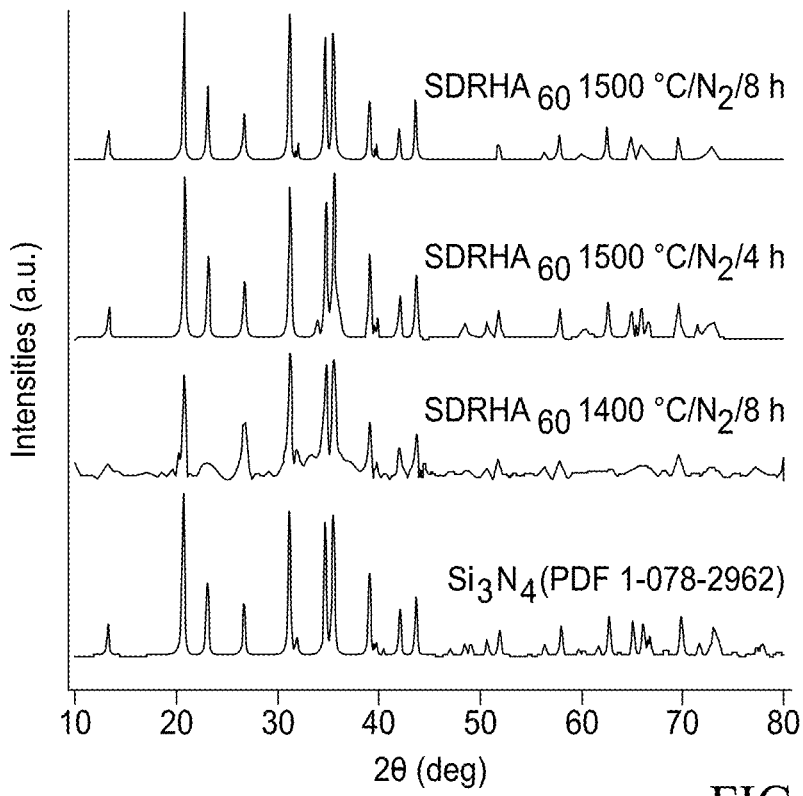
Figure 4B:
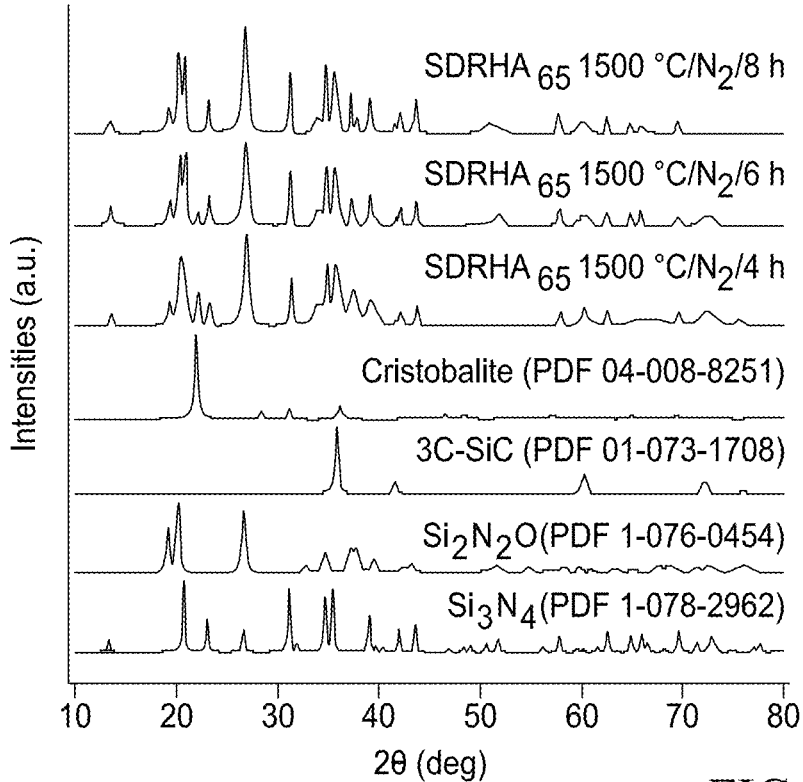

XRD analyses of $SDRHA_{60}$ heated under $N_2$ confirm formation of $\alpha$-$Si_3N_4$ are shown in FIGS. 4A-4B. No peaks attributable to $SiO_2$ or SiC, impurities commonly found in $Si_3N_4$ produced by carbothermal nitridation are found, indicating complete nitridation of $SiO_2$ on heating $SDRHA_{60}$ at 1400° C./$N_{2/8}$ h (FIG. 4A) or at 1500° C./$N_{2/4}$ hours (FIG. 4B). However, $SiO_2/C$ ratios significantly impact the reaction. XRDs in FIG. 4B indicate that products derived from $SDRHA_{65}$ ($SiO_2$:C mole ratio=13:35) include $Si_3N_4$, $Si_2N_2O$, SiC, and cristobalite (Table 3). Peak intensities indexed to cristobalite at 22°2θ decrease at longer heating times, becoming negligible (0%) after 8 hours, suggesting complete carbonitriding of $SiO_2$ per:

$$3SiO_2(s)+6C(s)+2N_2(g)\rightarrow Si_3N_4(s)+6CO(g)$$

$$3SiO(g)+3C(s)+2N_2(g)\rightarrow Si_3N_4(s)+3CO(g).$$

The relative $Si_3N_4$ and SiC compositions correlate with the secondary reaction:

$$3SiC(s)+2N_2(g)\rightarrow Si_3N_4(s)+3C(s)$$

TABLE 3

Product compositions from heating $SDRHA_{65}$ at 1500° C./$N_2$ for 4, 6, 8 hours

| $SDRHA_{65}$ | 1500/$N_2$/4 h | 1500/$N_2$/6 h | 1500/$N_2$/8 h |
|---|---|---|---|
| $Si_3N_4$ | 38% | 50% | 58% |
| $Si_2N_2O$ | 32% | 33% | 36% |
| SiC | 26% | 15% | 6% |
| Cristobalite | 4% | 2% | 0 |

As with SiC and $Si_3N_4$, silicon oxynitride ($Si_2N_2O$) is another product from the carbothermal reduction and nitridation reactions, which is a refractory material with high chemical and oxidation resistance. Theoretically, the stoichiometric $SiO_2$:C mole ratio is 2:3, per:

$$2SiO_2(s)+3C(s)+N_2(g)\rightarrow Si_2N_2O(s)+3CO(g)$$

whereas prolonged treatment times will result in further reduction of oxygen in $Si_2N_2O$, forming $Si_3N_4$:

$$3Si_2N_2O(s)+3C(s)+N_2(g)\rightarrow 2Si_3N_4(s)+3CO(g).$$

As noted above, the residual additives present as external impurities in the products. In certain aspects, composites formed in accordance with certain aspects of the present disclosure have $Si_2N_2O$ as the major phase (greater than or equal to about 80 wt. %) are produced in this work from heating SDRHA under $N_2/H_2$ atmosphere. SDRHA with relatively higher $SiO_2$:C ratios was chosen to access sufficient oxygen from $SiO_2$.

FIGS. 2A-2C. FIG. 2A is an XPS survey scan, FIG. 2B is a TGA, and FIG. 2C is an N2 adsorption-desorption isothermal plots of RHA and SDRHA60.

FIGS. 3A-3C. XRDs from heating SDRHA60 at 1430-1500° C./8 hours/Ar (FIG. 3A) and SDRHA60 at 1500° C. for various times (FIG. 3B). FIG. 3C shows heating SDRHA40-60 at 1400° C./10 hours/Ar.

FIGS. 4A-4B. XRDs from heating SDRHA60 at 1400/8 hours/$N_2$, 1500° C./4 hours/N2, 1500° C./8 h/N2 (FIG. 4A) and SDRHA65 at 1500° C./N2 for various times (FIG. 4B).

Figure 5:
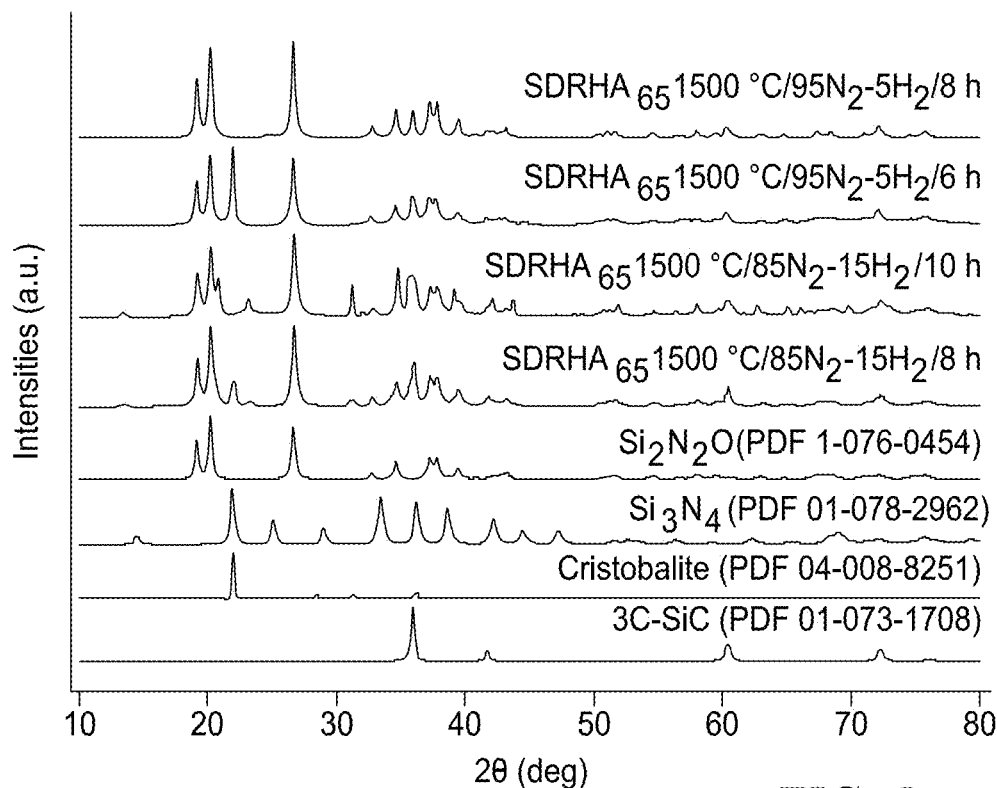

FIG. 5 shows illustrates representative XRD patterns of phases in products from heating SDRHA65 ($SiO_2$:C mole ratio=13:35) under $N_2/H_2$ with different mixing ratios (95/5 and 85/15). Similar to the aforementioned $Si_3N_4$ products, $Si_2N_2O$, $Si_3N_4$, SiC, and cristobalite phases are present in the composites formed (Table 4). With longer heating times, the reductions complete to greater extents, with less cristobalite and more $Si_3N_4$ in the products.

TABLE 4

Compositions of $SDRHA_{65}$ heated at 1500° C. for various times under $N_2/H_2$ with different ratios (95/5 and 85/15).
$SDRHA_{65}$

| | $N_2/H_2$ ratio | | | |
| | 85/15 | | 95/5 | |
| Condition | 1500° C./8 h | 1500° C./10 h | 1500° C./6 h | 1500° C./8 h |
|---|---|---|---|---|
| $Si_2N_2O$ | 70% | 88% | 74% | 84% |
| $Si_3N_4$ | 12% | 5% | 5% | <1% |
| SiC | 14% | 2% | 2% | 6% |
| Cristobalite | 4% | 5% | 19% | <1% |

Figure 6A:
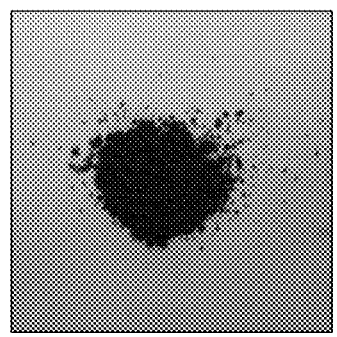
Figure 6B:
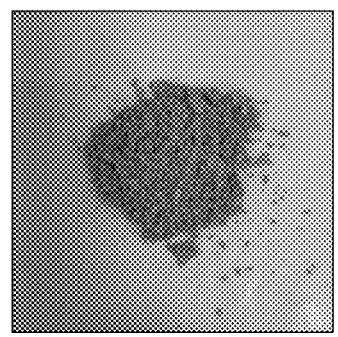
Figure 6C:
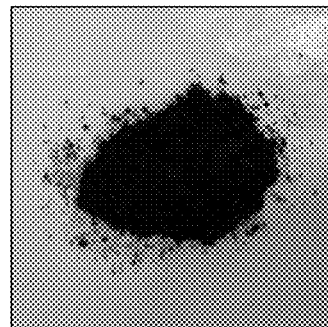
Figure 6D:
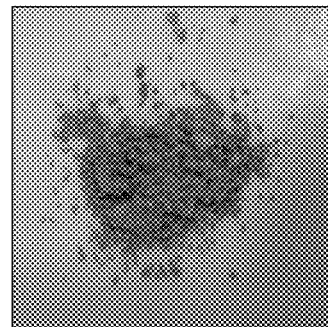

The resulting SiC and $Si_3N_4$ powders are mixed with excess carbon and are dark grey (FIGS. 6A and 6C). Both products show light grey green (FIGS. 6B and 6D) after oxidative removal of carbon, the typical color of SiC and $Si_3N_4$ produced in conventional manufacturing.

Figure 7A:
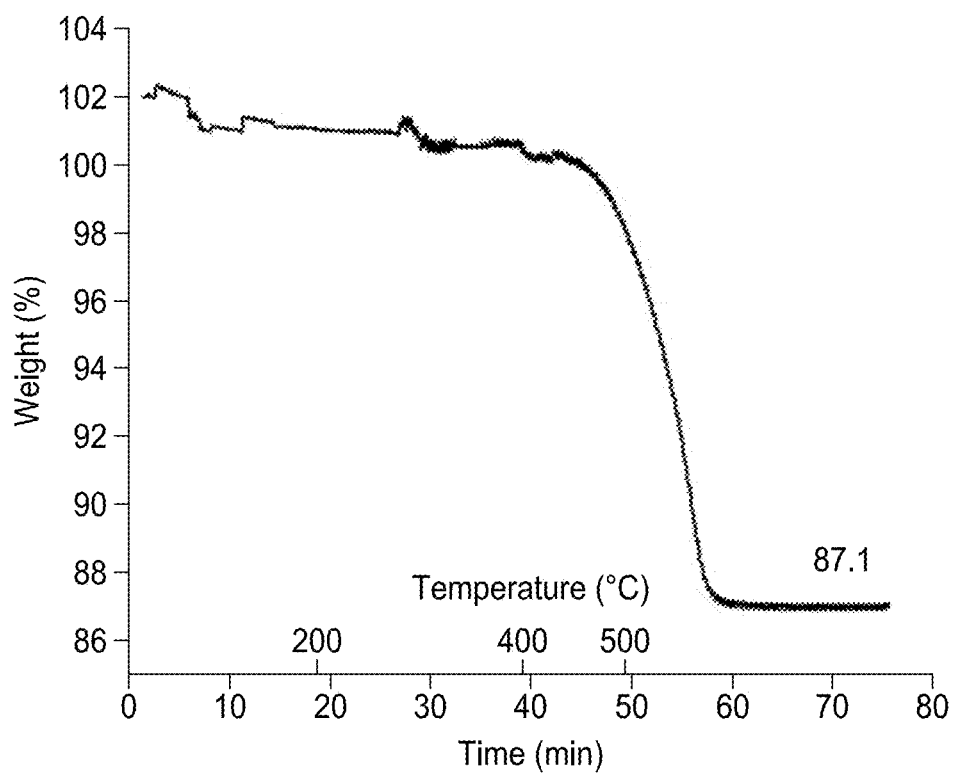
Figure 7B:
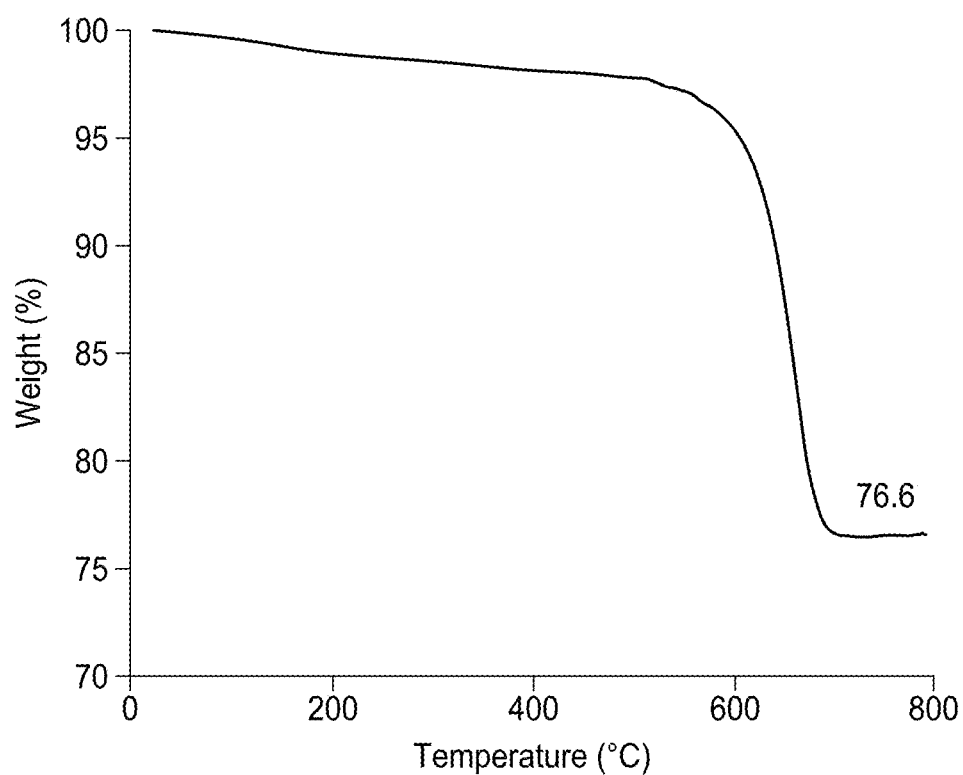
Figure 7C:
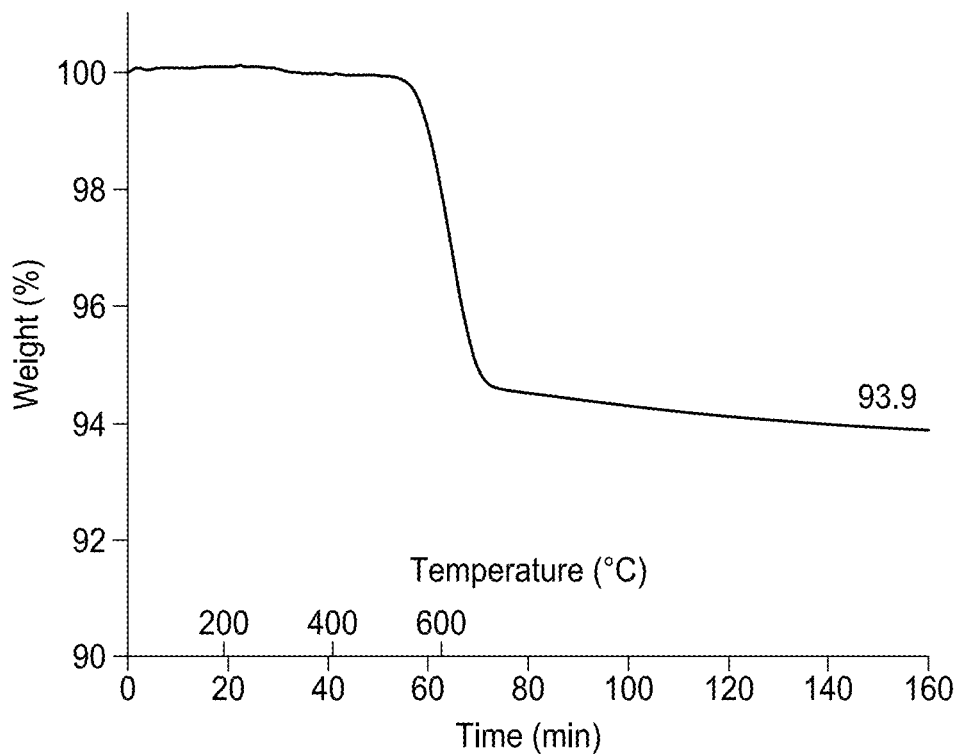

FIGS. 7A-7C illustrate TGAs of representative products derived from carbothermal reduction of SDRHA with SiC, $Si_3N_4$, and $Si_2N_2O$ as the major phases, indicating excess carbon remains in all systems when heated to 1500° C./8 hours. Thus, approximately 13 wt. % unreacted carbon remains in SiC, whereas as-produced $Si_3N_4$ retains approximately 24 wt. % carbon. As less carbon is involved in the starting $SDRHA_{65}$ for synthesizing $Si_2N_2O$, less excess carbon is retained in the composites (approximately 6 wt. %) than in the former two systems.

Figure 7D:
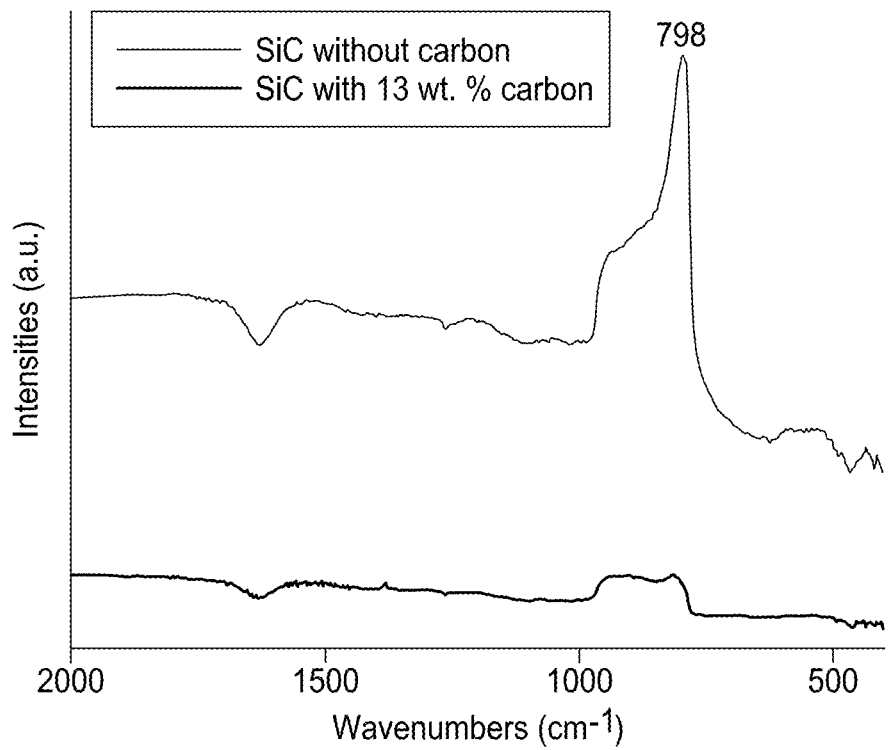

FIG. 7D shows FTIR of SiC with 13 wt. % carbon presents a broad peak from 790 to 1000 $cm^{-1}$ corresponding to the overlap of v(Si—C) and v(C—C). After oxidation at 500° C./$O_2$/1 hour, a strong absorption appears centered at 798 $cm^{-1}$ that can be assigned to v(Si—C), suggesting formation of cubic SiC, consistent with the β—SiC phase indexed from XRD results discussed above. The enhanced intensity of v(Si—C) peak at approximately 800 $cm^{-1}$ is presumably due to exposure of SiC after removing the excess carbon.

Figure 7E:
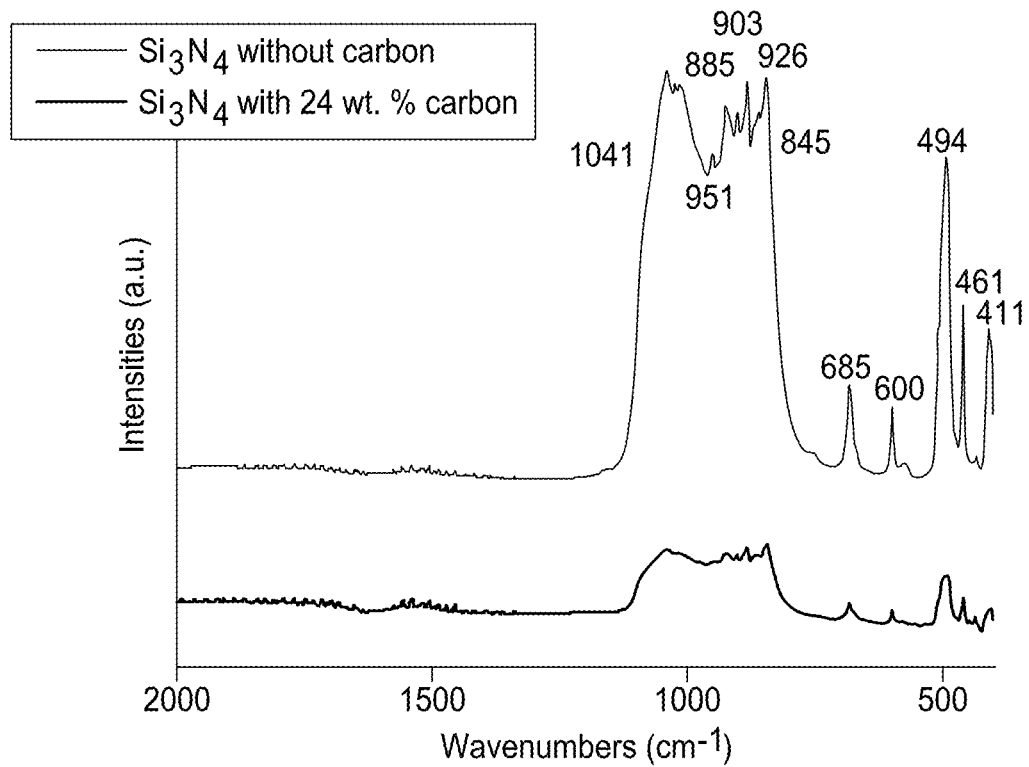
Figure 7F:
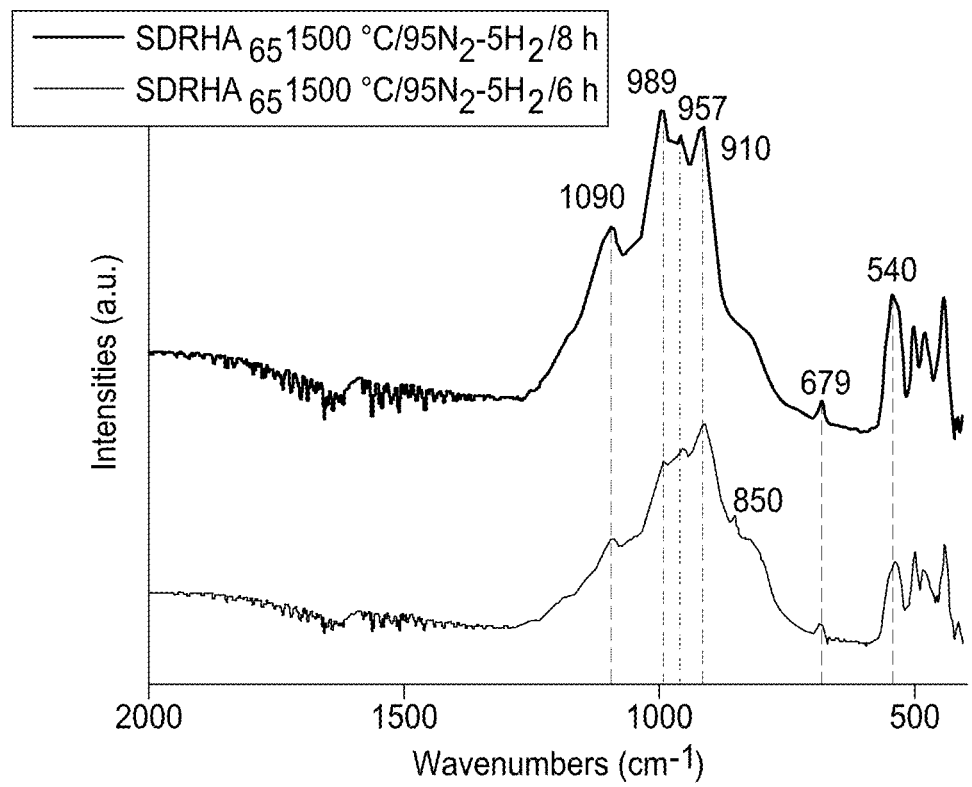

In the spectra of $Si_3N_4$ (FIG. 7E), the broad band from 800 to 1100 $cm^{-1}$ relates to the overlap of v(Si—N) and v(Si—O) from components including $Si_3N_4$ and $SiO_2$ from oxidation of $Si_3N_4$ particle surface. Similar to the SiC product, peak intensities are enhanced on removing excess carbon. The bands at 926, 903, 885, 845, and 685 $cm^{-1}$ are typical for α-$Si_3N_4$, compatible with XRD results. In composites with $Si_2N_2O$ as the major phase, the characteristic peaks of $Si_2N_2$—O at 1090, 989, 910, and 679 $cm^{-1}$ are shown (FIG. 7F). An additional band at 850 $cm^{-1}$ is shown in the composites from heating $SDRHA_{65}$ at 1500° C./6 hours/95$N_2$-5$H_2$, which is attributed to v(Si—C) and v(Si—O) from coincidental formation of SiC and cristobalite phases in the system.

Figure 8A:
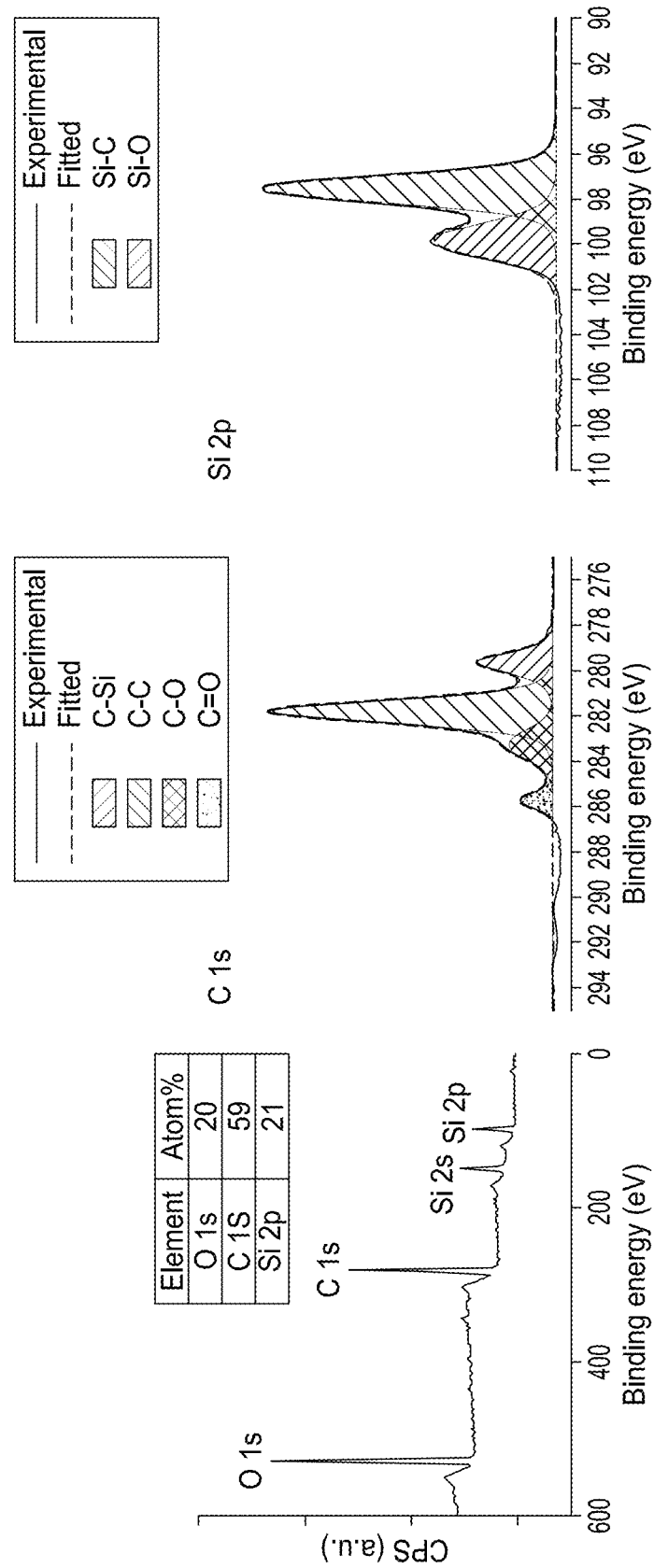
Figure 8B:
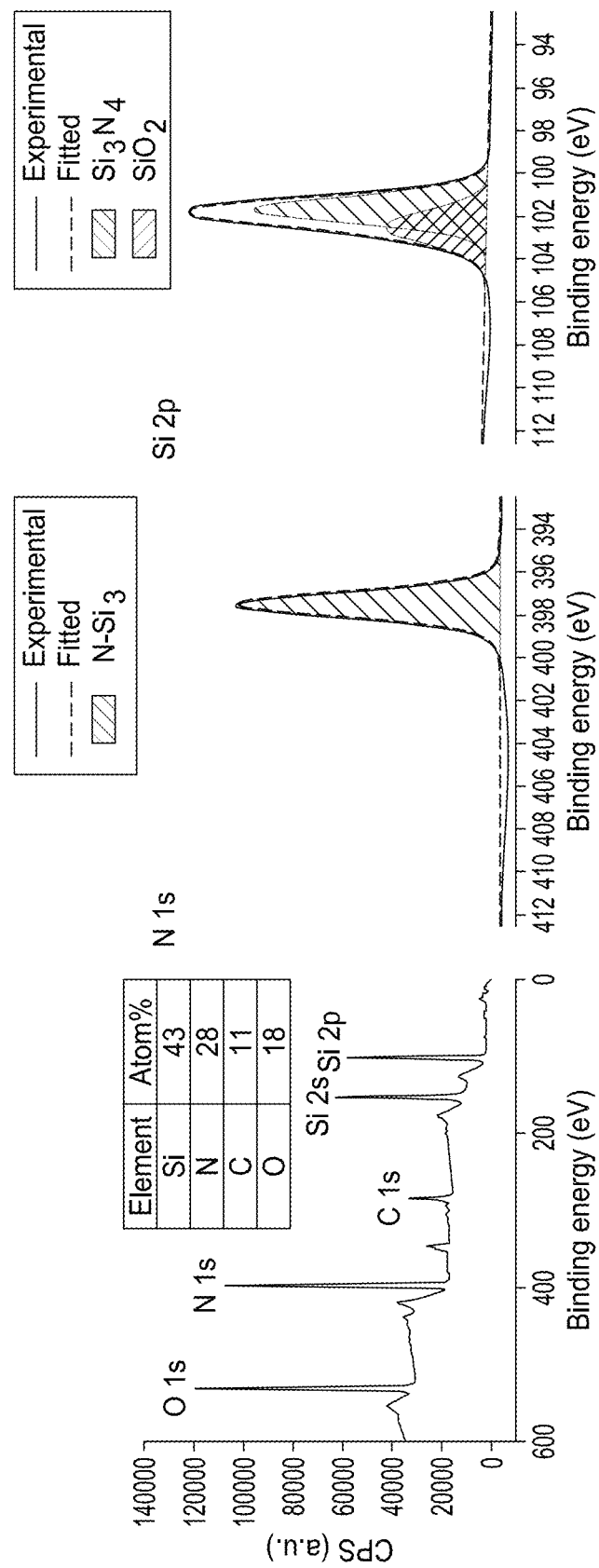

XPS was used to identify the elemental compositions and oxidation states of SiC and $Si_3N_4$ derived from $SDRHA_{60}$ heated at 1500° C./8 hours following oxidative removal of carbon. Signature peaks for O, C, and Si are observed in the XPS survey scan. FIGS. 8A-8B present XPS spectra of SiC and $Si_3N_4$ composites, respectively. Deconvolution of the Si 2p region reveals peaks at approximately 98 and approximately 100 eV for Si—C and Si—O bonds, respectively. The Si—O peaks derive from surface oxidation of SiC during oxidative removal of carbon. The C 1s spectrum is fitted with four Gaussian peaks. The intense peak centered at approximately 281.8 eV is ascribed to possible Si—C—O bonds, reported to appear at approximately 282 eV. Typical C—C bonds in residual carbon also contribute to the high intensities. The peak at approximately 280 eV is indexed to Si—C bonds. Two other components are associated with C—O (283 eV) and C=O bonds (285 eV).

As for the $Si_3N_4$ composites, Si 2s, Si 2p, N 1s, C 1s, and O 1s peaks are observed in the XPS survey spectrum of $Si_3N_4$. In the core survey, peak fitting in the Si 2p region reveals an intense peak at approximately 101.5 eV attributed to $Si_3N_4$. A second component of the Si 2p peak at approximately 103.5 eV corresponds to Si—O bonds in $SiO_2$, resulting from oxidation during carbon removal. A single peak located at approximately 397.5 eV in the N 1s spectra is assigned to N—$Si_3$ bonds in $Si_3N_4$.

Figures 9A, 9B:
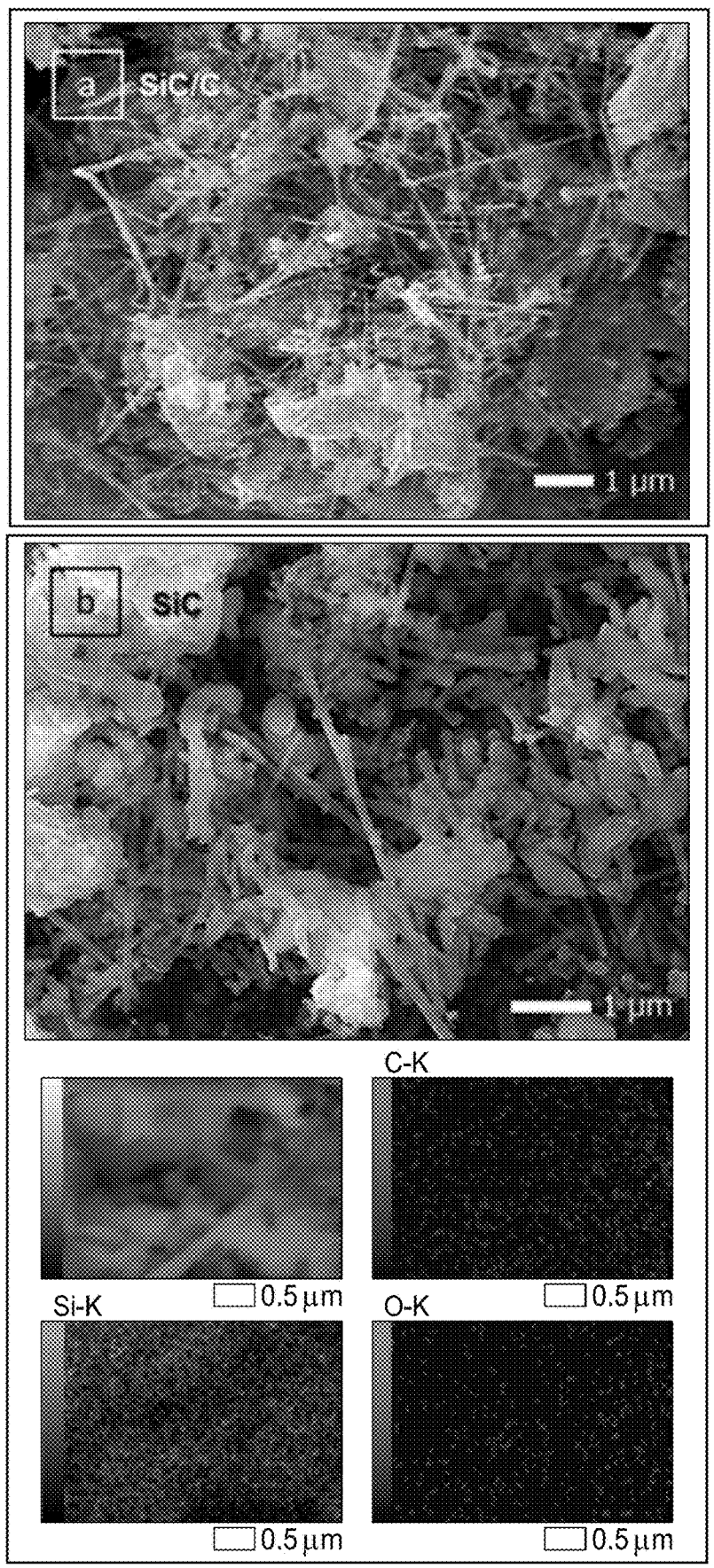

SEM and EDS images in FIGS. 9A-9D reveal cylindrical morphologies. FIGS. 9A-9B show SEM images of the as-synthesized SiC/C powders derived from heating $SDRHA_{60}$ at 1500° C./8 hours/Ar, and that after the elimination of excess hard carbon by oxidizing at 500° C./2 hours/$O_2$, respectively. It is seen that spherical particles coexist with fibrous whiskers in the SiC/C powders, where some spherical structures are attributed to surrounding carbon particles in the composites. SiC particles with sizes ranging between 10 and 200 nm can be observed among SiC whiskers with diameters of about 100 to about 140 nm and lengths up to 5 μm.

EDS maps show well-distributed Si and C. Oxygen was also detected after carbon burned-off, as discussed above. After the excess hard carbon is removed oxidatively, agglomerated lumps are more clearly visible. The non-uniform distribution of products with various morphologies relates to multiple reaction mechanisms that occur during carbothermal reduction. The proposed SiC whisker growth mechanisms focus on heterogeneous vapor-liquid-solid, birth-and-spread growth, vapor-vapor growth. Specifically, solid-gas reactions produce whiskers, whereas spherical morphologies mostly forms by solid-solid reactions under high SiO gas pressure. Nucleation and growth of SiC nanofibers are believed to result mainly from gas-phase reactions between SiO and CO.

Meanwhile, solid-gas reactions occur in regions where the carbon consumes the generated SiO in its surrounding diffusion paths. Therefore, reactions occur at the front of whiskers and can be terminated by impinging on other particles; hence, the SiC whiskers show various widths and lengths in the micrographs. Although the formation and growth of SiC polymorphs are not fully understood as yet, it is widely accepted that additives, starting materials, impurities, and growth conditions all affect the crystallization kinetics of SiC and the subsequent differences in polymorphs and phases.

Figure 9C:
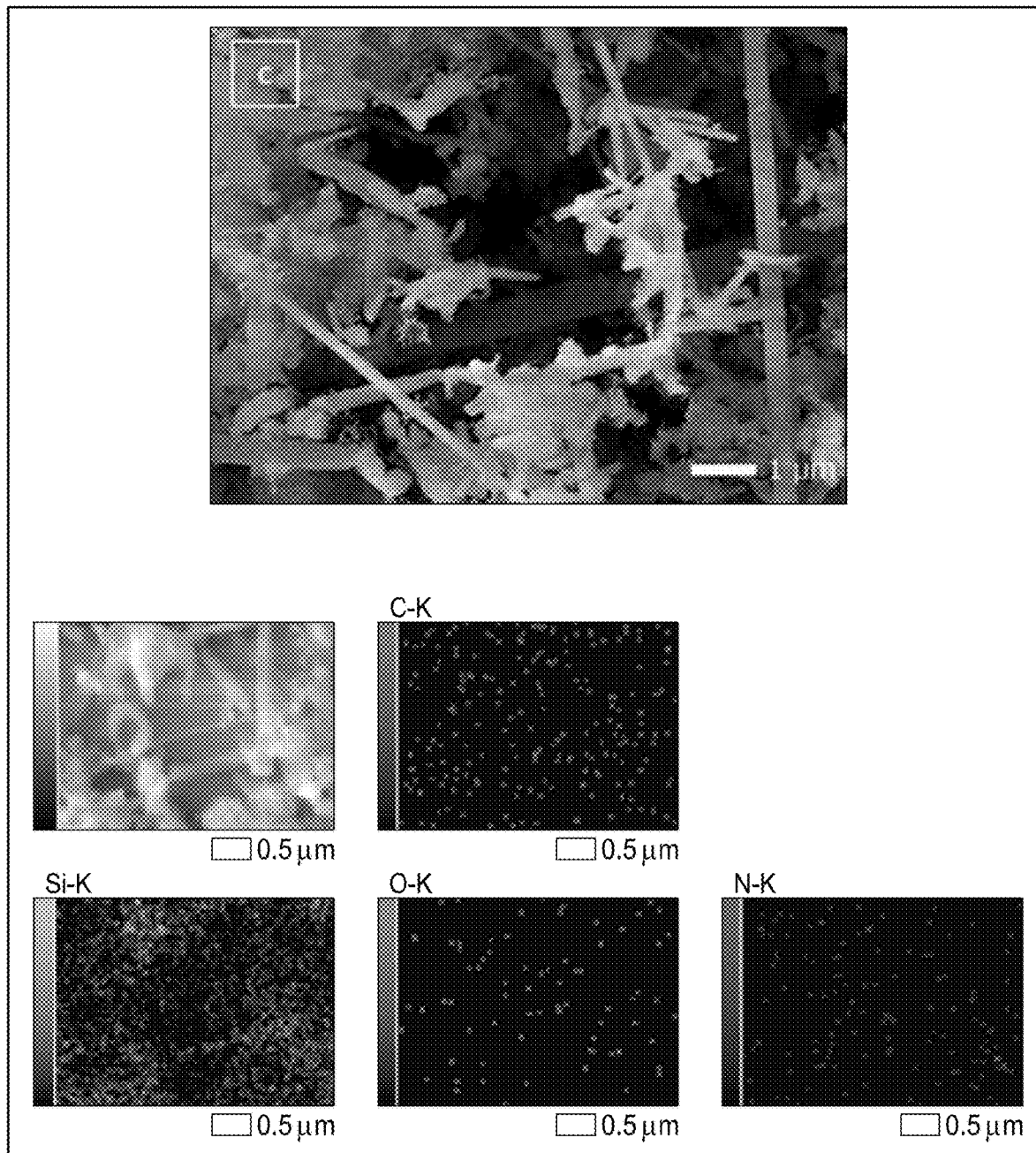
Figure 9D:
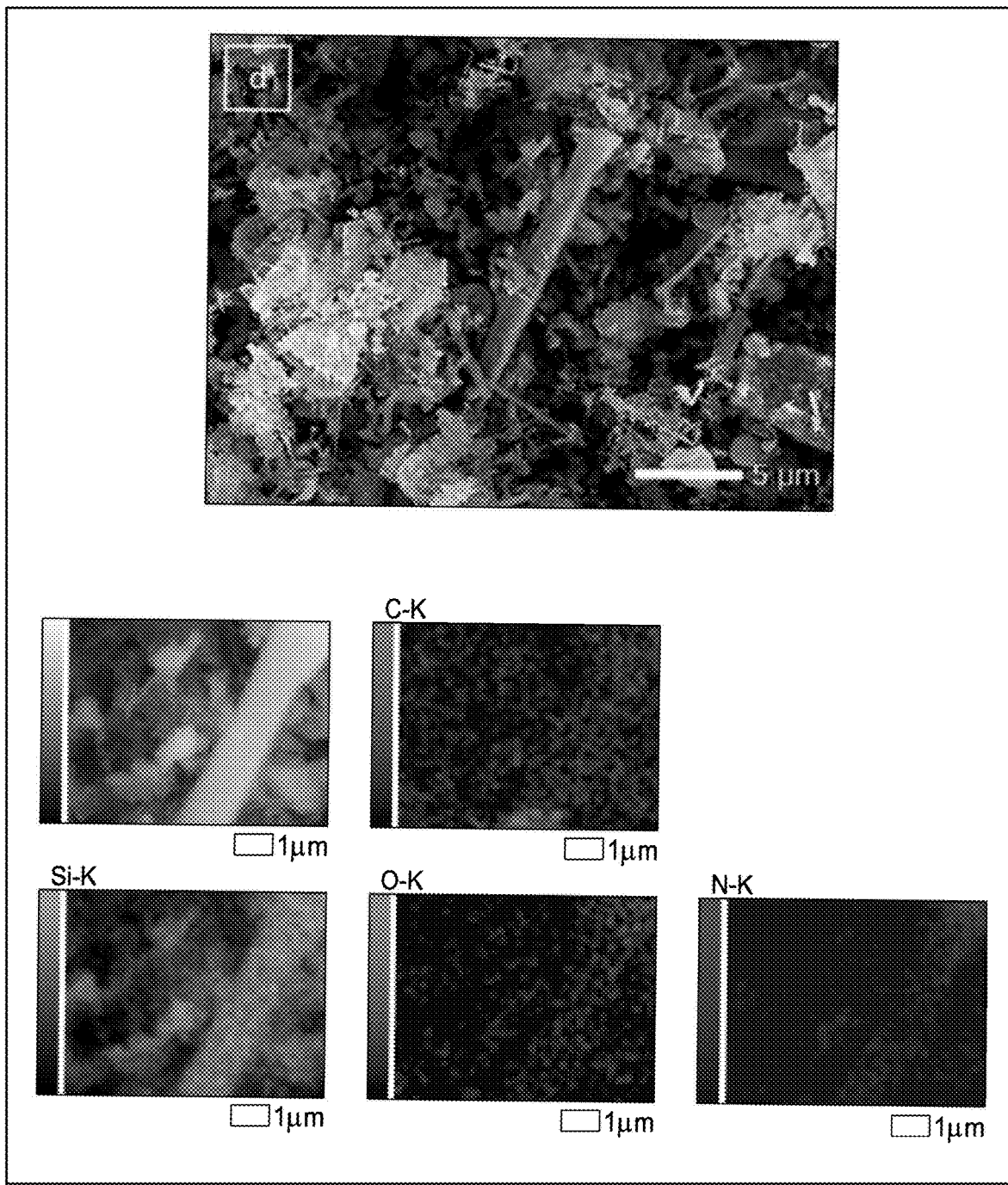

Similar morphologies are observed in the $Si_3N_4$ and $Si_2N_2O$ composites (FIGS. 9C-9D). Irregular aggregates mixed with whiskers with diameters of about 100-200 nm predominate and are several microns in length. These observations may suggest that SiC whiskers form first prior to nitridation.

Figure 10A:
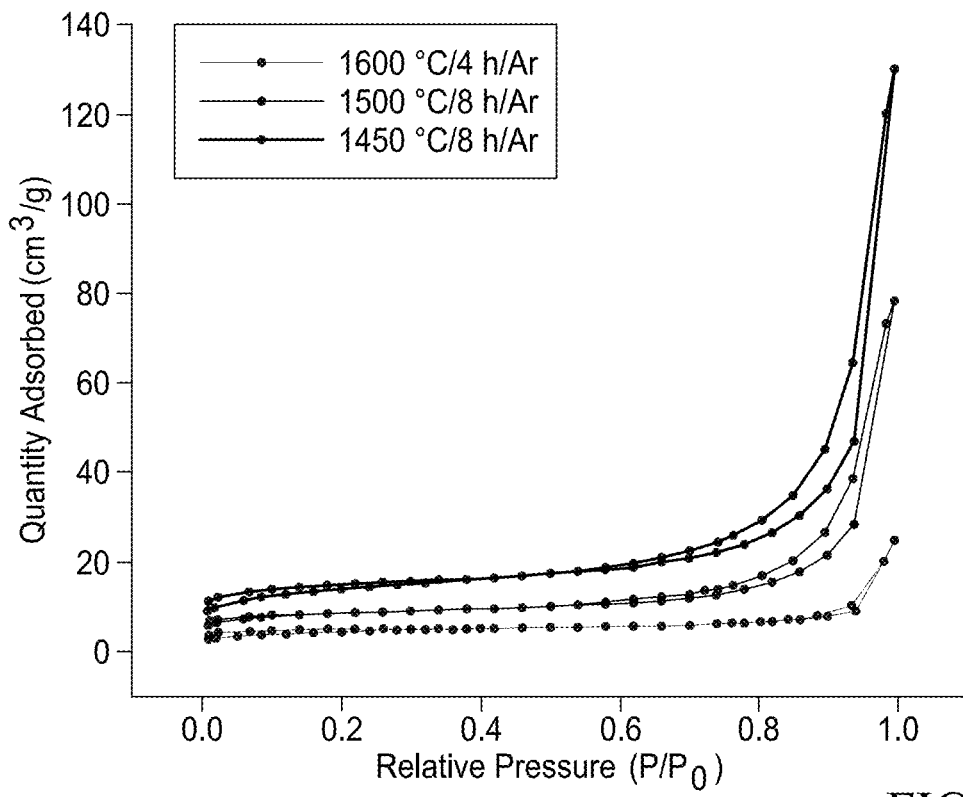
Figure 10B:
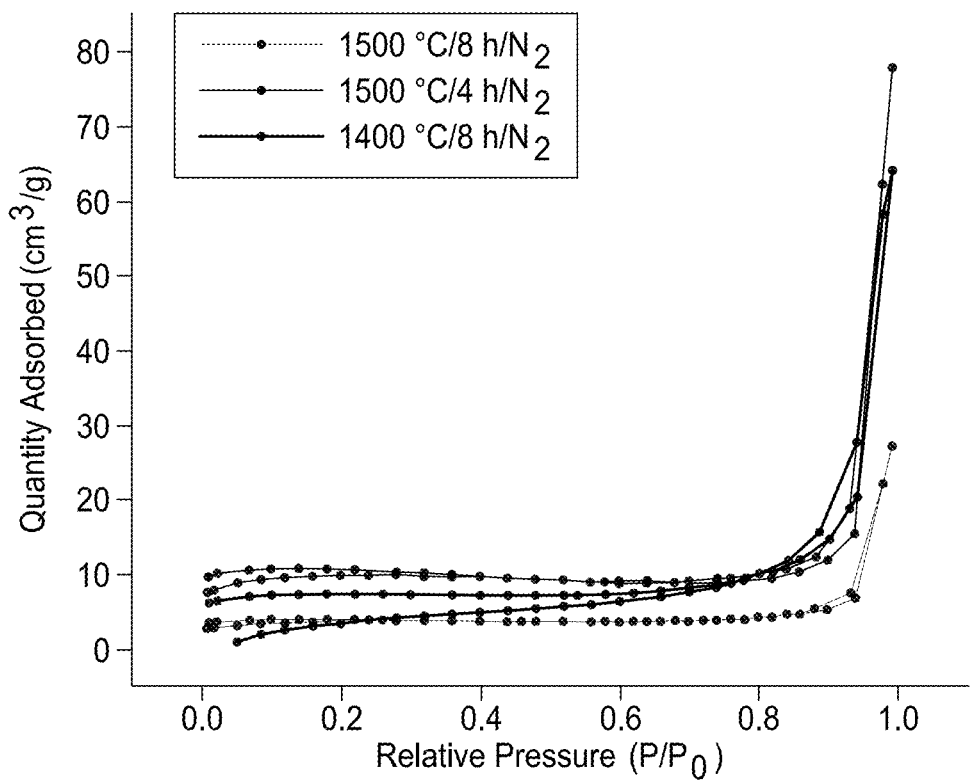

FIGS. 10A-10B show $N_2$ adsorption isotherms of SiC and $Si_3N_4$ obtained from heating at different temperatures. Incremental increases in the measured BET surface areas (SSAs) were observed with lower synthesis temperatures. The BET surface areas of SiC from heating at 1450, 1500, and 1600° C. for 8 hours followed by oxidative removal of carbon are 44, 27, and 10 $m^2$/g, respectively.

BET studies conducted on $Si_3N_4$ from heating $SDRHA_{60}$ at 1400 and 1500° C./8 hours/$N_2$ reveal surface areas of 20 and 10 $m^2$/g, respectively after oxidative removal of carbon. In comparison, $Si_3N_4$ produced from heating at 1500° C. for 4 h shows an SSA of 28 $m^2$/g. The decrease in the specific surface area with increasing heating temperatures and prolonging dwell times is presumably due to the growth and coalescence of the fibrous and spherical SiC particles through grain-boundary diffusion mechanisms. While not limiting to any particular theory, it is believed that SiC is produced first, followed by nitridation.

Multiple publications have reported using RH and/or RHA to make silicon non-oxide ceramics. Table 5 lists SiC production from RH and/or RHA that may be compared to the present technology in terms of their surface areas (SSA) and/or product dimensions, which is also briefly discussed above.

It is seen that most reported methods start with RH and are not applicable for scale-up production, not to mention the energy consumed in pretreatments. In other studies using RHA as the starting material, it generally serves as the $SiO_2$ source given the high $SiO_2$ content such that external carbon sources must be added to the RHA to achieve the stoichiometric ratio for carbothermal reduction. In comparison, the approach provided in accordance with the present disclosure using treated SDRHA gives the highest surface area SiC in the fewest steps and using an agricultural waste wherein the byproduct spirosiloxanes also has considerable value.

another example, C/SiC nanowire (having a diameter of about 8-10 nm) composites synthesized by electrolyzing carbonized rice husks showed capacities of greater than about 800 mAh $g^{-1}$ after 400-600 cycles at 0.5-2 A $g^{-1}$.

As discussed above, heating $SDRHA_{60}$ at 1450° C./8 hours/Ar, for example, with a ramp rate of 10° C. per minute, forms SiC mixed with 13 wt. % C.

The composites show SSAs of approximately 44 $m^2/g$ (greater than or equal to about 150 $m^2/g$ with carbon),

TABLE 5

Comparisons of reported SiC produced from RH or RHA.

| Starting Material | Pretreatment | Method | SSA ($m^2/g$) | Morphology | Ref. No. |
|---|---|---|---|---|---|
| RH | 500° C./$N_2$ | Plasma pyrolysis | 105 | Particles (20-30 nm dia.) | 1 |
| RH | 700° C./Ar | Microwave heating | 12 | Whiskers (0.11-0.17 μm dia. and particles (60-130 nm dia.) | 2 |
| RH | 600° C./Ar + acid washing | Magneisothermal reduction (600° C./Ar) | 90 | Particles (20-30 nm dia.) | 3 |
| RH | 1000° C./inert atmosphere | 1500° C./Ar | 9 | Whiskers and particles (0.1-1 μm dia.) | 4 |
| RH + carbon black* | 800° C./$O_2$ | 1450-1550° C./vacuum | — | Particles (80-100 nm dia.) | 5 |
| RHA + phenolic resin** | 700° C./air | 1600° C. (embedded in graphite) | — | Nanowires (50-380 nm dia.) | 6 |
| RHA + graphene*** | 500° C./air | 1400° C./Ar | — | Whiskers (30-120 nm dia.) | 7 |
| RH black ash | 280° C./air | 1500-2000° C./Ar | — | Whiskers (0.1-0.11 μm dia.) & particles (6-14 μm) | 8 |
| SDRHA | Catalyzed KOH + hexylene glycol/200° C. | 1400° C./Ar | 40 | Whiskers (100-140 nm dia.) and particles (10-200 nm) | Present Technology |

1 - Singh, S. K.; Parida, K. M.; Mohanty, B. C.; Rao, S. B. High Surface Area Silicon Carbide from Rice Husk: A Support Material for Catalysts. *React Kinet Catal Lett.*, 54 (1), pp. 29-34 (1995). https://doi.org/10.1007/BF02071177.
2 - Li, J.; Shirai, T.; Fuji, M. Rapid Carbothermal Synthesis of Nanostructured Silicon Carbide Particles and Whiskers from Rice Husk by Microwave Heating Method. *Advanced Powder Technology*, 24 (5), pp. 838-843 (2013).
3 - Su, J.; Gao, B.; Chen, Z.; Fu, J.; An, W.; Peng, X.; Zhang, X.; Wang, L.; Huo, K.; Chu, P. K. Large-Scale Synthesis and Mechanism of β-SiC Nanoparticles from Rice Husks by Low-Temperature Magnesiothermic Reduction. *ACS Sustainable Chem. Eng.*, 4 (12), pp. 6600-6607 (2016).
4 - Sujirote, K.; Leangsuwan, P. Silicon Carbide Formation from Pretreated Rice Husks.
5 - Radev, D. D.; Uzunov, I. Nanosized Silicon Carbide Obtained from Rice Husks. *SSP*, 159, pp. 153-156 (2010). https://doi.org/10.4028/www.scientific.net/SSP.159.153.
6 - Li, W.; Huang, Q.; Guo, H.; Hou, Y. Green Synthesis and Photoluminescence Property of β-SiC Nanowires from Rice Husk Silica and Phenolic Resin. *Ceramics International*, 44 (4), pp. 4500-4503 (2018). https://doi.org/10.1016/j.ceramint.2017.12.015.
7 - Chen, J.; Kong, Q.; Liu, Z.; Bi, Z.; Jia, H.; Song, G.; Xie, L.; Zhang, S.; Chen, C.-M. High Yield Silicon Carbide Whiskers from Rice Husk Ash and Graphene: Growth Method and Thermodynamics. *ACS Sustainable Chem. Eng.*, 7 (23), pp. 19027-19033 (2019). https://doi.org/10.1021/acssuschemeng.9b04728.
8 - Gorthy, P.; G, M. P. Production of Silicon Carbide from Rice Husks. *Journal of the American Ceramic Society*, 82 (6), pp. 1393-1400 (1999). https://doi.org/10.1111/j.1151-2916.1999.tb01929.x.
*Source of carbon is provided as carbon black.
**Source of carbon is provided as decomposed phenolic resin
***Source of carbon is provided as graphene.

Example 2

Nanocomposites Derived from SDRHA as Electrode Materials

Figure 11A:
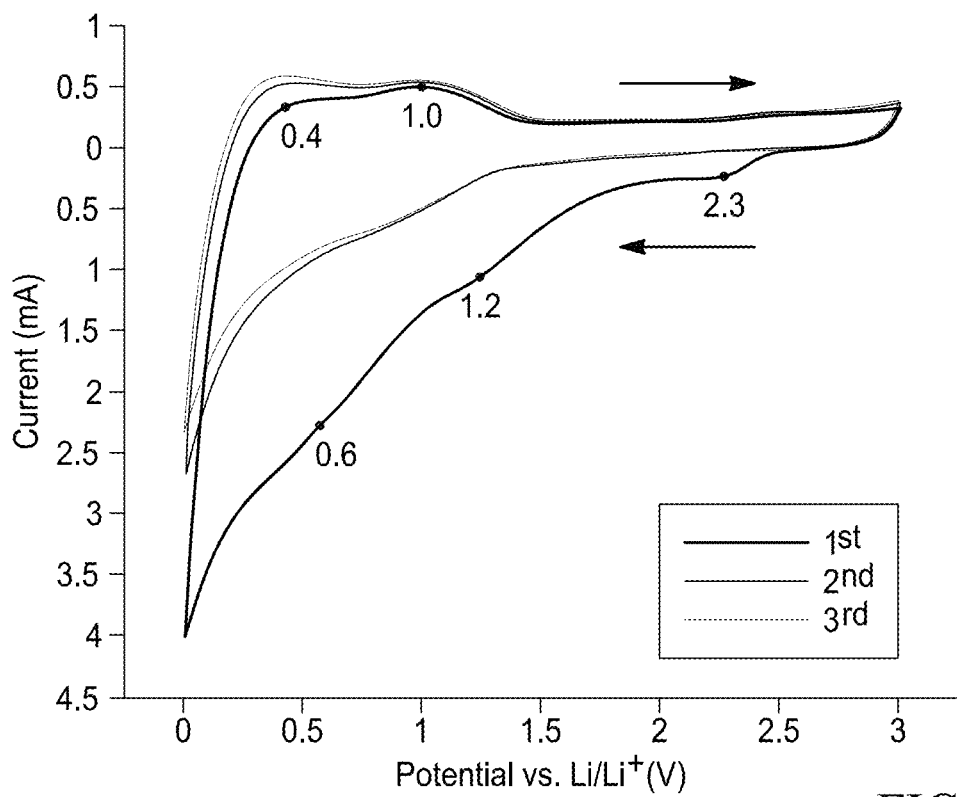
Figure 11B:
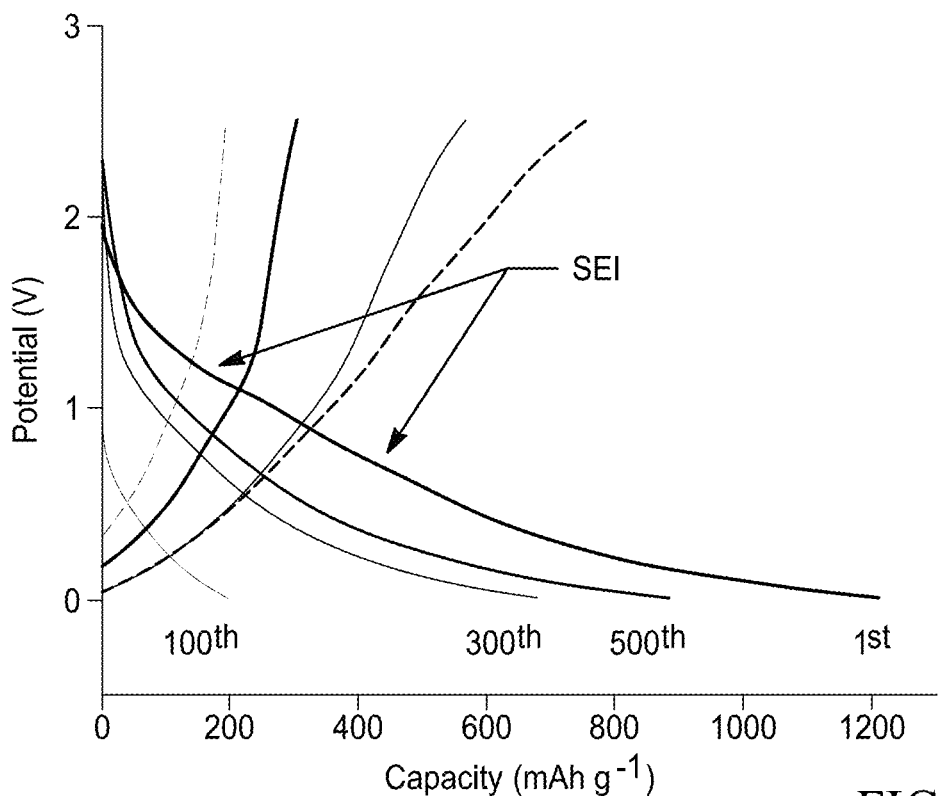

While traditionally being regarded as electrochemically inactive, with certain modifications, silicon carbide (SiC) has recently been recognized as a potential electrode material (a negative or anode electroactive material) for lithium ion batteries (LIBs). For example, 50 nm diameter carbon coated SiC obtained by coating Si nanoparticles with carbon using methane via CVD appears to have an initial discharge capacity of approximately 1330 mAh/g and a retention capacity of approximately 1200 mAh/g over 200 cycles. In offering the potential as negative electrode/anode materials. Electrochemical performance of SiC/Li half-cells are shown in FIGS. 11A-11B. CV curves of SiC/Li half-cell between 3 and 0.01 V at a scan rate of 1 mV s−1 are shown in FIG. 11A, while voltage-capacity curves are shown in FIG. 11B. The CV curve of the first cycle differs from subsequent cycles. In the first cathodic sweep, the peaks at 1.2 and 0.6 V are associated with electrolyte decomposition and formation of a solid electrolyte interface (SEI) layer on the anode surface. The peaks disappear in subsequent scans, indicating formation of a stable SEI.

The long plateaus between 0-2 V in the potential-capacity curve are consistent with peaks in the CV curve. Two oxidation peaks at approximately 0.4 and approximately 1 V exhibited in anodic scans are ascribed to extraction of Li$^+$. The intensity of the reduction peak at approximately 1.2 V is lower in the second and third cycles, suggesting irreversible lithiation of SiC during the first scan, which agrees with the large irreversible capacity observed in galvanostatic cycling results.

Figure 12:
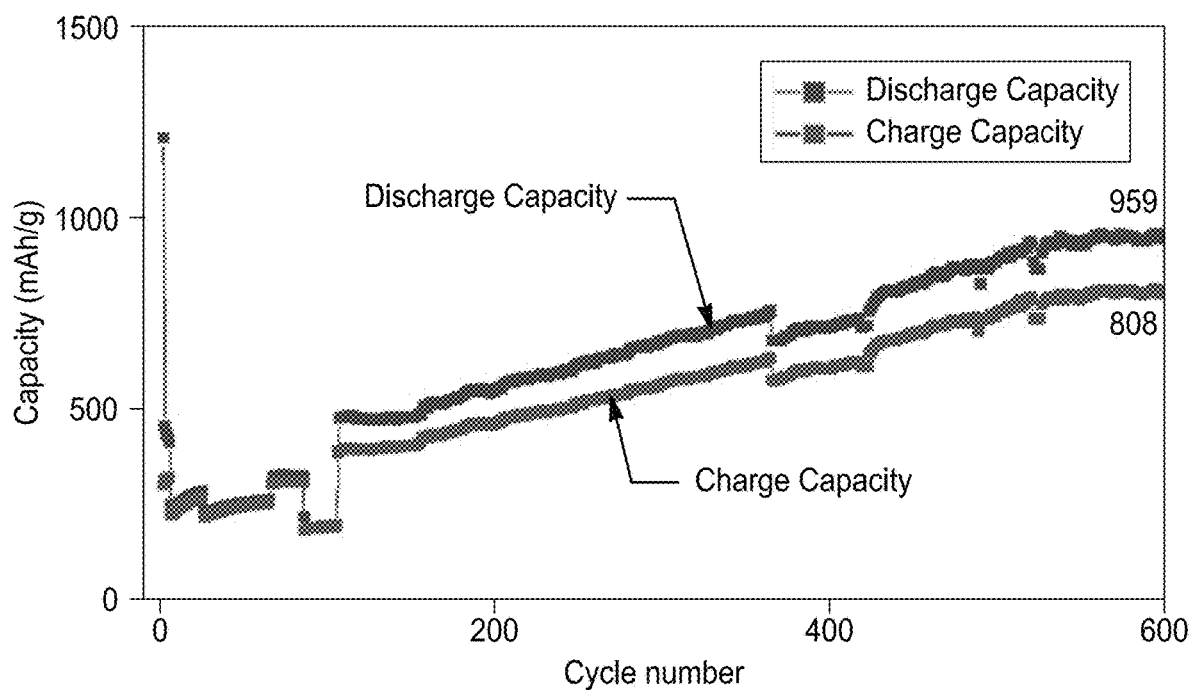
FIG. 12 shows specific capacity versus cycle number of SiC—C/Li half-cell.

FIG. 12 shows specific capacity versus cycle number plots of SiC—C/Li half-cell cycled between 0.01-2.5 V at various C-rates. The SiC—C/Li half-cell shows an initial discharge capacity of approximately 1200 mAh g$^{-1}$ at 0.1 C. On fast cycling at 2 C, the capacity decreases to approximately 200 mAh g$^{-1}$. Nevertheless, cycling at 0.1 C returns the discharge capacity to approximately 959 and approximately 808 mAh g$^{-1}$ after 500 cycles.

The distinctive observation of gradual capacity increases with cycling from SiC anodes has also been reported in several early studies. While non-limiting, theorized explanations include: (1) crystal structure transformation arises from Li$^+$ intercalation; (2) displacement reactions of typical conversion resulting in SiC slowly transforming to Si, C, and/or Li$_x$Si$_y$C; (3) slow and complex SEI formation.

In order to explore the working mechanisms of SiC as anode materials, coatings on the SiC/C electrode after cycling for 600 cycles were scraped off of the current collector using a razor blade in a dry room to gain better resolution active materials with eliminating the diffractions from Cu. The recovered electrode was then soaked and rinsed with NMP using ultrasonication to dissolve the PDVF. The resulting active material powder was then dried under vacuum/room temperature (RT)/2 hours.

Figure 13:
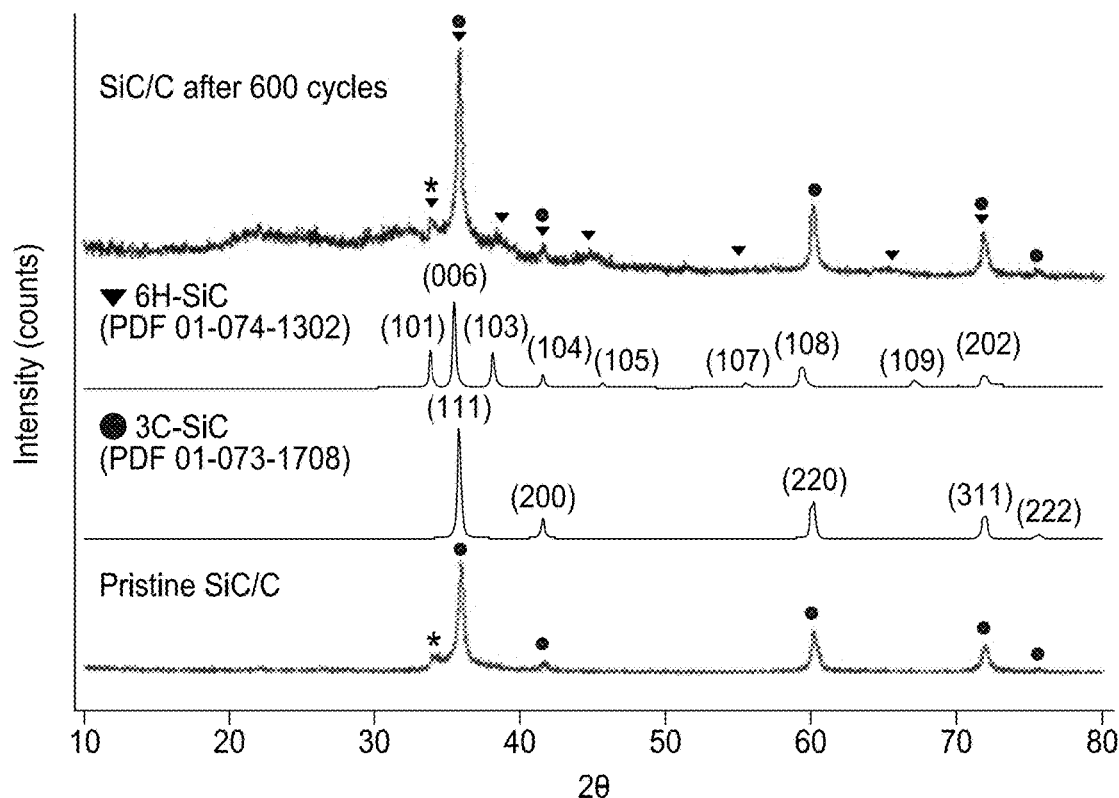
FIG. 13 shows XRD of pristine SiC/C composites and SiC/C after 600 cycles as anode materials in Li half cells.

FIG. 13 shows XRD patterns of SiC/C before and after cycling, where the pristine SiC/C composites are mainly composed of β-phase, belonging to the cubic crystallographic system (3C). Peaks at approximately 36°, 42°, 60°, and 72°2θ are associated with diffraction from the (111), (200), (220), and (311) planes of cubic SiC, respectively. Analysis based on the Halder-Wagner method shows the lattice parameter estimated to be 4.3518 (19) Å, close to the reference 3C—SiC parameters (4.348 Å).

The peak for (111) lattice plane shows stronger residual diffraction signals in comparison with the peak intensities of the reference 3C—SiC DB card (PDF 01-073-1708, Figure of merit=0.528), suggesting anisotropic growth along the <111> direction in the SiC structure. The peak intensity ratio of (200) to (111) plane is 5.25, while that for the reference patterns is 17.5. The significant differences in peak intensities are presumably due to more favored orientation along (111) plane over (200) plane, resulting from competitive growth along with the two directions. It is generally accepted that the surface energy of {111} planes in β-SiC is lower than other lattice planes, which leads to B—SiC whiskers preferably growing toward the <111> direction with lower formation energy.

Meanwhile, a low-intensity peak at a lower angle than that of the (111) plane is ascribed to the presence of stacking faults (marked with *). The occurrence of stacking faults is frequent in growing SiC whiskers as stacking faults are easily inserted in {111} planes, perpendicular to the SiC whisker growth direction.

As for the cycled SiC/C composites, a broad hump centered approximately 25°2θ is ascribed to amorphous carbon used in electrodes. In addition to the significant 3C—SiC phase shown in pristine SiC/C composites, the XRD patterns of the cycled SiC/C exhibit weak peaks at approximately 38°, 41°, 44°, 55°, and 64°2θ, which are attributed to (103), (104), (105), (107), and (109) planes of the 6H—SiC polytype (PDF 01-074-1302, Figure of merit=2.72), within the hexagonal structure system, respectively. Lattice parameters of the 3C—SiC phase increased slightly to 4.3533 (6) Å after 600 cycles, suggesting structure changes on cycling.

Several studies report the observation of SiC polytype transformation during charging/discharging in the literature. Kumari et al., "Nano Silicon Carbide: A New Lithium-Insertion Anode Material on the Horizon," *RSC Adv.*, 3 (35), pp. 15028-15034 (2013). https://doi.org/10.1039/C3RA40798E, first revealed the presence of the 8H—SiC phase after cycling pure 3C—SiC nanoparticles, which was announced to be related to the capacity increments of SiC.87 Subsequent reports by Li et al., "Bowl-like 3C—SiC Nanoshells Encapsulated in Hollow Graphitic Carbon Spheres for High-Rate Lithium-Ion Batteries," *Chem. Mater.* 28 (4), pp. 1179-1186 (2016). https://doi.org/10.1021/acs.chemmater.5b04750, show phase transformation to 6H—SiC when investigating 3C—SiC nanoshells encapsulated in hollow graphitic carbon spheres as anode materials, while an intermediate planar structure forms during polytype transformation was demonstrated in a DFT calculation study by Bijoy et al., "Exploring the Mechanism of Spontaneous and Lithium-Assisted Graphitic Phase Formation in SiC Nanocrystallites of a High Capacity Li-Ion Battery Anode," *J. Phys. Chem. C*, 121 (28), pp. 15106-15113 (2017). https://doi.org/10.1021/acs.jpcc.7b04489.

Example 3

SiC/HC and SiC/O Electrodes

SiO$_2$ is extracted from RHA via the direct distillation of the spirosiloxane [(CH$_3$)$_2$C(O)CH$_2$CH(O)CH$_3$]$_2$Si coincidentally providing SDRHA with control of final SiO$_2$:C mole ratios of 2:15 to 13:35, as described above. This finding enables the production of SiC via direct carbothermal reduction of RHA more rapidly and at lower temperatures than traditional methods as our approach takes advantage of the natural nanoscale mixing of SiO$_2$ and carbon in RHA without conventional steps of adding carbon and tedious milling processes.

Greyish products are obtained by heating SDRHA$_{60}$ (60 wt. % SiO$_2$, SSA approximately 360 m$^2$/g) at 1450° C./8 h/Ar containing approximately 13 wt. % hard carbon via isothermal TGA under O$_2$ (denoted as SiC/HC below). Analysis of the XRD and FTIR both indicate the products are composed mainly of β-phase SiC, belonging to the cubic crystallographic system (3C). It should be noted that the low-intensity peak at a lower angle than that of the (111) plane is ascribed to the presence of stacking faults (marked with *). Stacking faults occur frequently in growing SiC whiskers along (111) planes, perpendicular to the SiC whisker growth direction.

Diffraction peaks observed at approximately 36°, 42°, 60°, and 72°2θ are associated with diffraction from the (111), (200), (220), and (311) planes of 3C—SiC, respectively. Analysis using the Halder-Wagner method gives a lattice parameter of 4.3518 (19), close to reference 3C—SiC parameters (4.348). The peak for the (111) lattice plane shows a stronger residual diffraction signal in comparison with the peak intensities of the reference 3C—SiC DB card (PDF 01-073-1708), suggesting a long axis in the (111) direction in the SiC structure. The peak intensity ratio of (200) to (111) plane is 5.25, while that for the reference pattern is 17.5. The significant difference in peak intensities is presumably due to more favored orientation along the (111) versus (200) planes, resulting from competitive growth along the two directions.

It is generally accepted that the surface energy of (111) planes in 3C—SiC is lower than other lattice planes, which leads to 3C—SiC whiskers growing preferentially along the (111) direction with lower formation energy.

SEM image reveals two distinct SiC morphologies: particles and whiskers, believed to result from coinciding different reaction mechanisms during carbothermal reduction. The BET specific surface area (SSA) is approximately 204 m$^2$/g for SiC/HC, and approximately 42 m$^2$/g SiC after oxidative removal at 500° C./1 h/O$_2$ (denoted as SiC/O below). N$_2$ adsorption/desorption isotherms are used to show the broad pore size distribution in SiC/HC peaks at about 17 to about 24 nm, with no peaks seen for SiC/O. HC typically exhibits high crosslinking inducing formation of nanopores within the disordered structures.

SiO$_2$ was removed from RHA to recover SDRHA and distill spirosiloxane. Synthesis of SiC via carbothermal reduction of the SDRHA with various SiO$_2$:C ratios may be conducted, as described above. In brief, (60 wt. % SiO$_2$) SDRHA powders are used as starting materials. As discussed above, heating SDRHA$_{60}$ at 1450° C./8 hours/Ar, for example, with a ramp rate of 10° C. per minute, forms SiC mixed with 13 wt. % C or SiC/HC (85 wt. % SiC to 15 wt. % C). The excess hard carbon can be removed by oxidizing at 500° C./1 h/O$_2$.

SiC Half-Cell Assembly

SiC/HC and SiC/O electrodes were prepared with 70 wt. % SiC/HC or SiC/O as described above, 20 wt. % super C$_{65}$ carbon black, and 10 wt. % poly(vinylidene fluoride) (PVDF) binder. SiC powders and C$_{65}$ were dried at 80° C./vacuum overnight and dry-mixed by mortar and pestle, which was then mixed with PVDF binder solution (5 wt. % solution in NMP) and 1.5 g NMP in a 16 mL vial. The mixtures were ball-milled with yttria-stabilized zirconia media (3 mm dia.) overnight to obtain uniform slurries, then coated onto a copper foil (16 μm thick) serving as a current collector and by using a wire-wound rod coater at a controlled speed of 50 mm/s. After drying at 80° C./vacuum/2 h, 18 mm diameter electrodes were punched out. SiC anode porosities were calculated.

Half-cells (2023 coin cell) were assembled with either SiC/HC or SiC/O electrodes, with Li metal was used as the counter electrode in a glovebox. The metallic Li (16 mm×750 μm, Alfa Aesar) was scraped to remove the oxide layer and expose a clean surface before cell assembly. CELGARD™ 2400 (19 mm) was used as a separator and 1.1 M LiPF$_6$ in EC:DC:DMC solvent (1:1:1 weight ratio) with 10 wt. % FEC additive as the electrolyte.

Data shown in the article was averaged of three cells. The galvanostatic cycling of the half-cells was performed between 0.01-2.5 V vs. Li/Li$^+$ using a multi-channel Maccor test system. The experimental mole of Li in lithiated SiC was calculated per $n_{Li}=Q_{experimental}/F \times MSiC$, where F is the Faraday constant, and MSiC is 40.096 g/mol.

Electrochemical Performance of SiC/HC and SiC/O

SiC was long regarded as electrochemically inert to Li$^+$ and as a matrix to strengthen composite electrodes to mediate charge/discharge volume changes. However, recently some promise has been shown that suggested SiC may be useful as an electroactive material, such that SDRHA-derived SiC anodes are tested here, especially because they are synthesized readily from sustainable materials. FIG. 19A presents cross-sectional SEMs of a representative SiC/HC anode. The active materials loading is approximately 1 mg/cm$^2$, giving an areal capacity of approximately 0.75 mAh/cm$^2$. Both SiC/HC and SiC/O half-cell electrodes were assembled with Li metal as the counter electrode.

FIG. 19B provides CV curves for SiC/HC cycled between 3 and 0.01 V at 1 mV/s. In the first cathodic sweep, peaks appear at approximately 1 and approximately 0.72 V attributable to two carbonate reductive decomposition steps as the solid electrolyte interface (SEI) forms on the anode surface. These steps disappear in subsequent scans, indicating a stable SEI. Two oxidation peaks appearing at approximately 0.2 and approximately 1.2 V in anodic scans of both SiC/HC and SiC/O can be ascribed to Li$^+$ extraction. The reduction peak intensity at approximately 1.2 V is lower in the second and third sweeps, presumably due to slow lithiation. Long plateaus appear between 0-2 V in FIG. 19C shows SiC/HC charge/discharge curves for 600 cycles. Additional differential capacity analyses offer peaks at approximately 0.2 and approximately 1.2 V, in agreement with the CV results.

Initial SiC/HC and SiC/O half-cell discharge capacities are approximately 1200 and approximately 1040 mAh/g, respectively, indicating the presence of HC facilitates lithiation. However, initial Coulombic efficiencies (ICE) are both approximately 25%, with subsequent reversible discharge capacities of approximately 460 and approximately 410 mAh/g for SiC/HC and SiC/O, respectively. These relatively low ICEs can be ascribed to SEI formation and irreversible reactions. The high SSAs of SiC/HC nanocomposites in this example are likely responsible for high Li$^+$ consumption during initial cycles.

FIG. 19D plots galvanostatic cycling capacities of SiC/HC and SiC/O half-cells. The incremental increases in capacity with cycling are a distinctive feature of SiC electrodes. On cycling at C/2 for 20 cycles and 1C for 40 cycles, SiC/HC shows discharge capacities increase from approximately 250 to 270 mAh/g and approximately 230 to 280 mAh/g, respectively. At 2C, capacities are approximately 200 mAh/g. On cycling SiC/HC half-cells at C/10, discharge capacities reach approximately 950 mAh/g (600 cycles). In comparison, HC-free SiC/O half-cells show discharge capacities approximately 20 mAh/g lower at C/2-2C; but increases still occur. After 500 cycles at C/10, capacities reach approximately 740 mAh/g.

The CEs for SiC/HC and SiC/O half-cells at C/10, C/2, 1C, and 2C are approximately 85, 95, 97, and 99%, respectively. While the relatively low CEs and high overpotential found for SiC/HC and SiC/O may not be well suited for high-energy-density LIBs, traditional Si-based anodes also exhibit poor later-cycle CEs. However, the diminishment in performance of conventional Si-based anodes is attributed to significant volume changes, particle pulverization, and repeated SEI reformation. To better understand the origins of the typically low CEs for SiC-based anodes and incremental capacity increases, additional testing and characterization is conducted.

To further investigate SiC lithiation mechanisms, post-mortem studies were conducted after 600 cycles. Recovered electrodes were first cleaned as follows. The SiC/HC and SiC/O half-cells after completing the 600 cycles test were decrimped in a dry room. The recovered electrodes were rinsed and soaked in DEC solvent to remove electrolyte salt residues that are not inherent to the SEI prior to dissolving the PDVF binder in NMP using ultrasonication. The electrodes were then dried overnight under vacuum at room temperature. The coatings on the SiC electrodes after cycling for 600 cycles were also scraped from the current collector using a razor blade in a dry room to gain better resolution active materials with eliminating the detection of Cu in following characterization.

XRDs of SiC/HC before/after cycling are compared. A broad hump centered at approximately 25°2θ in cycled SiC/HC is ascribed to amorphous carbon used in electrodes. In addition to peaks assigned to 3C—SiC, XRDs of cycled SiC/HC exhibit weak peaks at approximately 38°, 41°, 44°, 55°, 64°, and 75°2θ, corresponding to (103), (104), (105), (107), (109), (204) planes of 6H—SiC, respectively.

Lattice parameters for 3C—SiC increase from 4.3518 (19) to 4.3533 (6) Å after 600 cycles, possibly indicating slight structural changes.

SiC/HC and SiC/O nanocomposite anodes derived from RHA prepared in accordance with certain aspects of the present disclosure are potential alternatives to graphite and competitors to conventional Si-based anodes for future LIBs applications. SiC/HC undergoes incremental capacity increases to >950 mAh/g after 600 cycles with ambient $Li^+$ diffusion coefficients of 10-22 to 10-14 cm²/s as measured by GITT.

Post-Mortem Characterization of Cycled Electrodes Using

XRD, 29Si NMR, XPS, and SEM indicate partial phase transformation from cubic (3C) to hexagonal (6H) SiC, with no significant volume changes or surface cracking observed in SEMs. No elemental Si, $Li_xSi$, or $Li_xC$ is observed, suggesting SiC lithiation is limited by intercalation rather than conversion or alloying reactions. Computational modeling suggests that a cubic to hexagonal phase transition occurs at high Li contents and indicates that Li prefers the tetrahedral C site due to electrostatic interactions.

Experimental data indicate that lithiated SiC reaches a composition of $Li_{1.2-1.4}SiC$ without significant volume changes resulting in capacities approaching approximately 1000 mAh/g. Thus, SiC offers a realistic alternative to silicon as a negative electroactive material. For example, lithiation of Si to $Li_{4.4}Si$ occurs with a volume change of greater than 300%, meaning that cells with Si anodes must accommodate a significant fraction of this volume change.

It can be concluded (disregarding mechanical property issues) that, due to the required approximately 40-60% void space needed in a host material, the actual capacity of a realistic Si-based anode would be half of 3579 or 1300 mAh/g at best.

Additionally, SiC can eliminate a need for surface protection otherwise required for Si-based anodes in part as well.

Example 4

SiC and Graphite Electrode Postmortem Studies

Electrodes comprising SiC/HC and 30 wt. % graphite and SiC/O and 30 wt. % graphite prepared as described above in Examples 1 and 2 having been incorporated into half-cells and completing 600 lithiation/delithiation cycles were then de-crimped. The recovered electrodes were rinsed and soaked in DEC solvent to remove residual electrolyte salt. Then, the electrodes were ultrasonicated in NMP to dissolve the PDVF binder. The electrodes were then dried under vacuum at room temperature prior to conducting characterization studies.

XRD analysis of the SiC/HC and 30 wt. % graphite electrode after 600 cycles shows the most intense peak at approximately 26.5°2θ is indexed to the (002) plane of graphite. In the magnified patterns, peaks at approximately 36°, 42°, 60°, and 72°2θ are associated with diffraction from the (111), (200), (220), and (311) planes of 3C—SiC, respectively. Weak peaks observed at ~38°, 45°, 55°, 60°, and 67° 2θ are attributed to (103), (104), (109), (204) planes of 6H—SiC. In addition, doublet peaks at approximately 48° and 49°2θ can be assigned to lithiated graphite ($LiC_x$), indicating residual lithium insertion in graphite layers.

SEM images of the SiC/HC and 30 wt. % graphite (Formula BT™) electrode top and cross-section after 600 cycles are studied. As expected, the electrode surfaces are covered with SEI layers, while no SiC whisker structures are observed. Similar to cycled SiC/HC electrodes, the cycled SiC/HC+30 wt. % graphite electrodes kept their integrity with no cracking observed. EDX images show uniformly distributed Si, C, and O signature elements and F and P elements associated with LiF, $Li_xPF_y$, and $Li_xPF_yO_z$ species.

By way of comparison, SEM images of SiC/O+30 wt. % graphite electrode after 600 cycles are also studied. The fibrous SiC whiskers are more evident in the electrodes without hard carbon (HC) particles due to smaller SSAs and consequently thinner SEI on the surfaces. Besides, the graphite particles (approximately 10 μm) are not clearly distinct from the electrode surface after cycling.

Example 5

SiN/O Electrodes

Although $Si_3N_4$ is reported to offer a very low capacity of 40-80 mAh/g suggesting it is relatively electrochemically inert, several studies report long-term cycling results in much higher capacities especially for substoichiometric $SiN_x$ rather than $Si_3N_4$. Generally, increasing N content disfavors the reversible specific capacity, but improves cycling stability as $SiN_x$ is considered a conversion type anode that forms inert $Li_3N$ via irreversible reduction during the first cycle. The resulting $Li_3N$ matrix would facilitate electrochemical performance with its high $Li^+$ conductivity of approximately $10^{-3}$ S cm$^{-1}$ at room temperature.

However, studies examining the feasibility of using $SiN_xO_y$ as an electrode are rare. For example, a study on using $SiN/SiO_xN_y$-sheathed Si nanotubes as anodes was reported, yet the $SiN/SiO_xN_y$ shell was regarded as a mechanical stabilizer without electrochemical activity. It is believed that the only attempts reported so far were done on $Li_xSiO_yN_z$. Mixtures of $SiO_2$ and $Li_3N$ with a mole ratio of 1:4.2, a material of nominal composition $Li_{1.2}SiO_2N_{0.4}$ was synthesized by high-energy ball milling. This material exhibited an initial discharge capacity of 590 mAh g$^{-1}$ and retained 460 mAh g$^{-1}$ after 100 cycles. Notwithstanding the unimpressive capacity, wide voltage windows up to 3.7 V were observed in this system. However, it is not believed that $Si_2N_2O$ has previously been used as an anode active material.

Figure 14:
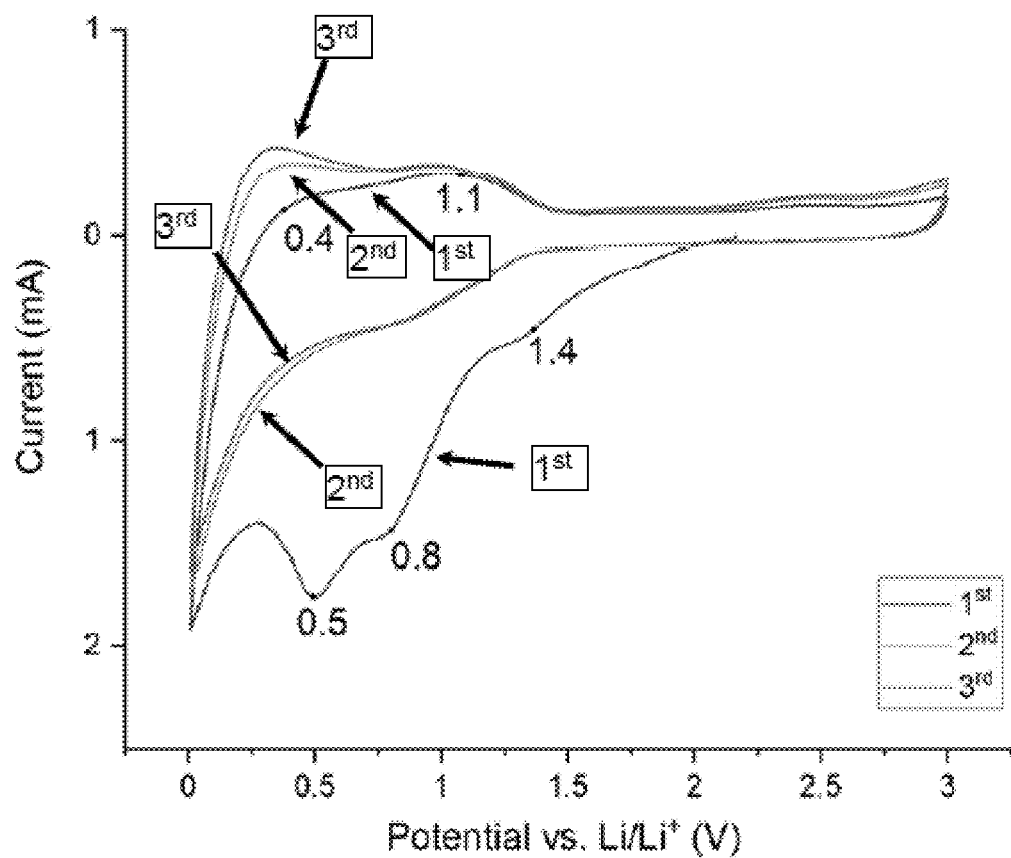
FIG. 14 shows representative CV curves of $Si_2N_2O$ nanocomposites/Li half-cell.

Carbothermal nitridation studies found that $N_2/H_2$ 95:5 mixtures favor $Si_2N_2O$ and/or non-stoichiometric $SiN_xO_{4-x}$ formation, as discussed above. Several $Si_2N_2O$ composites were selected for studies on their electrochemical performance. FIG. 14 shows the CV curves of representative $Si_2N_2O/Li$ half cells between 3 and 0.01 V at a scan rate of 1 mV s$^{-1}$. In the first cathodic sweep of $Si_2N_2O/Li$ half cells, the reduction peaks at 2-0.75 V is probably attributed to both reversible and irreversible lithiation. This is characteristic of conversion reactions. In the subsequent lithiation, the conversion hump mostly disappeared, showing that the conversion reaction completed to a large extent during the initial cycle and is irreversible. The peak at approximately 0.5 V is associated with electrolyte decomposition and the SEI layer formation on the anode surface, which also disappeared in subsequent scans, indicating a stable SEI was formed.

FIGS. 15A-15B show specific capacity versus cycle number plots of $Si_2N_2O$/Li half-cells cycled between 2.5-0.01 V at different C-rates. The $Si_2N_2O$ used in the two cells derived from heating $SDRHA_{65}$ at 1500° C./8 hours under $N_2/H_2$ (95/5), with approximately 84 wt. % $Si_2N_2O$ in the products, and from heating $SDRHA_{65}$ at 1500° C./10 hours under $N_2/H_2$ (85/15), with approximately 88 wt. % $Si_2N_2O$ in the products (Table 4).

The $Si_2N_2O$ (84)/Li half-cell showed an initial discharge capacity of approximately 800 mAh/g. At 1 C, the charge capacity shows approximately 130 mAh/g after 40 cycles. After 40 cycles at 2C, the charge/discharge capacities both increased to approximately 130 mAh/g. When the C rate was returned to 0.1C, the half-cell shows a charge and discharge capacity of approximately 285 and approximately 226 mAh/g, respectively, after 240 cycles.

The $Si_2N_2O$ (88)/Li half-cell showed a charge capacity recovered to approximately 228 mAh/g and a discharge capacity to approximately 186 mAh/g after 40 cycles at 0.1C, close to those of the $Si_2N_2O$ (84)/Li half-cell. After 270 cycles at 0.1C, the charge and discharge capacities increase to approximately 376 and 264 mAh/g, respectively. Unlike the aforementioned $Si_2N_2O$ (84)/Li half-cell, higher charge capacities than discharge capacities are observed through the approximately 360 cycles at different C rates. The presence of cristobalite and $Si_3N_4$ phases, and/or differences in SSAs of two systems presumably lead to their distinct performance on cycling. It worth noting that the C rates were calculated based on the capacity of 1200 mAh/g, by reference to studies in substoichiometric $SiN_x$ films. Moreover, the capacity increments found in these preliminary tests are similar to those of SiC anodes, regardless of the relatively lower specific capacities.

Example 6

Electrodes Having SiC/C with Graphite

Given the excessive formation of a solid electrolyte interface (SEI) layers due to the high surface area and unstable structure of Si-based anode materials, graphite is often introduced to reduce unnecessary electrolyte decomposition, facilitate maintenance of anode integrity, and provide pathways for electron transfer. In this example, graphite was mixed with SiC/C in an attempt to enhance the specific capacity and cycling stability versus cells without graphite or just graphite alone.

SiC/C (1450° C./Ar/8 hours) was mixed with graphite (weight ratios of 8:1 and 6:3) in NMP solvent. The mixtures were ball-milled with yttria-stabilized zirconia media (approximate diameter of 3 mm, 3 g) overnight before adding 5 wt. % $C_{65}$ and 5 wt. % poly(vinylidene fluoride) (PVDF) binder to prepare electrodes. The corresponding formula ratios of SiC/C:graphite:$C_{65}$:PVDF are 8:1:0.5:0.5 (denoted SiC+10 wt. % graphite below) and 6:3:0.5:0.5 (denoted SiC+30 wt. % graphite below) in the electrodes.

FIG. 16 illustrates the XRD patterns of SiC/C before and after mixing with 10 wt. % graphite. In addition to peaks assigned to 3C—SiC with stacking faults, the intense peak at ~26.5°2θ is indexed to (002) plane of graphite.

FIGS. 17A-17B are SEM images of graphite (Formula BT™) and SiC/C after mixing. According to the information provided by the supplier, the materials originate from natural graphite. Pure graphite particles comprise both spherical and elliptical particles with average diameters of approximately 10 μm. After ball milling with SiC/C, the fibrous SiC whiskers and surrounding carbon particles maintain their respective morphologies. The graphite particles are not clearly distinguished from the composites, presumably due to the low content and/or reduction of particle size during the ball milling processes.

Electrodes were prepared by adding $C_{65}$ and poly(vinylidene fluoride) (PVDF) binder solution (5 wt. % solution in NMP) to the ball-milled SiC/C+graphite composites. The electrode slurries were ball-milled with yttria-stabilized zirconia media (average diameter of about 3 mm, 6 g) in a glass vial overnight to obtain uniform mixtures, then coated onto a copper foil current collector using a wire-wound rod coater at a controlled speed of 50 mm/s. After drying at 80° C./vacuum/2 hours, they were punched into 18 mm circular electrodes for coin cells.

Half cells were assembled to evaluate the electrochemical performance, in which Li metal was used as the counter electrode. The metallic Li (16 mm in diameter) was scraped to remove the oxide layer and expose a clean surface before cell assembly. CELGARD 2400 (dia. 19 mm) was used as a separator and 1.1 M $LiPF_6$ in EC:DC:DMC (1:1:1 weight ratio) with 10 wt. % FEC added as the liquid electrolyte.

As a baseline to the reported results, graphite/Li half-cells were charged and discharged to 0.01-2.5 V at different C rates (FIG. 18A). It is widely accepted that the Li+ intercalation into graphite occurs at 0.25-0.01 V vs. Li/Li+, as shown in the representative voltage profiles of graphite/Li half-cells.

The obtained initial discharge capacities of graphite/Li half-cells are approximately 360 mAh/g, close to the theoretical 375 mAh/g. The specific capacities remained at approximately 350 mAh/g at 0.1C, decreasing to ~280 and ~170 mAh/g at 0.5C and 1C, respectively. The retained charge and discharge capacities are ~370 and 300 mAh/g as the C rate was returned to 0.1C. No capacity increments are observed in the first five cycles at 0.1C, while small gaps between charge and discharge capacities are observed in the graphite/Li half-cells. The charge capacity is greater than the discharge capacity indicative of plating of some excess lithium metal during cycling.

The SiC/C+graphite half-cells were charged and discharged to 0.01-2.5 V. FIGS. 18A, 18B, and 18C compare the representative voltage profiles of the first and second cycle and specific capacity versus cycle number of SiC/C+graphite half-cells with pristine SiC/C half-cells. The SiC/C half-cells show first cycle irreversible capacity losses of greater than 70%, as exhibited in FIG. 18B. Such a significant irreversible capacity loss in the first cycle is commonly observed for silicon-based anodes when discharged to potentials near zero. In addition, the first discharge curve of SiC/C half-cells display short plateaus or humps associating with electrode passivation and SEI formation at approximately 1.25-1 V and approximately~0.7-0.4 V vs. $Li/Li^+$. These are typical for silicon-based anodes cycled using $LiPF_{64}$ electrolyte based systems. The first cycle voltage profiles and efficiencies depend significantly on the electrolyte salt. In the second cycle and subsequent cycles, the potential shows a sloping profile, where these plateaus diminish, suggesting irreversible lithiation during the first cycle.

Just as with pristine SiC/C, plateaus at approximately 1.25-1 V and approximately 0.7-0.4 V appear in the first discharge curve of both SiC/C+graphite half-cells due to electrode passivation and SEI formation (FIGS. 18C and 18D). Moreover, an additional long structureless feature is observed between 0.25-0.01 V vs. $Li/Li^+$ in the second cycle, which is presumably due to the intercalation of $Li^+$ into graphite. This indicates the possible contribution to capacities from graphite. It should be noted that Si-based anodes typically show long and flat voltage plateaus approximately 0.25-0.1 V ascribed to the electrochemical lithiation of Si forming a $Li_xSi$ alloy.

As seen in FIG. 18C, the reversible specific capacity of SiC/C+10 wt. % graphite is approximately 370 mAh/g at 0.1C decreasing to approximately 210 mAh/g at 0.5C. The specific capacity further decreases to approximately 130 mAh/g at 1C. On returning to 0.5C, the capacities are approximately 210 mAh/g, which increase to approximately 220 mAh/g after 20 cycles. At 2C, the capacities decrease from approximately 90 mAh/g to approximately 84 mAh/g. Thereafter, the cells were charged/discharged at 0.1C targeting 500 cycles. After the initial fifteen cycles, the retained charge and discharge capacities are approximately 310 and approximately 390 mAh/g with an upward slope observed.

Likewise, the SiC/C+30 wt. % graphite half-cells charged and discharged following the same C rates at 0.01-2.5 V (FIG. 18D). The SiC/C+30 wt. % graphite half-cell shows a specific capacity of approximately 530 mAh/g at 0.1C. Increasing C rates to 0.5 and 1C, the specific capacities are approximately 450 and 310 mAh/g, respectively. Thereafter, when the C rates were decreased to 0.5C, the cell shows specific capacity of approximately 510 mAh/g. At 2C, the specific capacities are approximately 190 mAh/g. After returning to cycling at 0.1C for fifteen cycles, the discharge capacities increased from approximately 740 to approximately 870 mAh/g, while the charge capacities increased from approximately 510 to approximately 560 mAh/g again revealing an upward slope.

Overall, SiC/C+30 wt. % graphite half-cells show higher capacities at all C rates than pristine SiC/C and SiC/C+10 wt. % graphite. As with the SiC/C samples made without adding graphite, capacity increments are exhibited in the SiC/C+graphite half-cells. Gaps between charge and discharge capacities are observed not only in the SiC/C half-cells but also in the graphite half-cells, presumably due to the cycling programs at different C rates.

Note that the 30 wt. % graphite appears to improve capacities up to five times faster than pristine SiC half cells which is highly advantageous for use in electrochemical cells.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a silicon carbide or silicon nitride from rice hull ash (RHA) byproduct, the method comprising:

removing silicon oxide from a rice hull ash (RHA) byproduct to form a silica depleted rice hull ash (SDRHA) by reacting the rice hull ash (RHA) with a hindered diol in the presence of a catalytic base;

heating the silica depleted rice hull ash product (SDRHA) comprising silicon oxide at less than or equal to about 65% by weight and carbon at greater than or equal to about 35% by weight in an environment free of any additional carbon sources, comprising an inert atmosphere, and having a temperature of greater than or equal to about 1,200°C to less than or equal to about 1,700°C for a carbothermal reaction that forms a product comprising at least one of silicon carbide (SiC), silicon nitride ($Si_3N_4$), and silicon oxynitride ($Si_2N_2O$).

2. The method of claim 1, wherein the silica depleted rice hull ash (SDRHA) comprises greater than or equal to about 35% by weight to less than or equal to about 60% by weight of carbon.

3. The method of claim 1, wherein the silica depleted rice hull ash (SDRHA) has a ratio of $SiO_2$ to carbon ($SiO_2$:C) of about 1:8 to about 1:3.

4. The method of claim 1, wherein the hindered diol is selected from the group consisting of: 2-methyl-2,4-pentanediol, 2,2,4-trimethyl-1,3-pentanediol, and combinations thereof.

5. The method of claim 1, wherein the catalytic base is selected from the group consisting of: sodium hydroxide (NaOH), lithium hydroxide (LiOH), calcium hydroxide $Ca(OH)_2$, potassium hydroxide (KOH), cesium hydroxide (CsOH), rubidium hydroxide (RbOH), and combinations thereof.

6. The method of claim 1, wherein the hindered diol comprises 2-methyl-2,4-pentanediol and the catalytic base comprises sodium hydroxide (NaOH).

7. The method of claim 1, wherein the temperature is greater than or equal to about 1,400° C. to less than or equal to about 1,600° C.

8. The method of claim 1, wherein the product is a nanocomposite.

9. The method of claim 1, wherein the product comprises greater than or equal to about 75% by weight silicon carbide (SiC).

10. The method of claim 1, wherein the product comprises a nanocomposite with a phase comprising silicon oxynitride ($SiN_xO_{4-x}$, where x ranges from greater than 0 to less than 4) having nanostructures comprising at least one of silicon carbide (SiC) and silicon nitride ($Si_3N_4$) distributed therein.

11. The method of claim 1, wherein the removing silicon oxide from a rice hull ash comprises milling the rice hull ash (RHA) byproduct with an acidic solution to yield a purified rice hull ash (RHA) byproduct; and removing silicon oxide from the purified rice hull ash (RHA) byproduct by reacting the purified rice hull ash (RHA) with a hindered diol in the presence of a catalytic base to form the silica depleted rice hull ash (SDRHA).

12. The method of claim 11, further comprising after the milling, washing the purified rice hull ash (RHA) byproduct with boiling water to remove impurities.

* * * * *